(12) United States Patent
Shionoiri et al.

(10) Patent No.: US 8,692,653 B2
(45) Date of Patent: Apr. 8, 2014

(54) SEMICONDUCTOR DEVICE

(75) Inventors: Yutaka Shionoiri, Isehara (JP); Konami Izumi, Atsugi (JP); Jun Koyama, Sagamihara (JP); Yoshiyuki Kurokawa, Sagamihara (JP); Shunpei Yamazaki, Setagaya (JP); Tomoaki Atsumi, Isehara (JP); Takeshi Osada, Isehara (JP); Takayuki Ikeda, Atsugi (JP); Masato Ishii, Isehara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 1089 days.

(21) Appl. No.: 11/716,693

(22) Filed: Mar. 12, 2007

(65) Prior Publication Data

US 2007/0229271 A1 Oct. 4, 2007

(30) Foreign Application Priority Data

Mar. 15, 2006 (JP) ................................. 2006-070388

(51) Int. Cl.
*H04Q 5/22* (2006.01)
(52) U.S. Cl.
USPC ........ 340/10.1; 340/1.1; 340/10.3; 340/10.34
(58) Field of Classification Search
USPC .......................... 340/825, 10.1, 572.1–572.9; 235/375–385
See application file for complete search history.

(56) References Cited

U.S. PATENT DOCUMENTS

| | | | |
|---|---|---|---|
| 5,124,699 A | 6/1992 | Tervoert et al. | |
| 5,300,875 A * | 4/1994 | Tuttle | 320/138 |
| 5,317,309 A * | 5/1994 | Vercellotti et al. | 340/10.5 |
| 5,790,946 A | 8/1998 | Rotzoll | |
| 5,859,873 A | 1/1999 | Ritter | |
| 6,045,652 A * | 4/2000 | Tuttle et al. | 156/292 |
| 6,223,990 B1 | 5/2001 | Kamei | |
| 6,462,647 B1 | 10/2002 | Roz | |
| 6,509,217 B1 | 1/2003 | Reddy | |

(Continued)

FOREIGN PATENT DOCUMENTS

| | | |
|---|---|---|
| EP | 0977145 A | 2/2000 |
| EP | 1528609 A | 5/2005 |

(Continued)

OTHER PUBLICATIONS

International Search Report (Application No. PCT/JP2007/054607) dated Jun. 12, 2007.

(Continued)

*Primary Examiner* — James Yang
(74) *Attorney, Agent, or Firm* — Eric J. Robinson; Robinson Intellectual Property Law Office, P.C.

(57) ABSTRACT

Objects of the invention are to provide a semiconductor device including an RFID, which can transmit and receive individual information without a check of remaining capacity of the battery and a change of the battery in accordance with deterioration over time of the battery for a driving power supply; and which maintains a favorable communication state even when electric power, as a power supply for driving, from an external radio wave or electromagnetic wave (carrier wave) is not sufficient. A battery is provided as a power supply for supplying electric power in the RFID, and electric power obtained by a power generation element is charged in the battery.

54 Claims, 30 Drawing Sheets

(56) References Cited

U.S. PATENT DOCUMENTS

| | | | |
|---|---|---|---|
| 6,567,050 B1* | 5/2003 | Briggs | 343/741 |
| 6,737,302 B2 | 5/2004 | Arao | |
| 6,819,246 B1 | 11/2004 | Seppa | |
| 6,837,438 B1 | 1/2005 | Takasugi et al. | |
| 6,944,424 B2 | 9/2005 | Heinrich et al. | |
| 7,034,440 B2 | 4/2006 | Kim et al. | |
| 7,072,697 B2 | 7/2006 | Lappetelainen et al. | |
| 7,142,838 B2 | 11/2006 | Rotzoll | |
| 7,180,421 B2 | 2/2007 | Pahlaven et al. | |
| 7,191,953 B2 | 3/2007 | Wu et al. | |
| 7,209,771 B2 | 4/2007 | Twitchell | |
| 7,215,976 B2 | 5/2007 | Brideglall | |
| 7,301,830 B2 | 11/2007 | Takahashi et al. | |
| 7,321,290 B2* | 1/2008 | Stevens et al. | 340/10.1 |
| 7,333,786 B2 | 2/2008 | Kikuchi et al. | |
| 7,336,270 B2 | 2/2008 | Sato | |
| 7,374,101 B2* | 5/2008 | Kaneko | 235/492 |
| 7,378,971 B2* | 5/2008 | Andrechak et al. | 340/572.7 |
| 7,394,382 B2 | 7/2008 | Nitzan et al. | |
| 7,405,665 B2* | 7/2008 | Yamazaki | 340/572.8 |
| 7,603,144 B2 | 10/2009 | Jenson et al. | |
| 7,652,359 B2 | 1/2010 | Takayama et al. | |
| 7,710,270 B2 | 5/2010 | Shionoiri et al. | |
| 7,768,391 B2 | 8/2010 | Koyama et al. | |
| 7,804,203 B2 | 9/2010 | Kato | |
| 2002/0049714 A1 | 4/2002 | Yamazaki et al. | |
| 2002/0127474 A1* | 9/2002 | Fleischer et al. | 429/309 |
| 2004/0145454 A1 | 7/2004 | Powell et al. | |
| 2004/0153270 A1* | 8/2004 | Yamashita et al. | 702/81 |
| 2004/0158294 A1 | 8/2004 | Thompson | |
| 2004/0227619 A1* | 11/2004 | Watanabe | 340/10.34 |
| 2005/0093398 A1 | 5/2005 | Kim et al. | |
| 2005/0134463 A1* | 6/2005 | Yamazaki | 340/572.1 |
| 2005/0162131 A1 | 7/2005 | Sennami et al. | |
| 2005/0254183 A1 | 11/2005 | Ishida et al. | |
| 2006/0009251 A1 | 1/2006 | Noda et al. | |
| 2006/0145853 A1* | 7/2006 | Richards et al. | 340/572.1 |
| 2006/0176153 A1 | 8/2006 | Tang | |
| 2007/0170505 A1 | 7/2007 | Tokunaga | |
| 2007/0216348 A1 | 9/2007 | Shionoiri et al. | |
| 2007/0229228 A1 | 10/2007 | Yamazaki et al. | |
| 2007/0229279 A1 | 10/2007 | Yamazaki et al. | |
| 2007/0278998 A1 | 12/2007 | Koyama | |
| 2007/0285246 A1 | 12/2007 | Koyama | |
| 2010/0245190 A1 | 9/2010 | Koyama et al. | |

FOREIGN PATENT DOCUMENTS

| | | | |
|---|---|---|---|
| JP | 2 292 866 | | 3/1996 |
| JP | 09-044622 | | 2/1997 |
| JP | 10-069533 | | 3/1998 |
| JP | 10-307898 | | 11/1998 |
| JP | 11-091271 A | | 4/1999 |
| JP | 2000-166129 | | 6/2000 |
| JP | 2000-172812 | | 6/2000 |
| JP | 2001-067446 | | 3/2001 |
| JP | 2002-042076 | | 2/2002 |
| JP | 2003/006592 | | 1/2003 |
| JP | 2003-070187 | | 3/2003 |
| JP | 2003-123047 | | 4/2003 |
| JP | 2003-299255 | | 10/2003 |
| JP | 2003-331238 A | | 11/2003 |
| JP | 2004-094488 | | 3/2004 |
| JP | 2004-272719 | | 9/2004 |
| JP | 2004-343410 | | 12/2004 |
| JP | 2005-150022 | | 6/2005 |
| JP | 2005202947 A | * | 7/2005 |
| JP | 2005-316274 | | 11/2005 |
| JP | 2005-316724 | | 11/2005 |
| JP | 2005-323019 | | 11/2005 |
| JP | 2005-340479 | | 12/2005 |
| JP | 2005-352434 | | 12/2005 |
| JP | 2005-354888 | | 12/2005 |
| JP | 2006-004015 | | 1/2006 |
| JP | 2006-503376 | | 1/2006 |
| JP | 2008-306689 | | 12/2008 |
| JP | 2009-021970 | | 1/2009 |
| WO | WO-02/03856 A | | 1/2002 |
| WO | WO 2004/036482 | | 4/2004 |
| WO | WO-2006/025594 | | 3/2006 |

OTHER PUBLICATIONS

Written Opinion (Application No. PCT/JP2007/054607) dated Jun. 12, 2007.

Jeon.Y et al., "Energy Harvesting MEMS Devices Based on $d_{33}$ Mode Piezoelectric Pb(Zr,Ti)O$_3$ Thin Film Cantilever," http://web.mit.edu/micronanosystems/www/Papers/CIRP_Micro-Nano-MIT-F.pdf>, 2006, pp. 1-4, Dept. of Mechanical Engineering Massachusetts Institute of Technology Cambridge.

Search Report (Application No. 07738092.1) Dated Aug. 14, 2009.

European Office Action (Application No. 07738092.1) Dated Dec. 7, 2010.

* cited by examiner

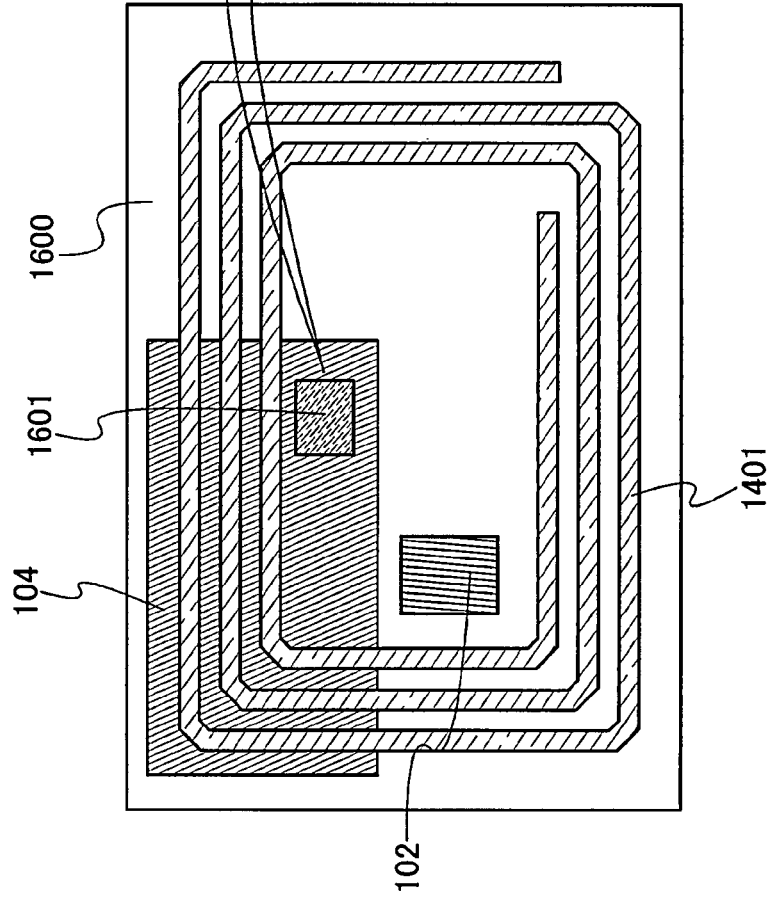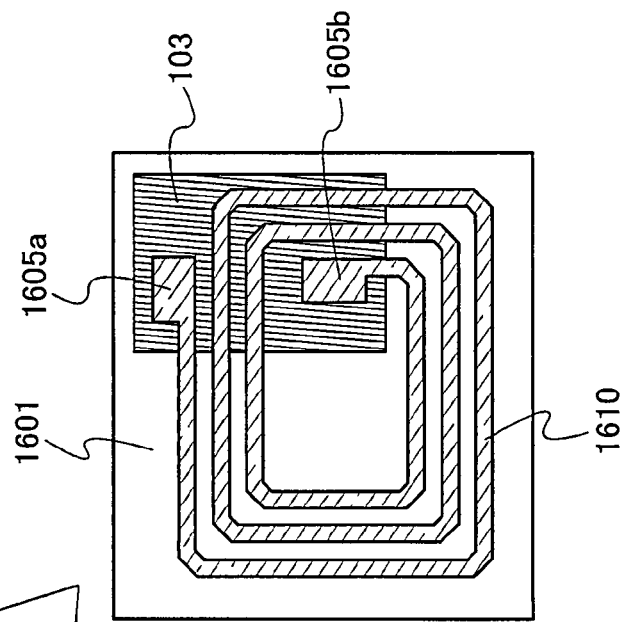

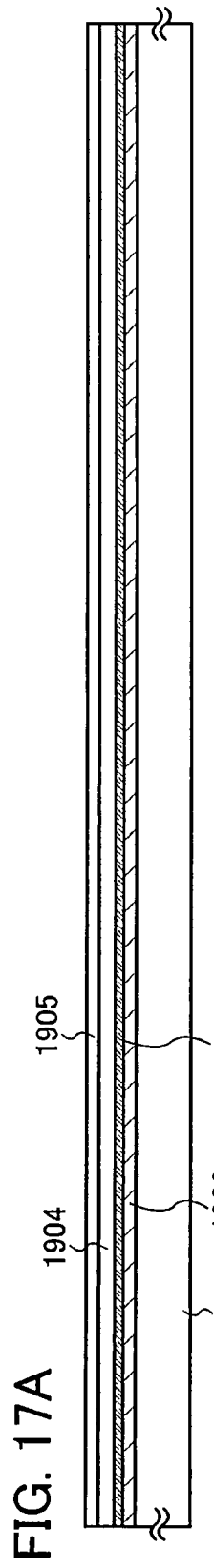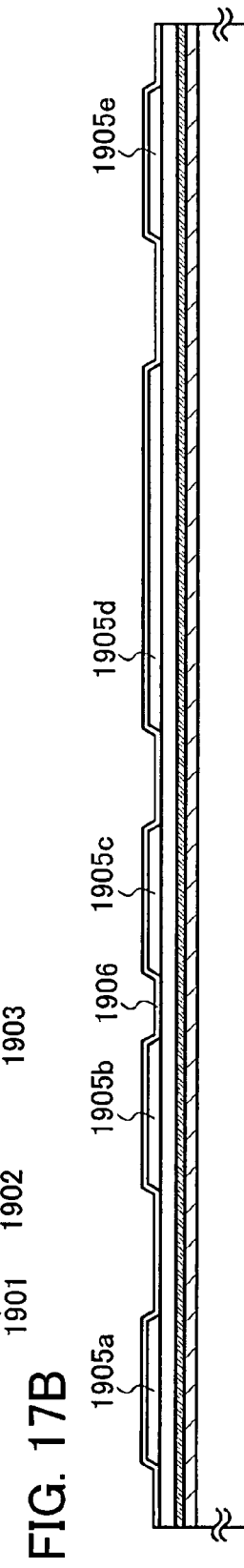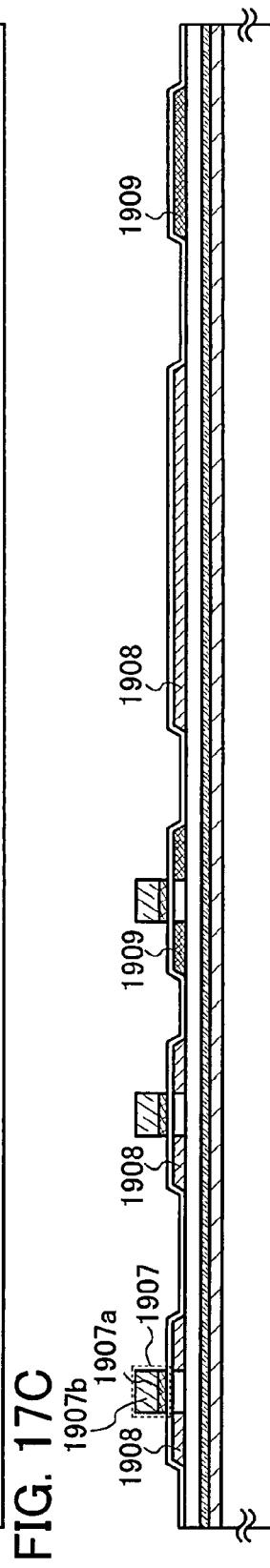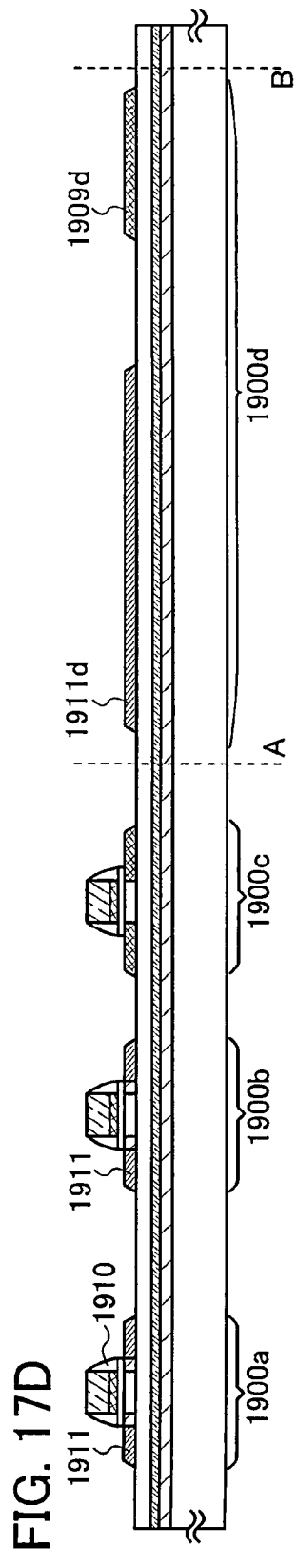

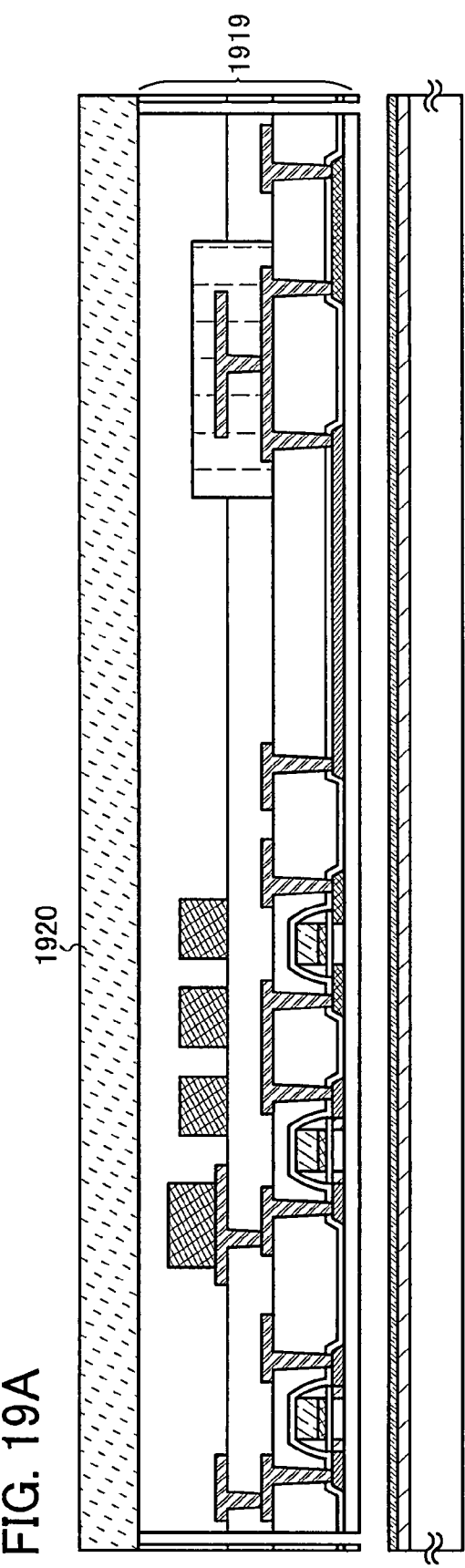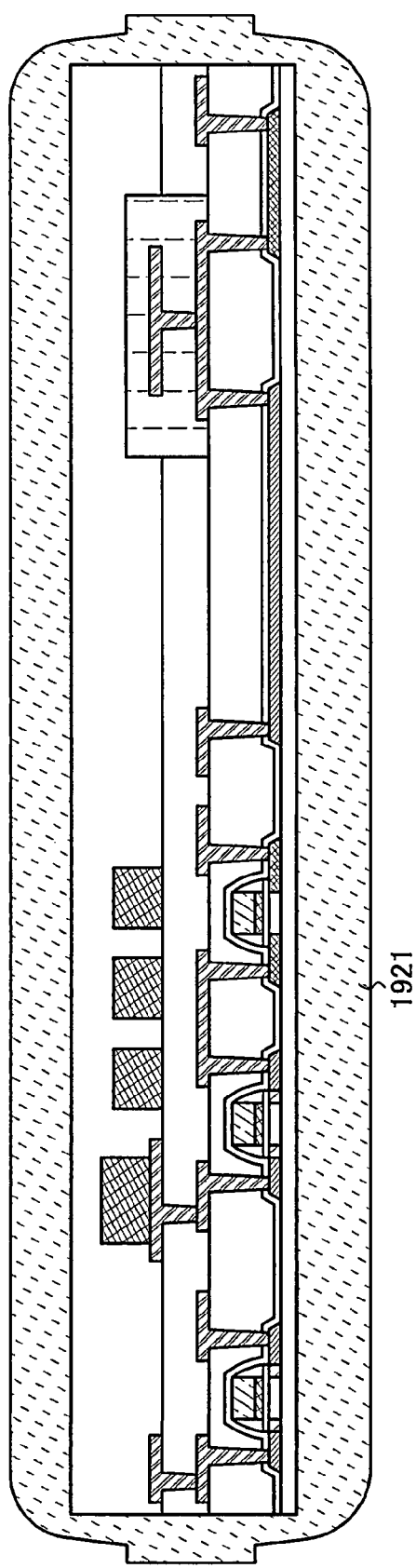
FIG. 19A
FIG. 19B

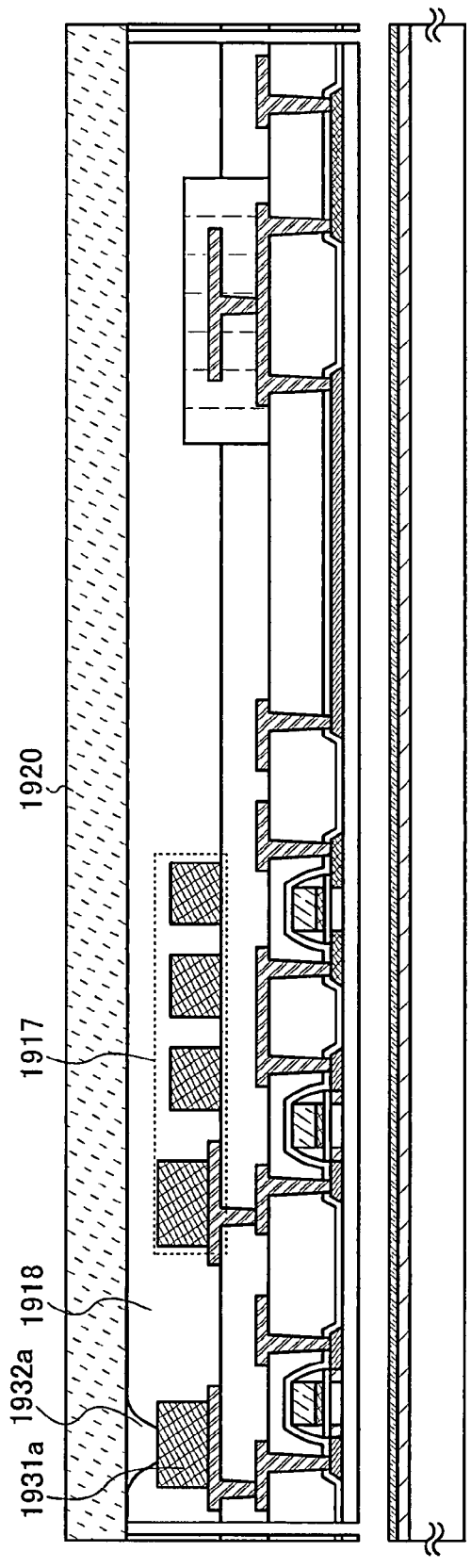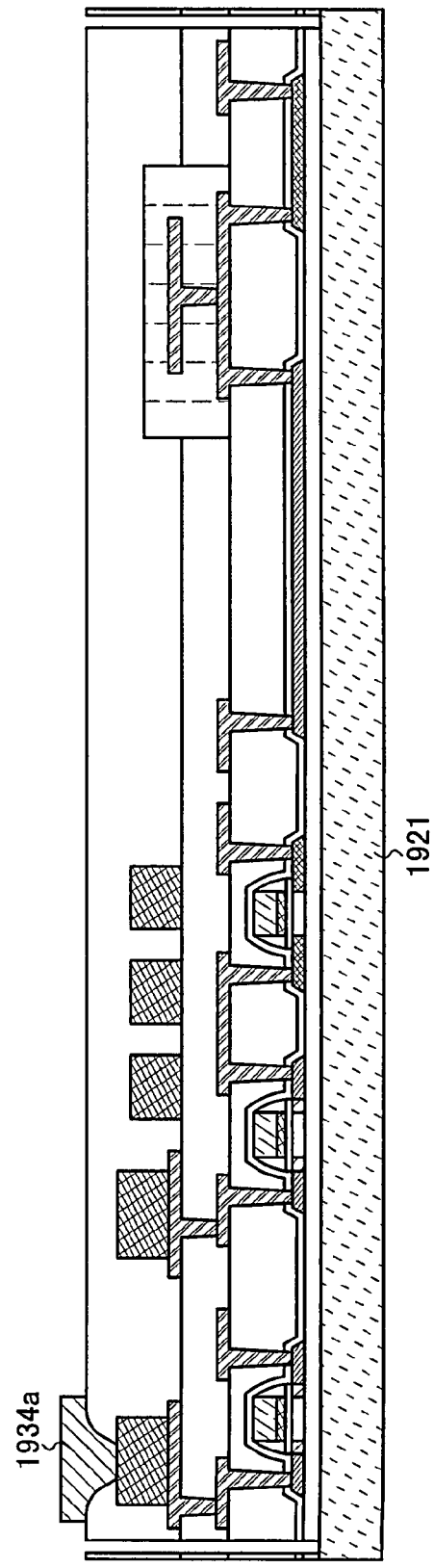
FIG. 20A
FIG. 20B

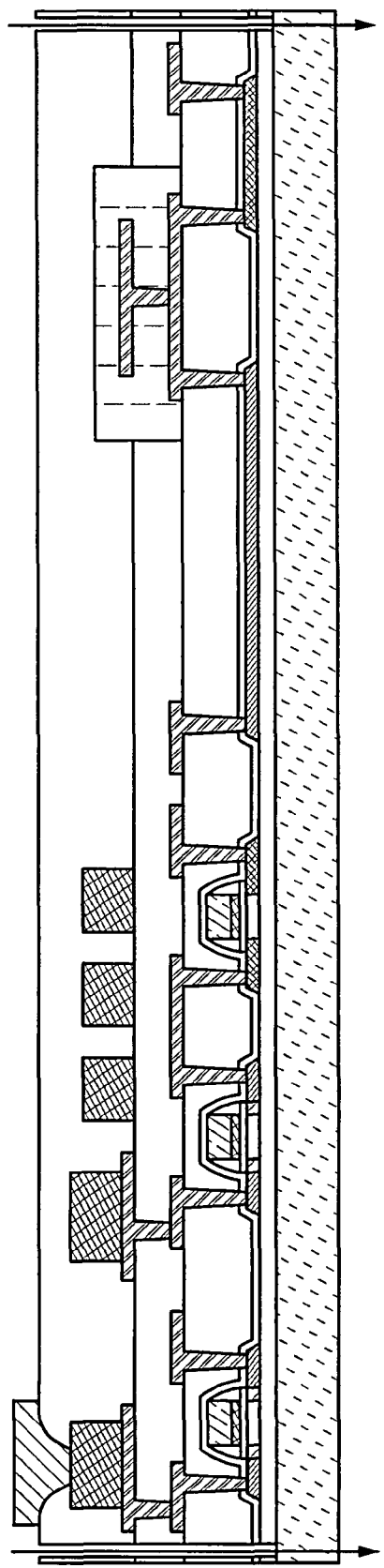
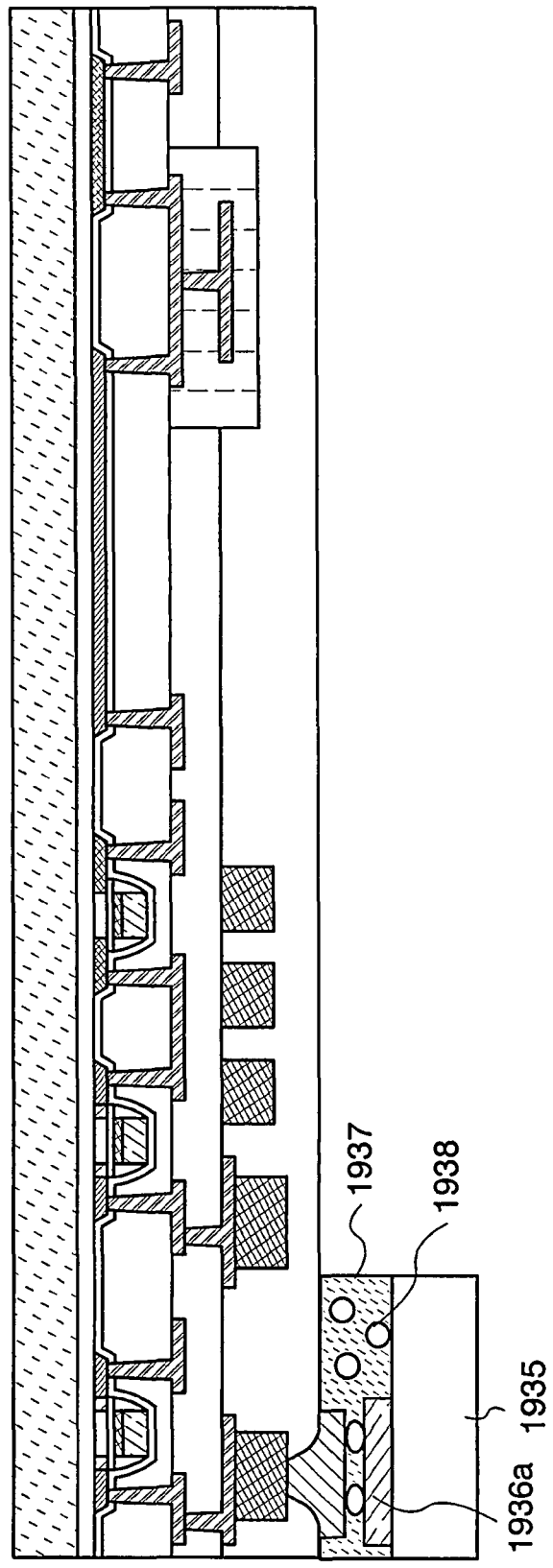
FIG. 21A
FIG. 21B

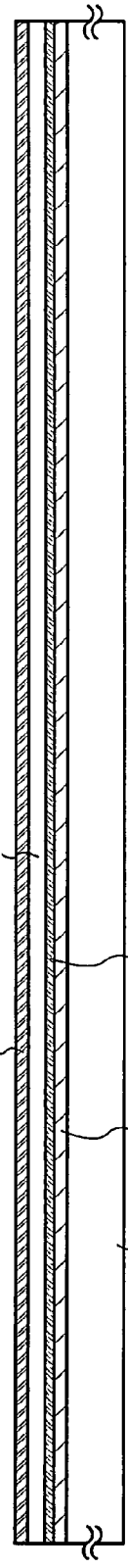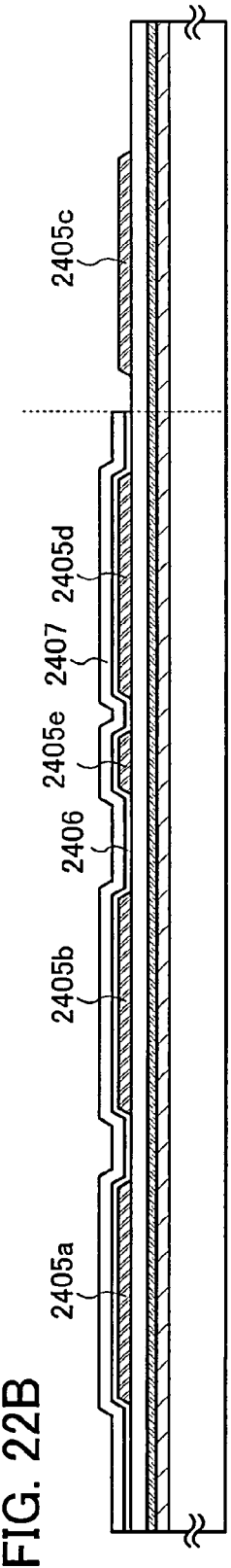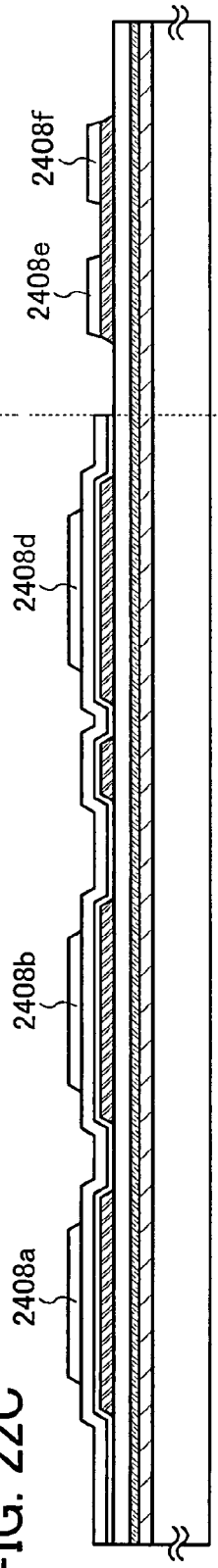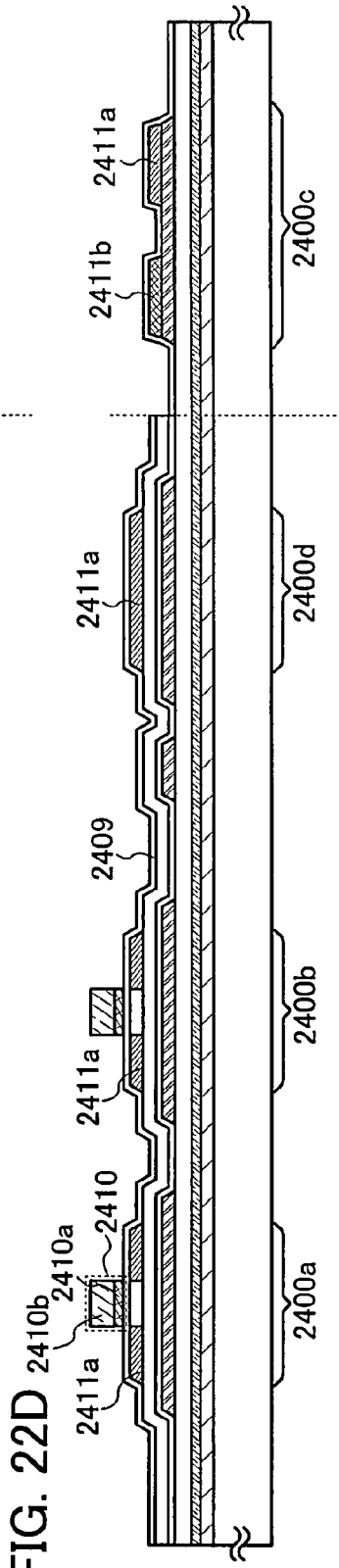

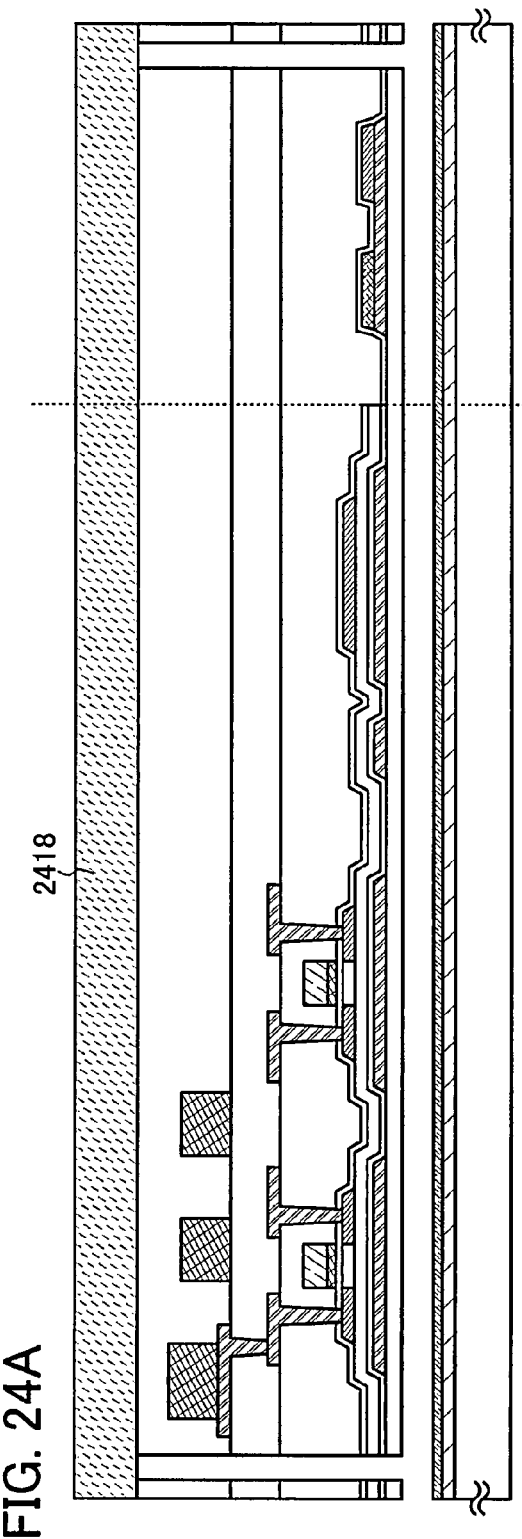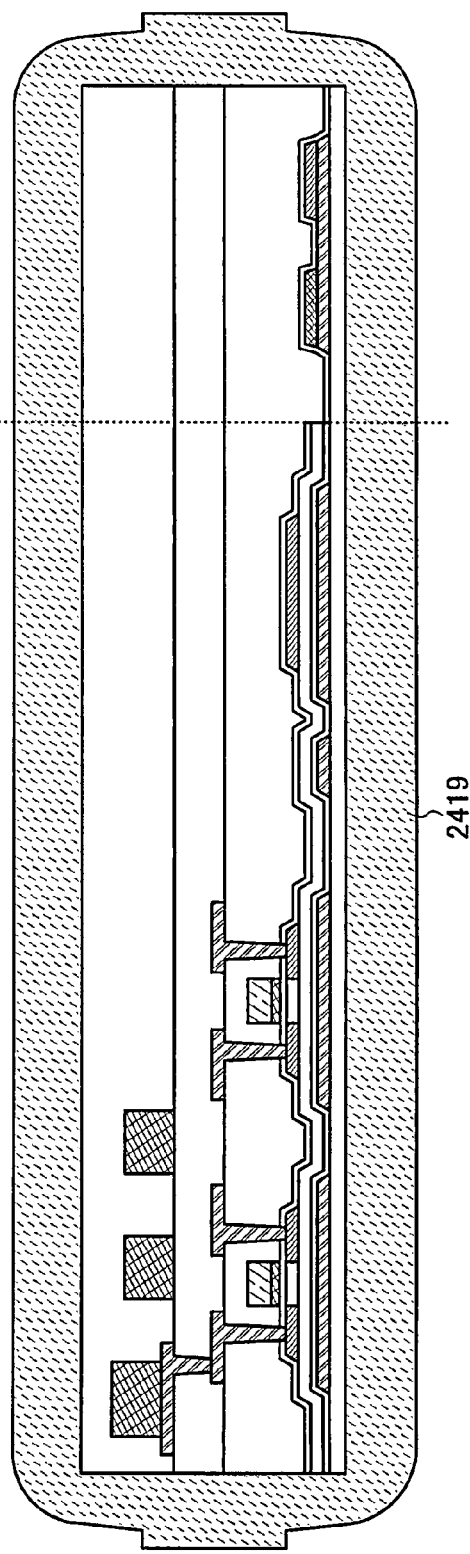
FIG. 24A
FIG. 24B

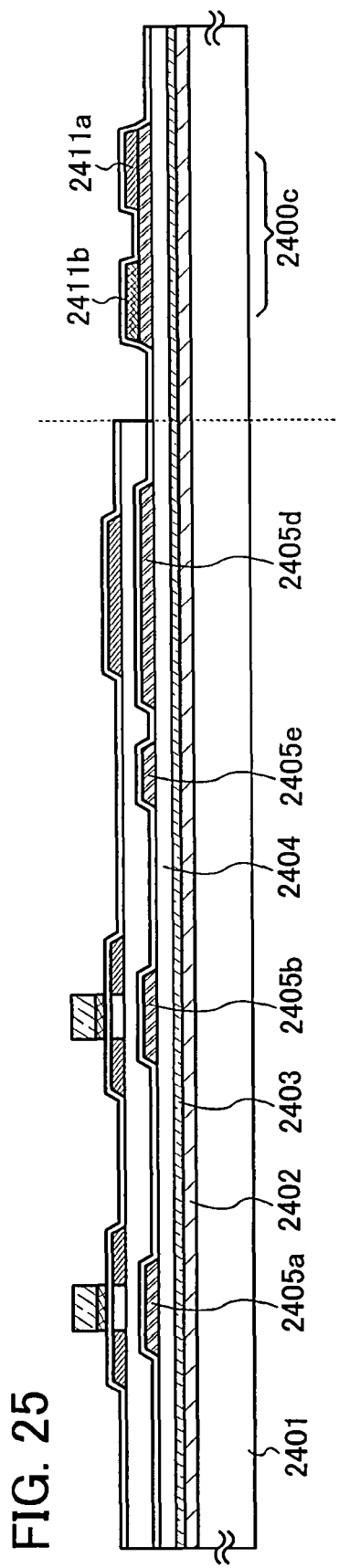

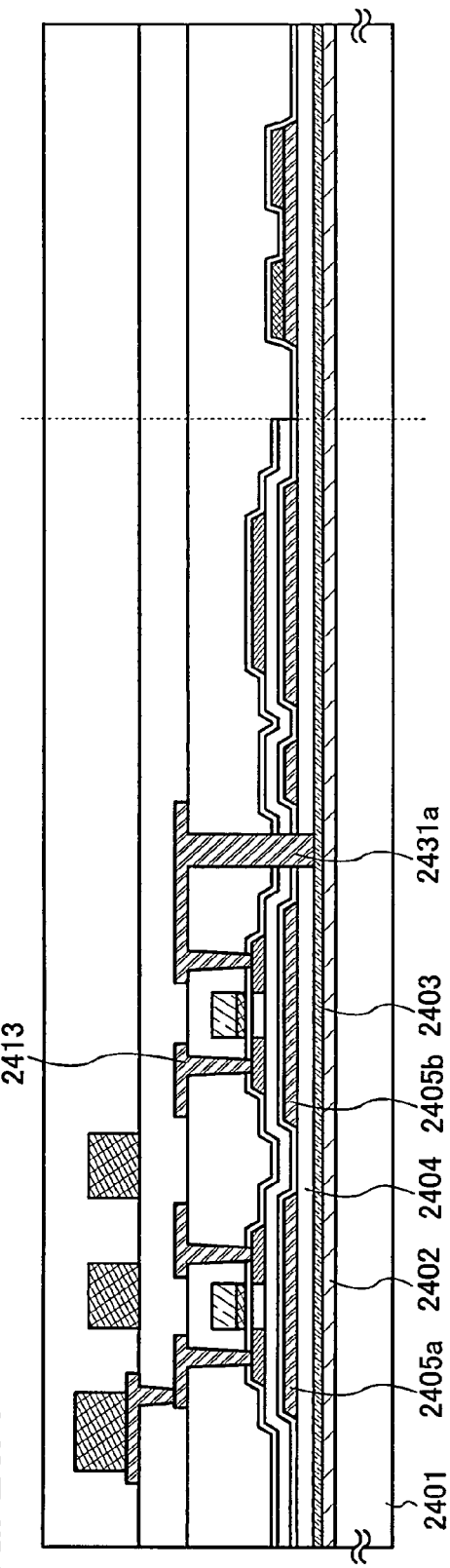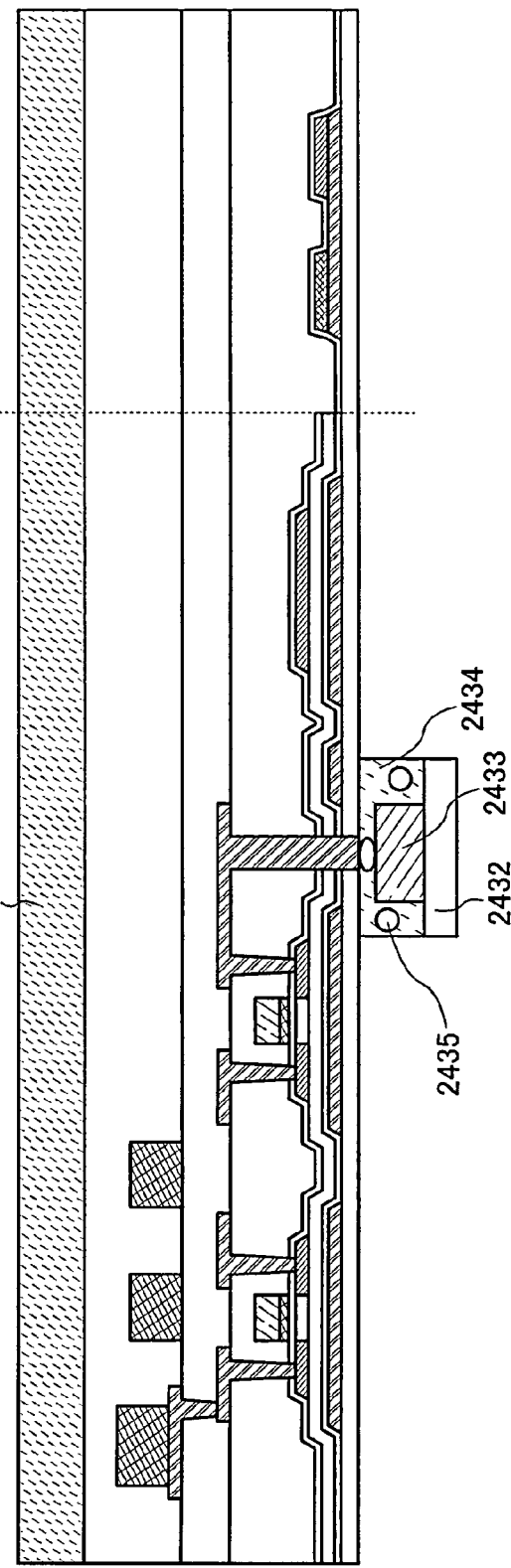
FIG. 26A
FIG. 26B

SEMICONDUCTOR DEVICE

TECHNICAL FIELD

The present invention relates to a semiconductor device. In particular, the present invention relates to a semiconductor device which transmits and receives data through a radio wave and includes a small power generation element. Further, the present invention relates to a communication system using the semiconductor device, and an antenna and a reader/writer which transmit and receive data to and from the semiconductor device.

Note that in this specification, a semiconductor device indicates any device which can function by using semiconductor characteristics.

BACKGROUND ART

Nowadays, an individual identification technology using wireless communication through an electromagnetic field, a radio wave, or the like has attracted attention. In particular, as a semiconductor device which communicates data by wireless communication, an individual identification technology using an RFID (Radio Frequency Identification) tag has attracted attention. An RFID tag (hereinafter simply referred to as an RFID) is also called an IC (Integrated Circuit) tag, an IC chip, an RF tag, a wireless tag, or an electronic tag. The individual identification technology using an RFID has started to help production, management, or the like of an individual object and has been expected to be applied to personal authentication.

RFIDs are divided into two types: an active type RFID which can transmit a radio wave or an electromagnetic wave containing information on the RFID and a passive type RFID which is driven using electric power of an external radio wave or electromagnetic wave (carrier wave), depending on whether it incorporates a power supply or it is supplied with electric power externally (as for an active type RFID, see Patent Document 1, and as for a passive type RFID, see Patent Document 2). An active type RFID incorporates a power supply for driving the RFID and includes a cell as the power supply. In a passive type RFID, an electric power for driving the RFID is made by using an external radio wave or electromagnetic wave (carrier wave), and a structure where a cell is not provided is realized.

FIG. 29 is a block diagram showing a specific structure of an active type RFID. In an active type RFID 3100 of FIG. 29, a communication signal received by an antenna circuit 3101 is input to a demodulation circuit 3105 and an amplifier 3106 in a signal processing circuit 3102. Normally, the communication signal is transmitted after processing such as ASK modulation or PSL modulation is performed on a carrier of 13.56 MHz, 915 MHz, or the like. Note that FIG. 29 shows an example where 13.56 MHz is used for the communication signal. In FIG. 29, a clock signal is required as a reference in order to process a signal. Here, the carrier of 13.56 MHz is used as a clock. The carrier of 13.56 MHz is amplified by the amplifier 3106 and then supplied to a logic circuit 3107 as a clock. Further, the communication signal which has been ASK modulated or PSK modulated is demodulated by the demodulation circuit 3105. The demodulated signal is also transmitted to the logic circuit 3107 and analyzed. The signal analyzed by the logic circuit 3107 is transmitted to a memory control circuit 3108, and based on the signal, the memory control circuit 3108 controls a memory circuit 3109 and retrieves data stored in the memory circuit 3109 to transmit the data to a logic circuit 3110. The signal transmitted to the logic circuit 3110 is encoded by the logic circuit 3110, and subsequently amplified by an amplifier 3111. A modulation circuit 3112 modulates the carrier in accordance with the signal. A power supply in FIG. 29 is supplied by a cell 3103 provided outside the signal processing circuit 3102 through a power supply circuit 3104. The power supply circuit 3104 supplies an electric power to the amplifier 3106, the demodulation circuit 3105, the logic circuit 3107, the memory control circuit 3108, the memory circuit 3109, the logic circuit 3110, the amplifier 3111, the modulation circuit 3112, and the like. In this manner, the active type RFID operates.

FIG. 30 is a block diagram showing a specific structure of a passive type RFID. In a passive type RFID 3200 of FIG. 30, a communication signal received by an antenna circuit 3201 is input to a demodulation circuit 3205 and an amplifier 3206 in a signal processing circuit 3202. Normally, the communication signal is transmitted after processing such as ASK modulation or PSL modulation is performed on a carrier of 13.56 MHz, 915 MHz, or the like. FIG. 30 shows an example where 13.56 MHz is used for the communication signal. In FIG. 30, a clock signal is required as a reference in order to process a signal. Here, the carrier of 13.56 MHz is used as a clock. The carrier of 13.56 MHz is amplified by the amplifier 3206 and then supplied to a logic circuit 3207 as a clock. Further, the communication signal which has been ASK modulated or PSK modulated is demodulated by the demodulation circuit 3205. The demodulated signal is also transmitted to the logic circuit 3207 and analyzed. The signal analyzed by the logic circuit 3207 is transmitted to a memory control circuit 3208, and based on the signal, the memory control circuit 3208 controls a memory circuit 3209 and retrieves data stored in the memory circuit 3209 to transmit the data to a logic circuit 3210. The signal transmitted to the logic circuit 3210 is encoded by the logic circuit 3210, and subsequently amplified by an amplifier 3211. A modulation circuit 3212 modulates the carrier in accordance with the signal. On the other hand, the communication signal transmitted to a rectifier circuit 3203 is rectified and then input to a power supply circuit 3204. The power supply circuit 3204 supplies an electric power to the amplifier 3206, the demodulation circuit 3205, the logic circuit 3207, the memory control circuit 3208, the memory circuit 3209, the logic circuit 3210, the amplifier 3211, the modulation circuit 3212, and the like. In this manner, the passive type RFID operates.

[Patent Document 1]
 Japanese Published Patent Publication No. 2005-316724
[Patent Document 2]
 Japanese Translation of PCT International Application No. 2006-503376

DISCLOSURE OF INVENTION

However, as shown in FIG. 29, in a case of a semiconductor device including an active type RFID provided with a cell for driving, there has been a problem in that the cell is used up over time in accordance with transmission and reception of individual information or setting of intensity of a radio wave required for transmission and reception of individual information, and finally, an electronic power required for transmission and reception of individual information cannot be generated. Consequently, there has been a problem in that a check of remaining capacity of the cell and a change of the cell are required in order to continuously use the semiconductor device including the active type RFID provided with the cell for driving.

In addition, as shown in FIG. 30, in a case of a semiconductor device including a passive type RFID in which electric power for driving is made by using an external radio wave or electromagnetic wave (carrier wave), there has been a problem in that it is difficult to secure electric power required for transmission and reception of a long-distance signal and for transmitting an electric wave required for transmission and reception; therefore, it is difficult to obtain a favorable transmission/reception state. Consequently, there has been a problem in that the semiconductor device including the passive type RFID in which the power supply for driving is made by using electric power from an external radio wave or electromagnetic wave (carrier wave) can be used only within a short distance from an antenna of a reader/writer, which is a power supply unit capable of supplying enough an electric power from an external radio wave or electromagnetic wave (carrier wave).

In view of the foregoing problems, objects of the invention are to provide a semiconductor device including an RFID, which can transmit and receive individual information without a check of remaining capacity of the cell and a change of the cell in accordance with deterioration over time of the cell for a driving power supply, and which can keep a favorable transmission/reception state even when an electric power from an external radio wave or electromagnetic wave (carrier wave), as a power supply for driving, is not sufficient.

One feature of the invention is a semiconductor device which includes a power generation element, an antenna circuit, a signal processing circuit and a battery. The antenna circuit receives a first signal and transmits a second signal for transmitting data stored in the signal processing circuit. In the battery, an electric power generated by the power generation element is charged. and the battery supplies an electric power to the signal processing circuit.

Another feature of the invention is a semiconductor device which includes a power generation element, an antenna circuit, a signal processing circuit and a battery. The power generation element includes a microstructure having a three-dimensional structure. The antenna circuit receives a first signal and transmits a second signal for transmitting data stored in the signal processing circuit. In the battery, an electric power generated by the power generation element is charged and the battery supplies an electric power to the signal processing circuit.

Another feature of the invention is a semiconductor device which includes a power generation element, an antenna circuit, a signal processing circuit, a battery and a booster antenna. The antenna circuit receives through the booster antenna a first signal for transmitting data stored in the signal processing circuit and transmits through the booster antenna a second signal. In the battery, an electric power generated by the power generation element is charged and the battery supplies an electric power to the signal processing circuit.

Another feature of the invention is a semiconductor device which includes a power generation element, an antenna circuit, a signal processing circuit, a battery and a booster antenna. The power generation element includes a microstructure having a three-dimensional structure. The antenna circuit receives through the booster antenna a first signal for transmitting data stored in the signal processing circuit and transmits through the booster antenna a second signal. In the battery, an electric power obtained by the power generation element is charged and the battery supplies an electric power to the signal processing circuit.

In the above structures, the power generation element, the antenna circuit, the signal processing circuit and the battery and the booster antenna can be formed over a substrate. The antenna circuit can receive from and transmit to a reader/writer the first signal and the second signal. Any one of a thermoelectric element, a piezoelectric element, and an element utilizing electromagnetic induction can be used for the power generation element.

In addition, a lithium ion battery, a nickel-hydrogen battery, a nickel-cadmium battery, a capacitor, or the like can be used for the battery.

A semiconductor device of the invention includes the battery and the power generation element. Therefore, power shortage in accordance with deterioration of the battery over time, which occurs in a conventional active type RFID, can be prevented. Further, in a semiconductor device of the invention, an electric power can be supplied to the battery from the power generation element; therefore, the semiconductor device can be used continuously without a check of remaining capacity of the battery and a change of the battery. In addition, since electric power for driving the RFID is held in the battery, electric power sufficient to drive the RFID can be obtained and a communication range with the reader/writer can be increased.

BRIEF DESCRIPTION OF DRAWINGS

FIGS. 16A and 16B are views showing a structure of a semiconductor device in Embodiment Mode 2.

FIGS. 17A to 17D are views showing a structure of a semiconductor device in Embodiment Mode 3.

FIGS. 19A and 19B are views showing a structure of a semiconductor device in Embodiment Mode 3.

FIGS. 20A and 20B are views showing a structure of a semiconductor device in Embodiment Mode 3.

FIGS. 21A and 21B are views showing a structure of a semiconductor device in Embodiment Mode 3.

FIGS. 22A to 22D are views showing a structure of a semiconductor device in Embodiment Mode 4.

FIGS. 24A and 24B are a view showing a structure of a semiconductor device in Embodiment Mode 4.

FIG. 25 is a view showing a structure of a semiconductor device in Embodiment Mode 4.

FIGS. 26A and 26B are views showing a structure of a semiconductor device in Embodiment Mode 4.

BEST MODE FOR CARRYING OUT THE INVENTION

Figure 1:
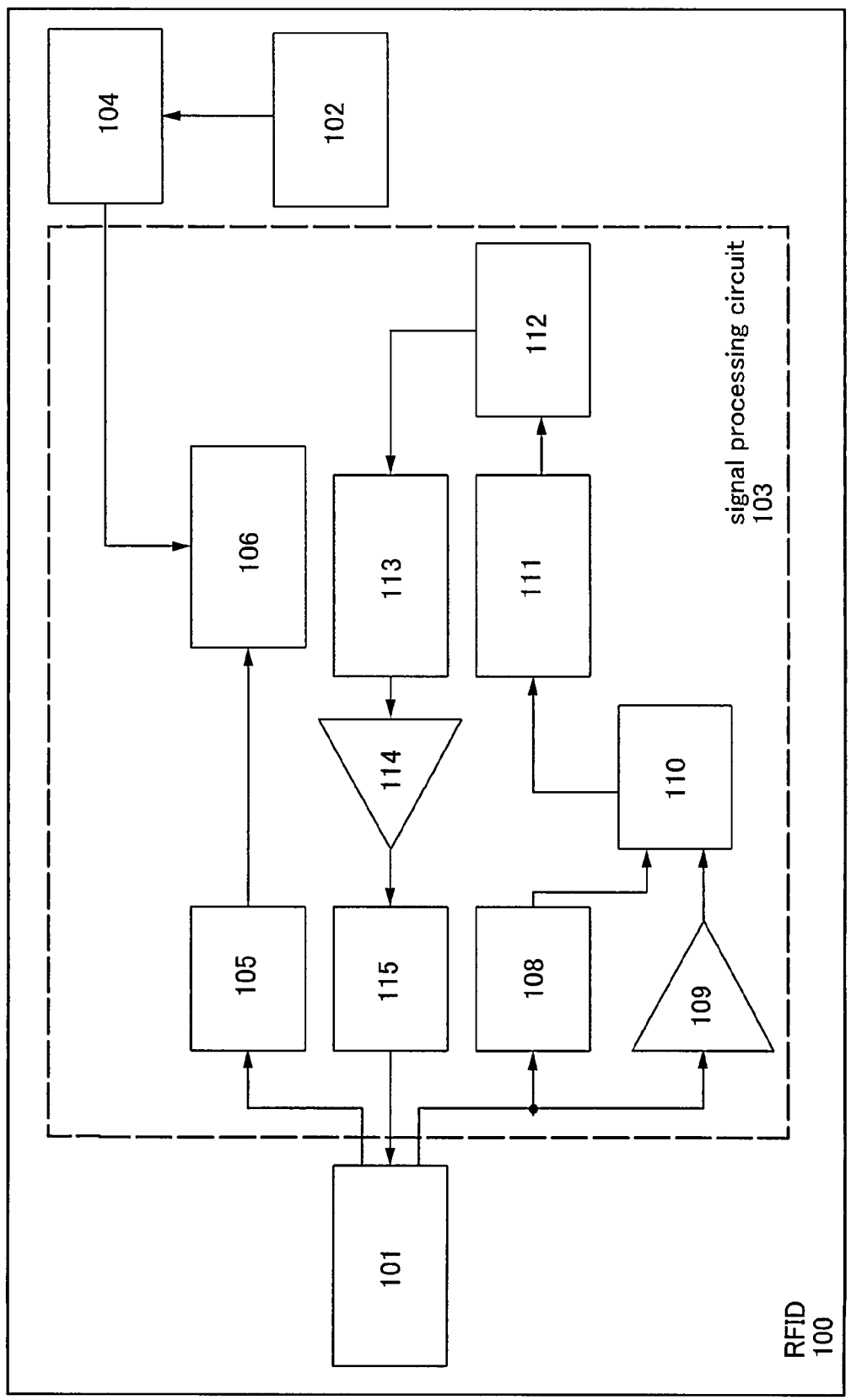
FIG. 1 is a diagram showing a structure of a semiconductor device in Embodiment Mode 1.

Hereinafter, embodiment modes and an embodiment of the invention are described with reference to drawings. However, the invention can be embodied in many different modes and it is easily understood by those skilled in the art that the mode and detail can be variously changed without departing from the scope and the spirit of the invention. Therefore, the invention is not construed as being limited to description of the embodiment modes and the embodiment. Note that in a structure of the invention described hereinafter, reference numerals and symbols indicating the same things are used in common in the different drawings.

[Embodiment Mode 1]

Figure 2:
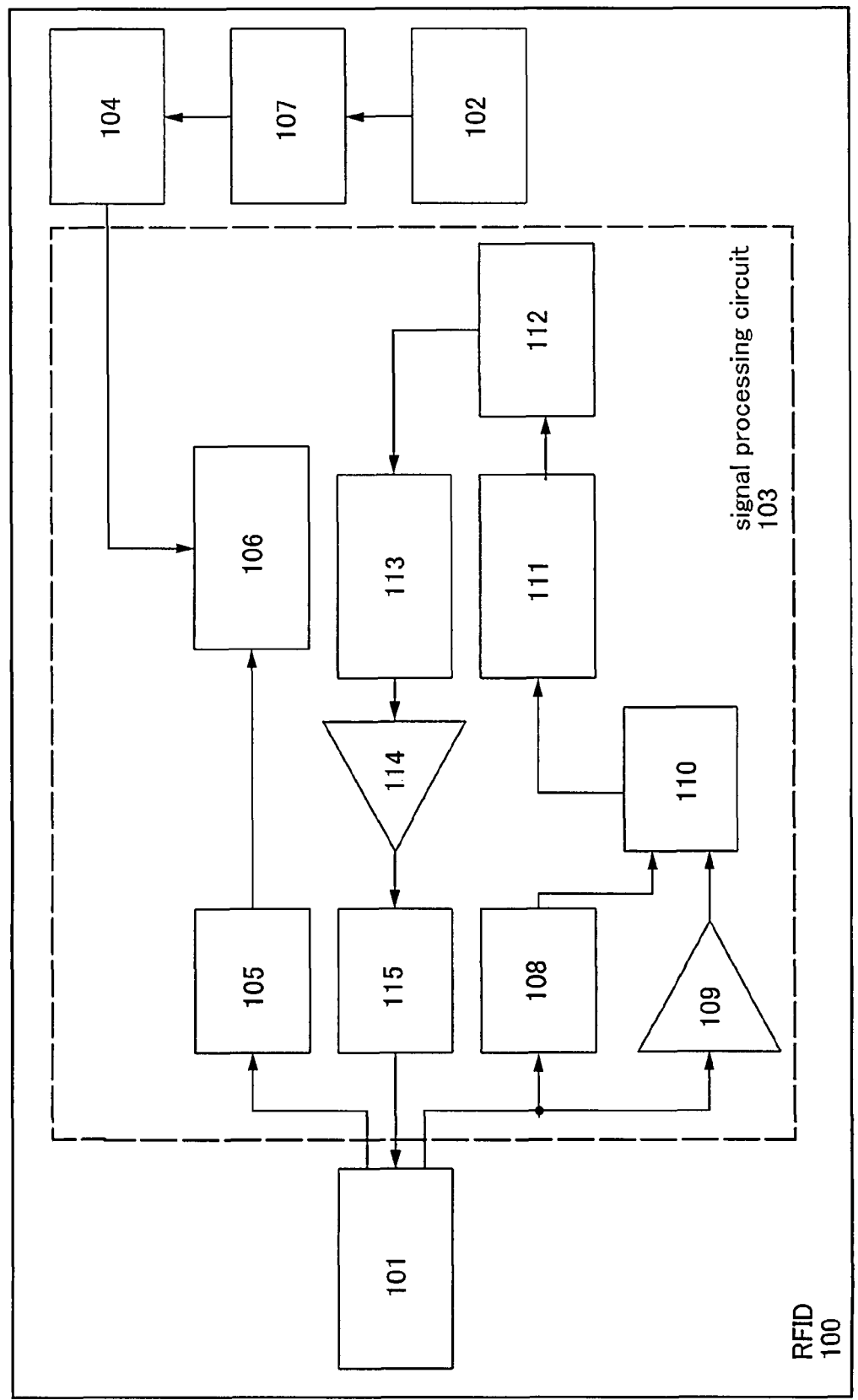
FIG. 2 is a diagram showing a structure of a semiconductor device in Embodiment Mode 1.

A semiconductor device used for an RFID of the invention is described using block diagrams shown in FIGS. 1 and 2.

An RFID 100 in FIG. 1 includes an antenna circuit 101, a power generation element 102, a signal processing circuit 103, and a battery 104. The signal processing circuit 103 includes a rectifier circuit 105, a power supply circuit 106, a demodulation circuit 108, an amplifier 109, a logic circuit 110, a memory control circuit 111, a memory circuit 112, a logic circuit 113, an amplifier 114, and a modulation circuit 115. Electric power obtained by the power generation element 102 is input to the battery 104, and is supplied to the power supply circuit 106 from the battery 104 as appropriate.

When the electric power obtained by the power generation element 102 is an alternating-current voltage, as shown in FIG. 2, the obtained alternating-current voltage is converted to a direct-current voltage through a rectifier circuit 107, and subsequently input to the battery 104, and an electric power is supplied to the power supply circuit 106 from the battery 104 as appropriate.

Figure 3A:
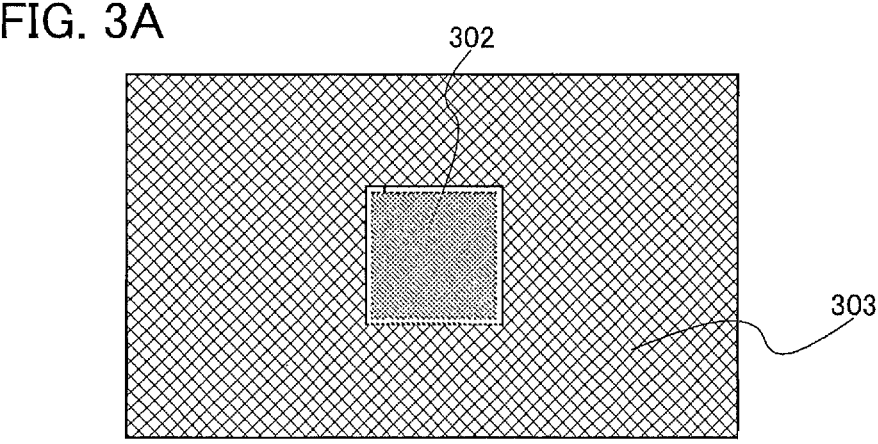
FIGS. 3A to 3E are views showing a structure of a semiconductor device in Embodiment Mode 1.
Figure 3B:
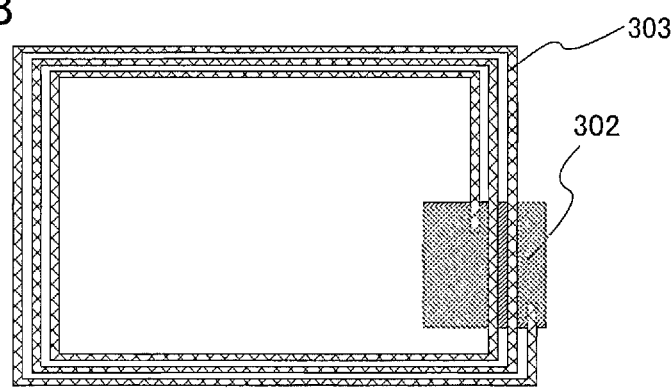
Figure 3C:
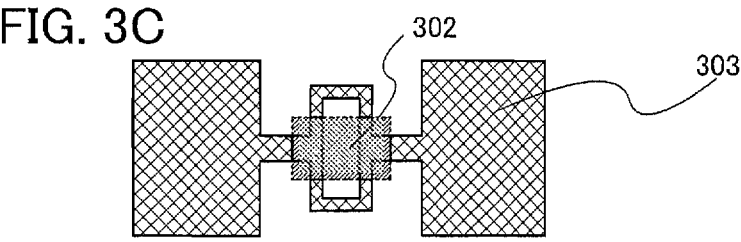
Figure 3D:
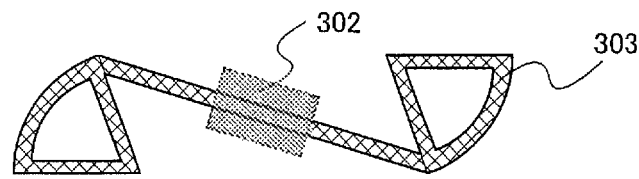
Figure 3E:
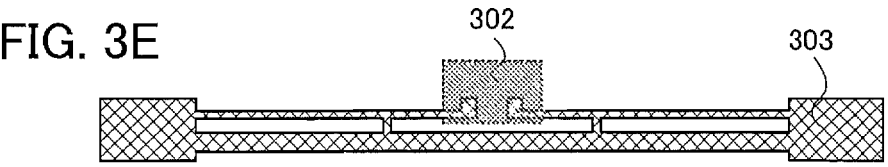

Note that a shape of an antenna in the antenna circuit 101 is not specifically limited. As a signal transmission method applied to the antenna circuit 101 in the RFID 100, an electromagnetic coupling method, an electromagnetic induction method, a radio wave method, or the like can be used, and an antenna with an optimum shape and length may be provided in accordance with an adopted transmission method. For example, as shown in FIG. 3A, a structure where an antenna 303 which extends outside a signal processing circuit 302 over a substrate is provided may be employed. As shown in FIG. 3B, the coiled antenna 303 which is connected to the signal processing circuit 302 over a substrate may be employed. Alternatively, as shown in FIG. 3C, a structure where a shape of the antenna 303 is for receiving a high-frequency electromagnetic wave with respect to the signal processing circuit 302 over the substrate may be employed. Alternatively, as shown in FIG. 3D, a structure where the 180° omnidirectional (capable of receiving signals in any directions) antenna 303 is formed with respect to the signal processing circuit 302 over the substrate may be employed. Further alternatively, as shown in FIG. 3E, a structure where the antenna 303 extended to be long in a stick shape is formed with respect to the signal processing circuit 302 over the substrate may be employed. In addition, a connection between the signal processing circuit and the antenna in the antenna circuit is not specifically limited. For example, a method in which the antenna 303 and the signal processing circuit 302 are connected by wire bonding or bump bonding, or a method in which a whole surface of the signal processing circuit 302 made into a chip, is to be an electrode and attached to the antenna 303 may be applied. An ACF (Anisotropic Conductive Film) can be used to attach the signal processing circuit 302 and the antenna 303. Further, when a radio wave method using FIGS. 3A and 3C to 3E, or the like is adopted, an appropriate length required for the antenna varies depending on frequency for receiving a signal. In general, the length is preferably a submultiple of a wavelength. For example, when the frequency is 2.45 GHz, the length of the antenna may be approximately 60 mm (½ wavelength) and approximately 30 mm (¼ wavelength).

Figure 4A:
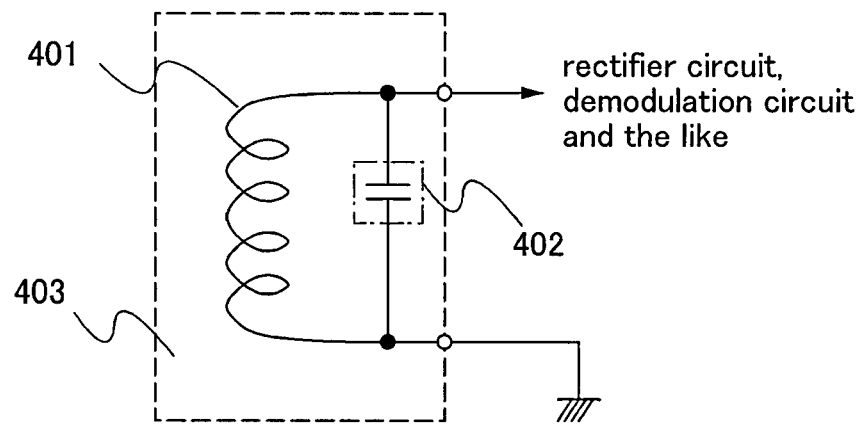
FIGS. 4A and 4B are diagrams showing a structure of a semiconductor device in Embodiment Mode 1.

In this embodiment mode, the shape of FIG. 3B is applied to the antenna circuit 301. Here, as shown in FIG. 4A, the antenna circuit 101 includes an antenna 401 and a resonant capacitor 402, and the antenna 401 and the resonant capacitor 402 correspond to an antenna circuit 403.

Figure 4B:
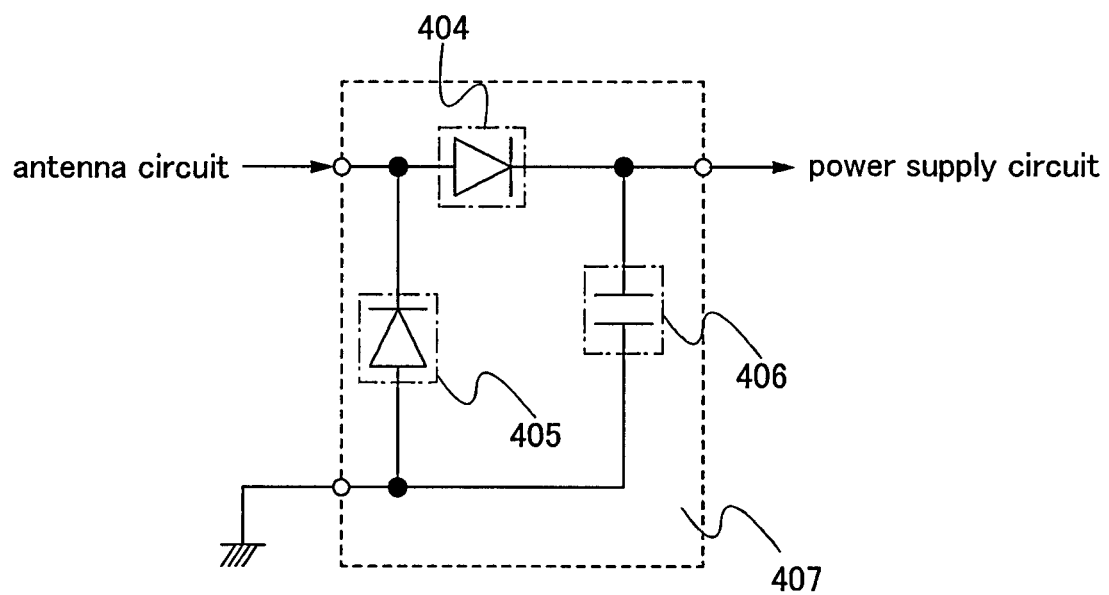

Any circuit may be applied to the rectifier circuit 105 as long as it converts to a direct-current signal an alternating-current signal induced by an electromagnetic wave received by the antenna circuit 101. For example, as shown in FIG. 4B, a rectifier circuit 407 may include diodes 404 and 405, and a smoothing capacitor 406. Note that the rectifier circuit 107 in FIG. 2 may be similar to the rectifier circuit 105.

A reader/writer is used for transmission and reception of signals between the RFID 100 and the outside. The reader/writer is described with reference to FIG. 5. A reader/writer 500 in FIG. 5 includes a receiving portion 501, a transmitting portion 502, a control portion 503, an interface portion 504, and an antenna circuit 505. By control of a high-level device 506 through the interface portion 504, the control portion 503 controls the receiving portion 501 and the transmitting portion 502 with regard to a data processing instruction and a data processing result. The transmitting portion 502 modulates a data processing instruction to be transmitted to the RFID 100, and outputs it as an electromagnetic wave from the antenna circuit 505. The receiving portion 501 demodulates a signal received by the antenna circuit 505, and outputs it as a data processing result to the control portion 503.

Figure 5:
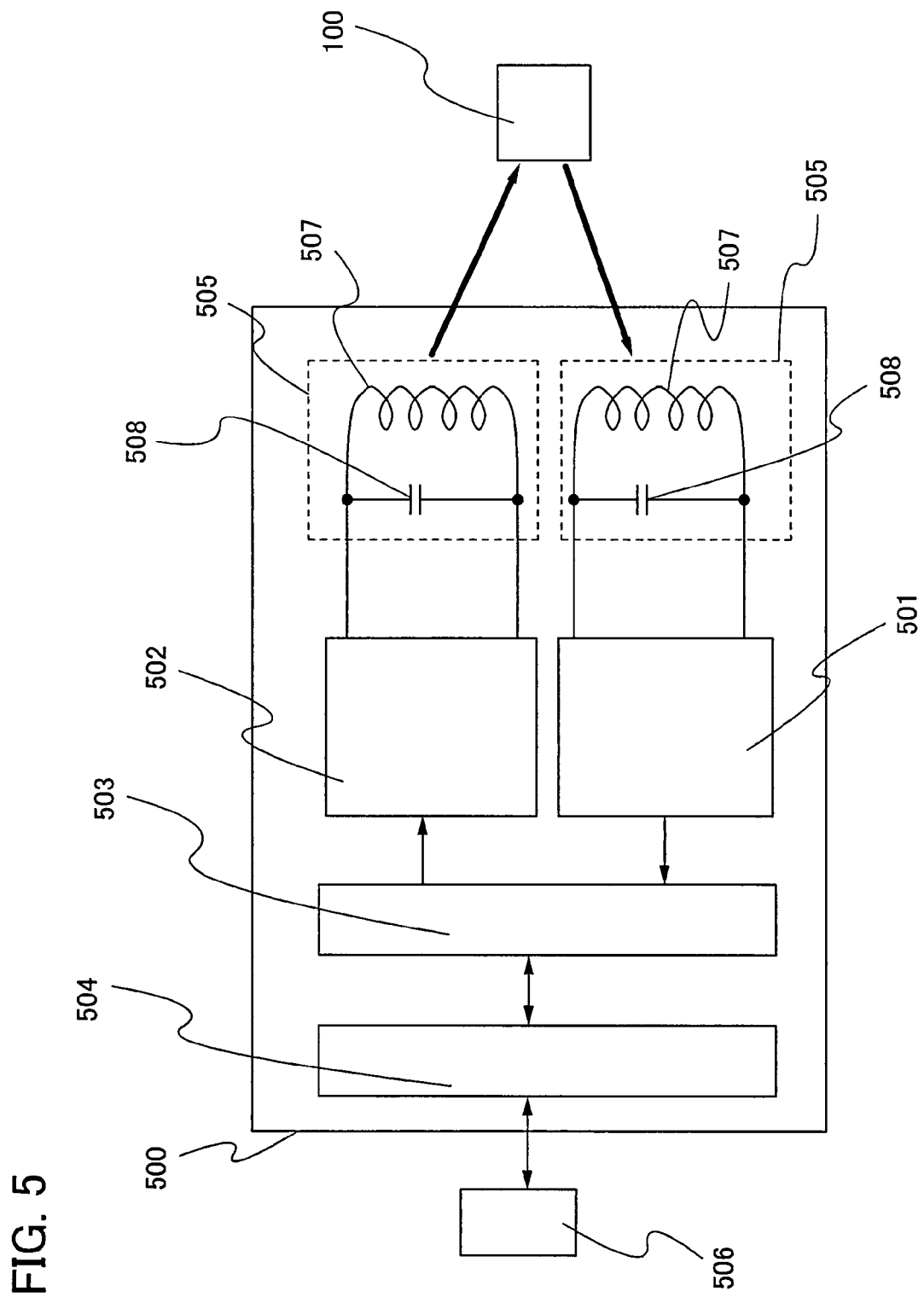
FIG. 5 is a view showing a structure of a semiconductor device in Embodiment Mode 1.

In this embodiment mode, the antenna circuit 505 of the reader/writer 500 shown in FIG. 5 is connected to the receiving portion 501 and the transmitting portion 502, and includes an antenna 507 and a resonant capacitor 508 which form an LC parallel resonant circuit. The antenna circuit 505 receives, as an electric signal, an electromotive force which is induced to the antenna circuit 505 by a signal output from the RFID 100. Further, the antenna circuit 505 is supplied with an induced current to transmit a signal to the RFID 100.

Note that in FIGS. 1 and 2, the antenna circuit 101 and the signal processing circuit 103 may be formed over the same substrate, or the antenna circuit 101 may be provided as an external antenna.

Note that a signal transmitted and received between the antenna circuit 101 and the reader/writer has a frequency of 125 kHz, 13.56 MHz, 915 MHz, 2.45 GHz, or the like, which is prescribed by the ISO standard or the like. Needless to say, frequency of the signal transmitted and received between the antenna circuit 101 and the reader/writer is not limited thereto, and for example, any of the following can be employed: a submillimeter wave of 300 GHz to 3 THz, a millimeter wave of 30 to 300 GHz, a microwave of 3 to 30 GHz, an ultra high frequency of 300 MHz to 3 GHz, a very high frequency of 30 to 300 MHz, a short wave of 3 to 30 MHz, a medium wave of 300 KHz to 3 MHz, a long wave of 30 to 300 KHz, and an ultra long wave of 3 to 30 KHz. In addition, the signal transmitted and received between the antenna circuit 101 and the reader/writer is a signal obtained by modulating a carrier wave. A carrier wave may be modulated by analog modulation or digital modulation, and any of amplitude modulation, phase modulation, frequency modulation, and spread spectrum may be employed. It is preferable that the amplitude modulation or the frequency modulation be used.

Similarly to the passive type RFID described in Background Art, an electric power obtained from a signal of the carrier wave through the rectifier circuit 105 and an electric power from the battery 104 are supplied to the power supply circuit 106 in FIGS. 1 and 2. The electric power charged in the battery 104 is effective since it can be supplied to the power supply circuit 106 when enough electric power cannot be obtained from the antenna circuit 101 of the RFID 100 because of an extension of a communication range or the like.

An example of the power supply circuit 106 in FIGS. 1 and 2 is described with reference to FIG. 6. The power supply circuit includes a reference voltage circuit and a buffer amplifier. The reference voltage circuit includes a resistor 1001 and diode-connected transistors 1002 and 1003, and generates a reference voltage which corresponds to two VGS of the transistor. The buffer amplifier includes a differential circuit including transistors 1005 and 1006, a current mirror circuit including transistors 1007 and 1008, and a common source amplifier including a resistor 1004 for supplying a current, a transistor 1009, and a resistor 1010.

Figure 6:
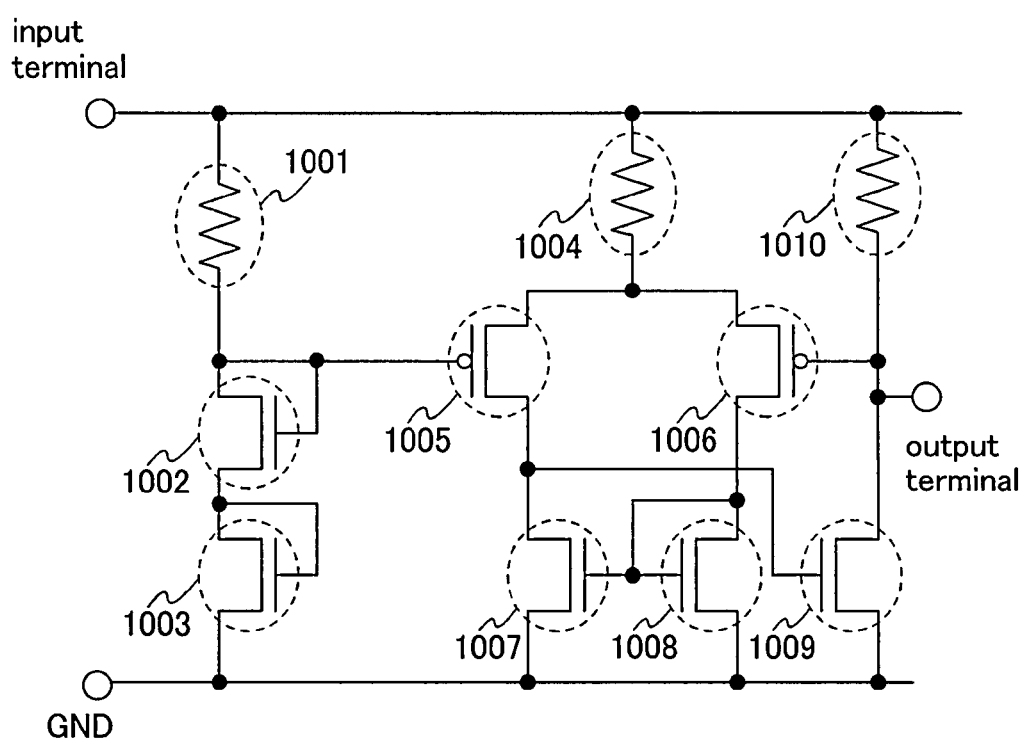
FIG. 6 is a diagram showing a structure of a semiconductor device in Embodiment Mode 1.

In the power supply circuit shown in FIG. 6, when a large current flows from an output terminal, a current flowing to the transistor 1009 is reduced; while when a small current flows from the output terminal, a current flowing to the transistor 1009 is increased; and an approximately constant current flows to the resistor 1010. Further, a potential of the output terminal has almost the same value as that of the reference voltage circuit. Although the power supply circuit including the reference voltage circuit and the buffer amplifier is shown here, the power supply circuit used for the invention is not limited to that of FIG. 6, and circuits having other structures may be employed.

Note that in this specification, a battery is a cell of which can store continuous operating time by being charged. As a battery, a sheet-shaped battery is preferably used, and for example, reduction in size can be achieved by using a lithium polymer battery utilizing a gel-like electrolyte, a lithium ion battery, a lithium secondary battery, or the like. Needless to say, any battery which can be charged may be used, such as a nickel-hydrogen battery or a nickel-cadmium battery. Alternatively, a capacitor or the like, for example, an electric double layer capacitor may be used. Note that the capacitor preferably has a large capacity.

Next, the power generation element 102 is described. As the power generation element 102, a thermoelectric element utilizing the Seebeck effect, a piezoelectric element utilizing vibrational energy, a power generation element utilizing electromagnetic induction, a solar battery utilizing light, or the like can be used. The power generation element 102 is formed by using semiconductor microfabrication technique in the field of MEMS (Micro Electro Mechanical System). Note that MEMS is an abbreviated name of a micro-electro-mechanical system, which is sometimes simply called a micromachine. Although there is no clear definition of MEMS at present, in general, MEMS corresponds to a minute device which is "a microstructure having a three-dimensional structure" manufactured by using semiconductor microfabrication technique and in which various functions of chemistry, optics, mechanics, electronics, and the like are integrated. The microstructure is different from a semiconductor element in that it has a three-dimensional structure and a movable portion; however, a thermoelectric element without a movable portion described below is also included in MEMS.

Note that a space required for a structure to have a three-dimensional structure is formed by removing a sacrificial layer by etching. The sacrificial layer is selectively removed in a later step, and thus may be formed using a conductive layer or an insulating layer as long as it is removable. For example, a metal such as titanium (Ti), aluminum (Al), molybdenum (Mo), or tungsten (W); a semiconductor layer containing silicon (also referred to as a silicon layer); a material containing oxide of silicon (silicon oxide) or nitride of silicon (silicon nitride); or the like can be used. Further, the sacrificial layer may be formed using a metal compound of the aforementioned metal and silicon. The sacrificial layer may have a single-layer structure or a stacked-layer structure and is formed by a sputtering method, a CVD method, or the like. The sacrificial layer can be processed by an etching method using a resist mask which is formed by using a photolithography method. Alternatively, the sacrificial layer may be selectively formed by a droplet discharging method typified by an ink-jet method. In this case, a photolithography step and a patterning step of the sacrificial layer are not required, so that waste of a resist material and process time can be eliminated. Note that for etching, plasma such as oxygen plasma can be used in some cases as well as a gas etchant or a liquid etchant.

Here, a specific example of a combination of a sacrificial layer, a structure, and an etchant is shown. For example, when hydrofluoric acid is used as an etchant to etch the sacrificial layer, the sacrificial layer can be formed using phosphosilicate glass (PSG) or silicon oxide and a structure can be formed using silicon having a polycrystalline structure. Further, when an ammonium peroxide mixture is used as an etchant, the sacrificial layer can be formed using tungsten (W) or molybdenum (Mo) and the structure can be formed using silicon oxide. An ammonium peroxide mixture is a liquid in which ammonia, hydrogen peroxide water, and pure water are mixed, and which can be obtained, for example, by mixing 28 wt % of ammonia, 31 wt % of hydrogen peroxide water, and pure water at a ratio of 3:5:2.

In addition, silicon can be dissolved in a mixed solution of HF and $HNO_3$ (preferably, a mixed solution with further addition of $CH_3COOH$), a KOH solution, an NaOH solution, an EPW solution (a mixed solution of ethylenediaminepyrocatechol and water), an EDP (ethylenediaminepyrocatechol) solution, a TMAH (tetramethylammonium hydride) solution, a hydrazine solution, or the like. Further, silicon can be removed by an $XeF_2$ gas, a mixed gas of $SF_6$ and $C_4F_8$, an $SF_2$ gas, or the like. Since selectivity between silicon and silicon oxide can be obtained by using these etchants, the sacrificial layer can be formed using silicon and the structure can be formed using silicon oxide. On the other hand, when the sacrificial layer is formed using silicon oxide and the structure is formed using silicon, the etchant can be a mixed solution of HF and $NH_4F$, an $NH_4HF_2$ solution, a buffered hydrofluoric acid solution, or the like; or a mixed gas of HF and $NH_4F$, a mixed gas of $SF_6$, $C_4F_8$, and $H_2$, or the like.

Since KOH, EPW, EDP, TMAH, and hydrazine cause anisotropy in etching rate depending on impurity concentration or plane orientation of a silicon crystal having a polycrystalline structure, the sacrificial layer and the structure can be formed using silicon having different plane orientation or different impurity concentration. These are only an example, and an etchant is not particularly limited as long as it has sufficient selectivity between the sacrificial layer and the structure.

Figure 7A:
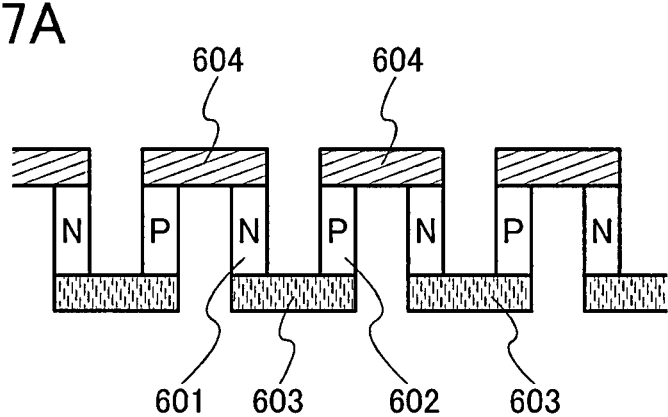
FIGS. 7A and 7B are views showing a structure of a semiconductor device in Embodiment Mode 1.
Figure 7B:
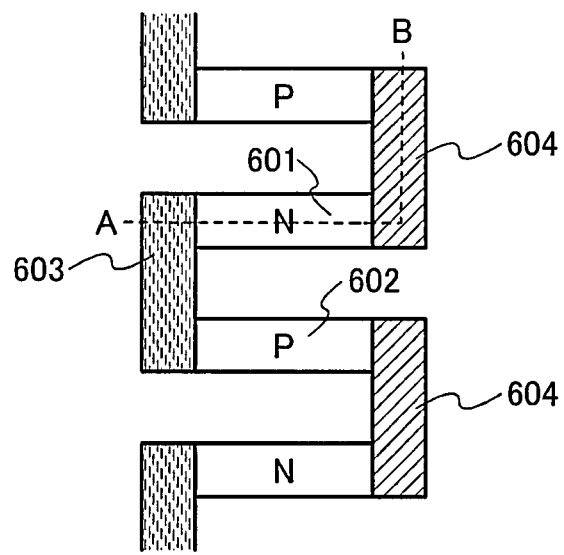

An example of a power generation element formed by using the aforementioned technique is described below. FIG. 7A shows a cross sectional view of one structure example of a thermoelectric element utilizing the Seebeck effect. The thermoelectric element includes a plurality of n-type semiconductors 601 and a plurality of p-type semiconductors 602 alternately arranged, and a first electrode 603 and a second electrode 604 which connect these semiconductors. As shown in FIG. 7A, one end portion of the n-type semiconductor 601 is connected to one end portion of the p-type semiconductor 602 through the first electrode 603, and the other end portion of the n-type semiconductor 601 is connected to one end portion of another p-type semiconductor 602 through the second electrode 604. The other end portion of the another p-type semiconductor 602 is connected to one end portion of another n-type semiconductor 601 through the first electrode 603. That is, each of the n-type semiconductor and the p-type semiconductor is connected to a semiconductor having a different conductivity type by both end portions through the first electrode or the second electrode. Note that the first electrode 603 and the second electrode 604 may be provided above and below the semiconductors as shown in FIG. 7A, or may be provided in one direction with respect to the semiconductors. Since the first electrode 603 and the second electrode 604 are required to be at a different temperature, these structures must not be mixed in one plane surface. As one structure example of a thermoelectric element in which the first electrode and the second electrode are provided in one direction with respect to the semiconductors, FIG. 7B shows a top view of the thermoelectric element.

In the thermoelectric element described above, a temperature difference between the first electrode 603 and the second electrode 604 is generated, so that an electromotive force can be obtained. For example, the first electrode 603 is provided near the signal processing circuit 103 in which a heat value is large and the second electrode 604 is provided in a portion where a heat value is small, so that the temperature difference can be generated. Alternatively, the first electrode 603 is provided nearer the outside so as to be easily affected by a temperature change of the outside. Note that a space layer is preferably provided over the second electrode 604 by using MEMS technique. A temperature of the second electrode 604 can be lowered by air or an inert gas filling the space layer. Note that the arrangement is not limited thereto, and any arrangement may be employed as long as the temperature difference between the first electrode 603 and the second electrode 604 can be generated. Although an example where the first electrode is at high temperature and the second electrode is at low temperature is shown here, the opposite may be employed as well. If the arrangement of the electrodes, in which the temperature difference may possibly be reversed, is employed, an electric power obtained through the rectifier circuit 107 may be charged into the battery as shown in FIG. 2. The thermoelectric element is not limited to the aforementioned structure as long as two different materials are joined and a joint portion thereof is at a different temperature, so that the thermoelectric element can obtain an electric power.

Figure 8A:
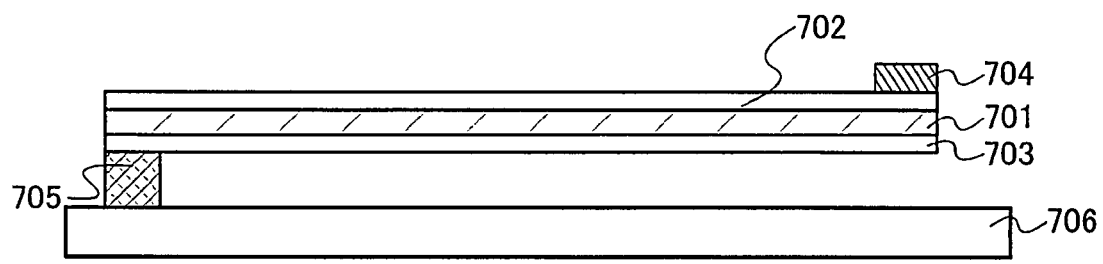
FIGS. 8A and 8B are views each showing a structure of a semiconductor device in Embodiment Mode 1.
Figure 8B:
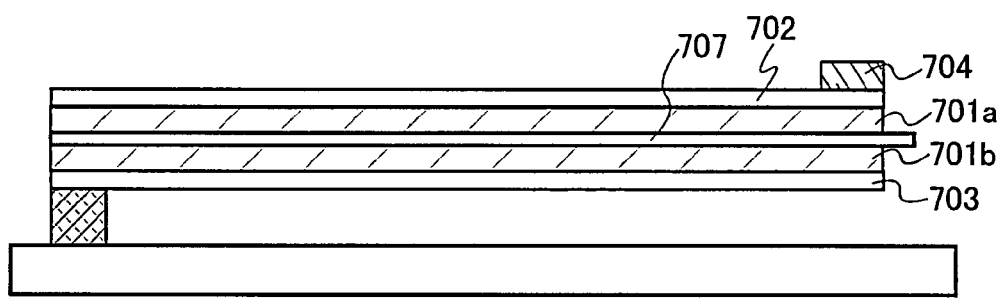

Next, a power generation element which obtains an electric power by a vibrational energy is described. As such an element, a piezoelectric element which can obtain electric power by giving vibration to a piezoelectric film is given. FIGS. 8A and 8B show an structure example of piezoelectric element. As shown in FIG. 8A, the piezoelectric element includes a piezoelectric film 701, and electrodes 702 and 703 provided above and below the piezoelectric film 701. Note that in a structure example of the piezoelectric element shown in FIG. 8A, one end portion is fixed by a support base 705 provided over a substrate 706, and there is a space between the substrate 706, which is formed by using the aforementioned method. Needless to say, a space is also provided over the piezoelectric element, and a vibrating part of the piezoelectric element is secured by those two spaces. The piezoelectric element may be a bimorph element using two films of a piezoelectric film 701a and a piezoelectric film 701b as shown in FIG. 8B as well as a unimorph element or a monomorph element including one piezoelectric film. Polarization directions of the piezoelectric film 701a and the piezoelectric film 701b are not required to be the same, and may be different by 180 degree. An electrode 707 may be provided between the piezoelectric film 701a and the piezoelectric film 701b, and thereby the strength of the piezoelectric element can be improved. Note that when the polarization directions of the piezoelectric film 701a and the piezoelectric film 701b are different from each other, the electrode 707 functions as one of voltage extraction electrodes. Further, the number of the piezoelectric films is not limited to two, and a piezoelectric element of a multimorph element in which two or more films are stacked may be employed.

For the piezoelectric element, a piezoelectric material such as quartz ($SiO_2$), barium titanate ($BaTiO_3$), lead titanate ($PbTiO_3$), lead zirconate titanate ($Pb(Zr,Ti)O_3$), lead lanthanum zirconate titanate ($(Pb,La)(Zr,Ti)O_3$), lithium niobate ($LiNbO_3$), lead metaniobate ($PbNb_2O_6$), polyvinylidene fluoride (PVDF), zinc oxide (ZnO), aluminum nitride (AlN), or tantalum oxide ($Ta_2O_5$) can be used, for example. The piezoelectric material may be an insulator without the center of the crystal, which generates positive and negative electric charges when stress is added and polarization is generated. Further, the piezoelectric element may be provided with a weight 704 at an end portion opposite to the end portion fixed by using the support base 705. Although FIGS. 8A and 8B show a structure where one end portion of the piezoelectric element is fixed, a structure where a central portion is fixed or a structure where both end portions are fixed may be employed. Note that since an electromotive force obtained by the piezoelectric element is an alternating-current voltage, it is required to be supplied to the battery through the rectifier circuit 107 as shown in FIG. 2. Vibration to the piezoelectric element may be vibration of the RFID itself, or initial vibration may be generated by using electric power obtained through the rectifier circuit 105 and an electromotive force can be obtained by using continuous vibration.

Figure 9A:
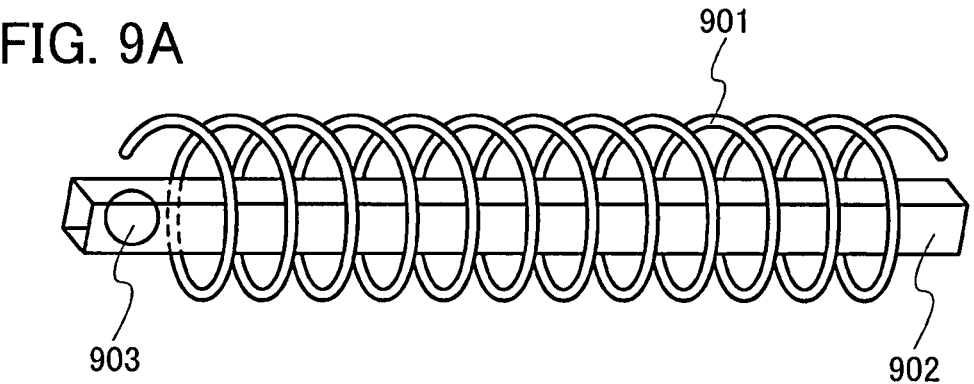
FIGS. 9A to 9E are views showing a structure of a semiconductor device in Embodiment Mode 1.
Figure 9B:
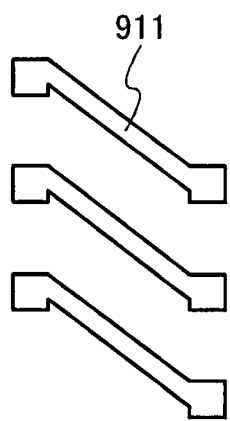
Figure 9C:
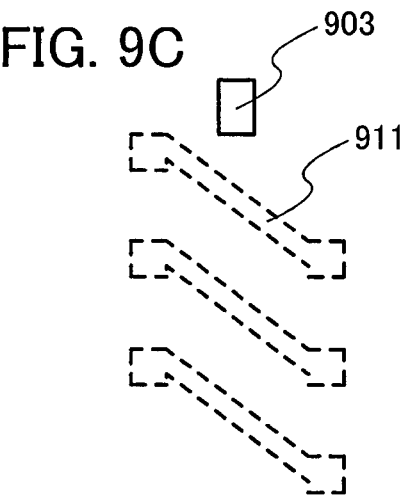
Figure 9D:
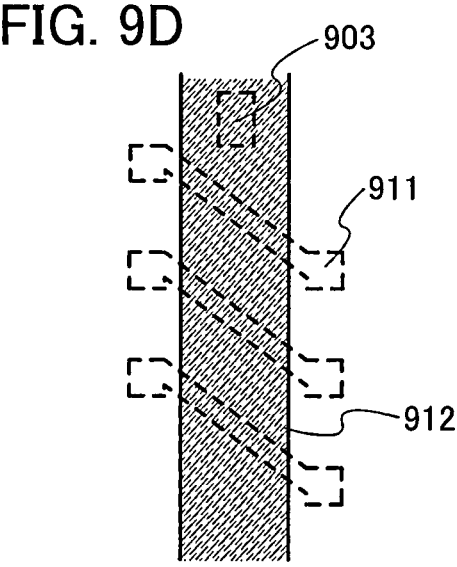
Figure 9E:
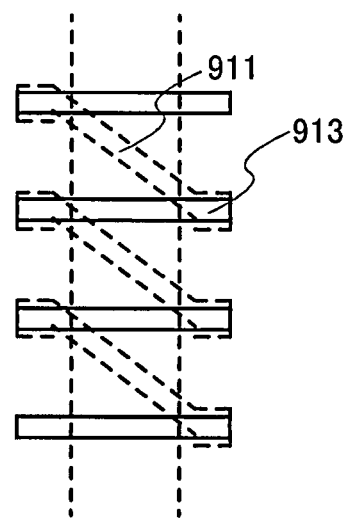

Further, a power generation element may use an electromagnetic induction method, and for example, as shown in a schematic view of FIG. 9A, a structure where a magnetic material 903 moves freely in a coil 901 may be employed. Note that a space 902 in which the magnetic material moves can be formed by using the aforementioned MEMS technique. An example of a manufacturing method of the power generation element using an electromagnetic induction method is described using top views of FIGS. 9B to 9E. Note that a bottom face, a side face, and a top face of the coil 901 can be formed separately. First, a conductive film is formed by using a sputtering method, a CVD method, or the like, and subsequently processed into a shape shown in FIG. 9B, so that a metal film 911 of the bottom face forming the coil 901 is formed (see FIG. 9B). Note that the aforementioned processing step can be omitted by using a droplet discharging method typified by an ink-jet method. Next, after an interlayer film (not shown) is formed over the metal film 911, the magnetic material 903 is formed in a region to be the space 902. A shape of the magnetic material 903 is not particularly limited as long as the magnetic material 903 can move in the coil 901. For example, as shown in FIG. 9C, a formed magnetic material may be processed into a rectangular shape, or the magnetic material may be formed by a droplet discharging method. Next, a sacrificial layer 912 is formed in the region to be the space 902. After that, an interlayer film is formed again over the interlayer film and the sacrificial layer 912, and a contact hole which reaches opposite ends of the metal film 911 is formed. Note that the side face of the coil is formed in the contact hole. Subsequently, a metal film is formed and processed into a desired shape, so that a metal film 913 forming the side face and the top face of the coil is formed and the coil 901 is completed. Finally, a contact hole which reaches the sacrificial layer is formed and an etchant is introduced through the contact hole, so that the space 902 can be formed. By use of the power generation element formed as described above, the magnetic material 903 moves in the coil 901 by vibration of the RFID, or the like, and thereby an induced electromotive force can be obtained. Note that since the electromotive force obtained by such a power generation element is also an alternating-current voltage, the obtained electric power is required to be supplied to the battery through the rectifier circuit 107 as shown in FIG. 2.

Note that a power generation element is not particularly limited to the aforementioned power generation elements as long as it can obtain electric power from light, pressure, heat, or the like. The power generation element can be small and lightweight by using MEMS microfabrication technique. Since the MEMS microfabrication technique is generally similar to a semiconductor process, in which film formation, lithography, and etching are repeated so as to form a three-dimensional microstructure, new capital investment is not required; and in some cases, the power generation element can be formed over the same substrate or by using the step same as another device, for example, a circuit included in the signal processing circuit. Note that it is not limited thereto, and after the power generation element is formed, it may be mounted on a substrate or the like over which the signal processing circuit is formed.

Figure 10A:
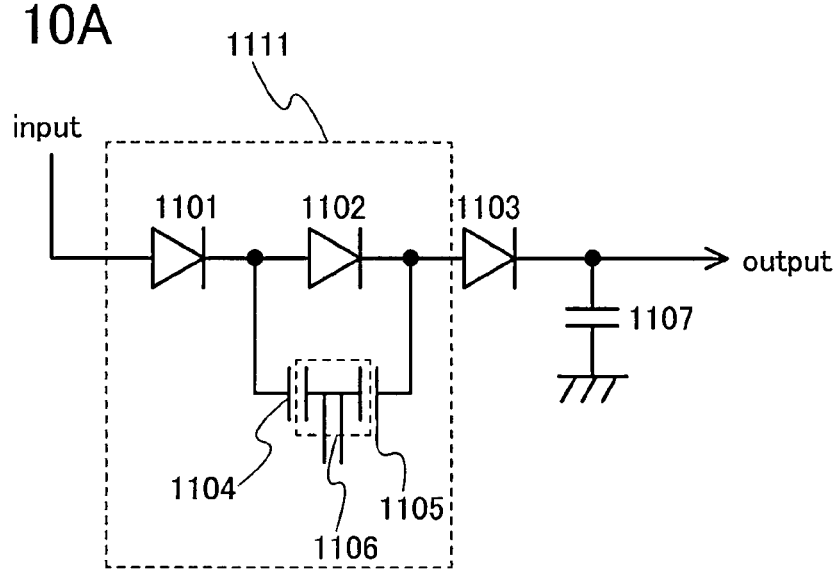
FIGS. 10A to 10C are diagrams showing a structure of a semiconductor device in Embodiment Mode 1.
Figure 10B:
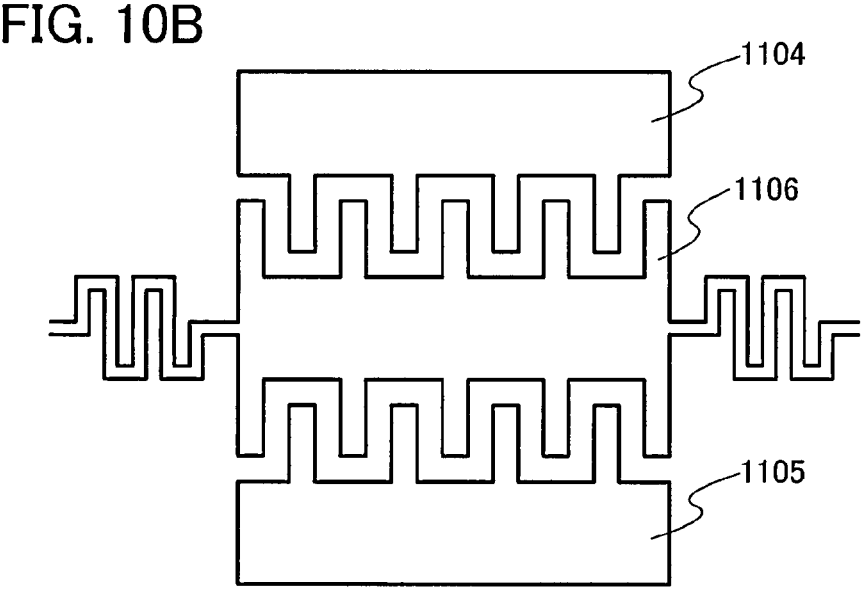
Figure 10C:
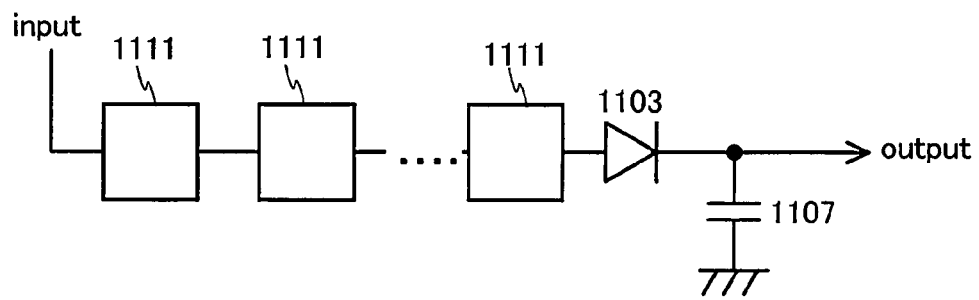

When a voltage obtained by the power generation element is low, a high voltage can be obtained by using a booster circuit before the voltage is charged into the battery. Here, FIG. 10A shows a structure example of a booster circuit formed by using the MEMS technique. The booster circuit shown in FIG. 10A includes diodes 1101, 1102, and 1103, fixed electrodes 1104 and 1105, a movable electrode 1106, and a storage capacitor 1107. A voltage obtained by the power generation element is input to the diode 1101. Electric power obtained by the power generation element or electric power obtained by the rectifier circuit 105 is supplied to the movable electrode 1106 so that a charge is held therein. FIG. 10B shows a top view of a variable capacitor, which includes the fixed electrodes 1104 and 1105, and the movable electrode 1106. The fixed electrodes 1104 and 1105 and the movable electrode 1106 have comb shapes, and each comb is alternately arranged between the fixed electrode and the movable electrode through a space. Note that the movable electrode 1106 can be formed by using the MEMS technique, and is formed by forming the comb-shaped movable electrode 1106 over a sacrificial layer and subsequently removing the sacrificial layer by an etchant. Needless to say, a space is also provided over the movable electrode 1106 as well, and a portion in which the movable electrode can move is secured by those two spaces. In the movable electrode 1106 formed in this manner, a voltage can be made high by using a relative change of capacitance values between the fixed electrode 1104 and the movable electrode 1106; and between the fixed electrode 1105 and the movable electrode 1106, in accordance with a move of the movable electrode by vibration of the RFID, or the like. Further, in order to obtain a high voltage, a plurality of unit circuits 1111 each including the variable capacitor and the diodes 1101 and 1102 is provided as shown in FIG. 10C. Note that the variable capacitor is not limited to have this structure, and may be formed by using the MEMS technique. In addition, the variable capacitor may be provided in a portion where a voltage is desired to be boosted, for example, between the battery 104 and the power supply circuit 106; or between the rectifier circuit 105 and the power supply circuit 106. Alternatively, the variable capacitor is included in the power supply circuit 106.

Next, an operation when data is written to the RFID 100 by the reader/writer is described below with reference to FIG. 1. A signal received from the antenna circuit 101 is half-wave rectified and smoothed by the rectifier circuit 105. A voltage half-wave rectified and smoothed by the rectifier circuit 105 is input to the power supply circuit 106. The power supply circuit 106 supplies the stabilized voltage to the amplifier 109, the logic circuit 110, the memory control circuit 111, the memory circuit 112, the logic circuit 113, the amplifier 114, and the modulation circuit 115. Note that electric power charged into the battery 104 is also supplied to the power supply circuit 106 as described above.

In addition, the signal received by the antenna circuit 101 is input to the logic circuit 110 as a clock signal through the amplifier 109. Further, the signal input from the antenna circuit 101 is demodulated by the demodulation circuit 108 and input to the logic circuit 110 as data.

In the logic circuit 110, the input data is decoded. The reader/writer transmits data after encoding with a modified Miller code, an NRZ-L code, or the like, and then the data is decoded by the logic circuit 110. The memory control circuit 111 operates in accordance with the decoded data. Then, the data stored in the memory circuit 112 is written.

An operation is preformed as described below when the reader/writer reads the data stored in the memory circuit 112 of the RFID 100 shown in FIGS. 1 and 2. The signal received by the antenna circuit 101 is half-wave rectified and smoothed by the rectifier circuit 105. The voltage half-wave rectified and smoothed by the rectifier circuit 105 is input to the power supply circuit 106. The power supply circuit 106 supplies the stabilized voltage to the amplifier 109, the logic circuit 110, the memory control circuit 111, the memory circuit 112, the logic circuit 113, the amplifier 114, and the modulation circuit 115. Note that the electric power charged into the battery 104 is also supplied to the power supply circuit 106 as described above.

An alternating-current signal received from the antenna circuit 101 is input to the logic circuit 110 through the amplifier 109, and a logical operation is performed. Then, the memory control circuit 111 is controlled by using a signal from the logic circuit 110, and data stored in the memory circuit 112 is read out. Next, the data drawn from the memory circuit 112 is processed by the logic circuit 113 and is amplified by the amplifier 114, and after that, the modulation circuit 115 is operated. Although the data is processed in accordance with a method prescribed by standards such as ISO 14443, ISO 15693, or ISO 18000, a method prescribed by another standard may be adopted as long as it can ensure consistency with the reader/writer.

When the modulation circuit 115 is operated, impedance of the antenna circuit 101 is changed. Accordingly, a signal of the reader/writer is changed. The reader/writer reads this change, so that the data stored in the memory circuit 112 of the RFID 100 can be known. Such a modulation method is referred to as a load modulation method.

Figure 11:
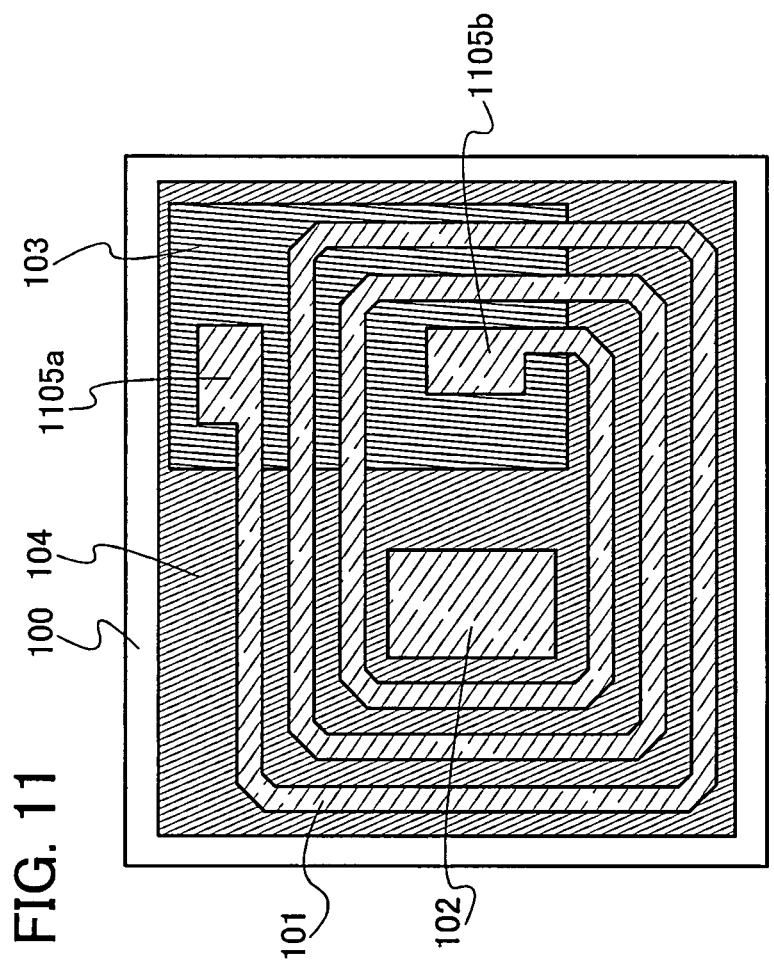
FIG. 11 is a view showing a structure of a semiconductor device in Embodiment Mode 1.

Next, FIG. 11 shows a schematic view of a structure example of a semiconductor device used for the RFID according to Embodiment Mode 1 of the invention.

The RFID 100 includes the antenna circuit 101, the power generation element 102, the signal processing circuit 103, and the battery 104. The antenna circuit 101 is provided with a connection terminal 1105a and a connection terminal 1105b, which are connected to the signal processing circuit 103. Note that a structure of a semiconductor device according to Embodiment Mode 1 of the invention is not limited to the structure shown in FIG. 11. In FIG. 11, a substrate over which the antenna circuit 101, the power generation element 102, the signal processing circuit 103, and the like are formed is omitted, thus, a substrate is not necessarily required. Further, a semiconductor device may be manufactured by forming all components over the same substrate or forming each of components over a substrate and mounting them on the semiconductor device. Alternatively, each component may be peeled from the substrate by using a peeling step described below to be attached. In terms of a relation of stacked layers, although a structure in which the signal processing circuit 103 is provided between the antenna circuit 101 and the battery 104 is shown, the battery 104 may be provided between the antenna circuit 101 and the signal processing circuit 103, or the antenna circuit 101 may be provided between the signal processing circuit 103 and the battery 104. Further, although the power generation element 102 is provided in the same layer as the signal processing circuit 103, it may be provided anywhere as long as it is connected to the battery 104. An area ratio of the antenna circuit 101, the power generation element 102, the signal processing circuit 103, and the battery 104 is not limited thereto. That is, when a semiconductor device according to Embodiment Mode 1 of the invention is seen according to each layer in terms of the relation of stacked layers, a positional relationship of the antenna circuit 101, the power generation element 102, the signal processing circuit 103, and the battery 104 is not limited. Therefore, the antenna circuit 101 and the signal processing circuit 103 may be formed over different substrates; or the antenna circuit 101, the signal processing circuit 103, and the battery 104 may be formed over the same substrate.

Figure 12A:
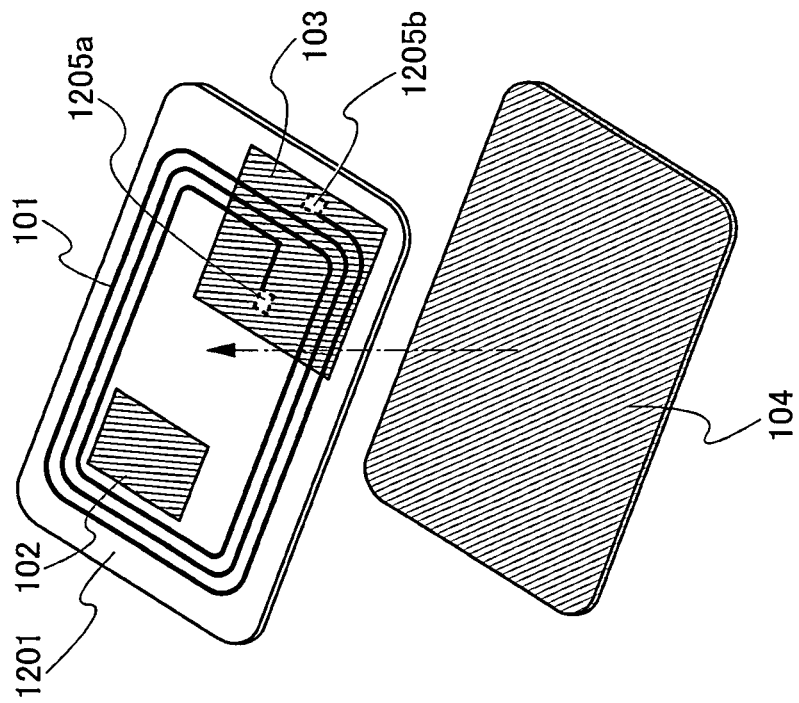
FIGS. 12A and 12B are each views showing a structure of a semiconductor device in Embodiment Mode 1.
Figure 12B:
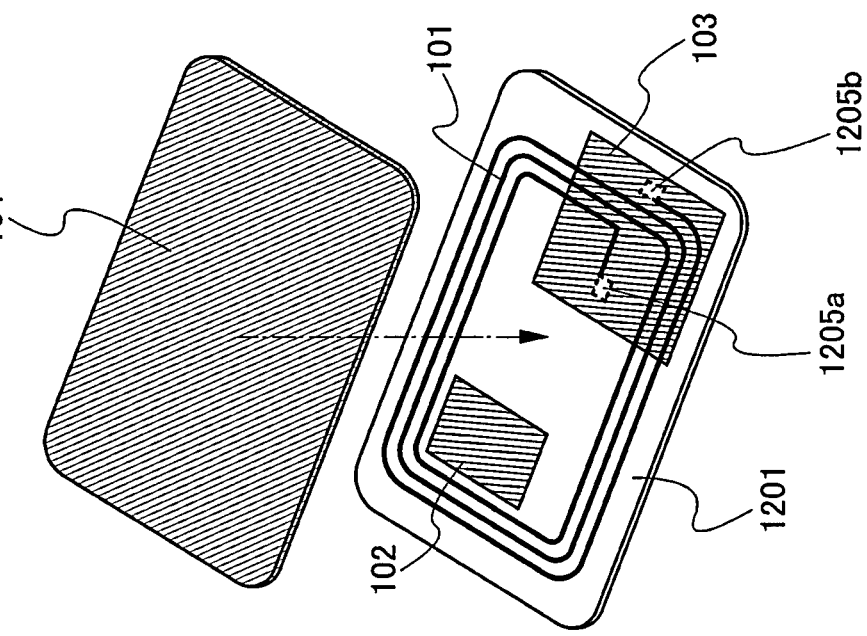

As shown in FIG. 12A, the signal processing circuit 103 and the antenna circuit 101 may be formed over a substrate 1201, the power generation element 102 may also be mounted on the substrate 1201, and the battery 104 may be attached to a surface of the substrate 1201, on which the signal processing circuit 103 and the like are formed. Further, as shown in FIG. 12B, the battery 104 may be attached to a surface opposite to the surface of the substrate 1201, on which the signal processing circuit 103 and the like are formed. Note that each of a connection terminal 1205a and a connection terminal 1205b of the antenna circuit 101 is connected to the signal processing circuit 103.

Figure 13A:
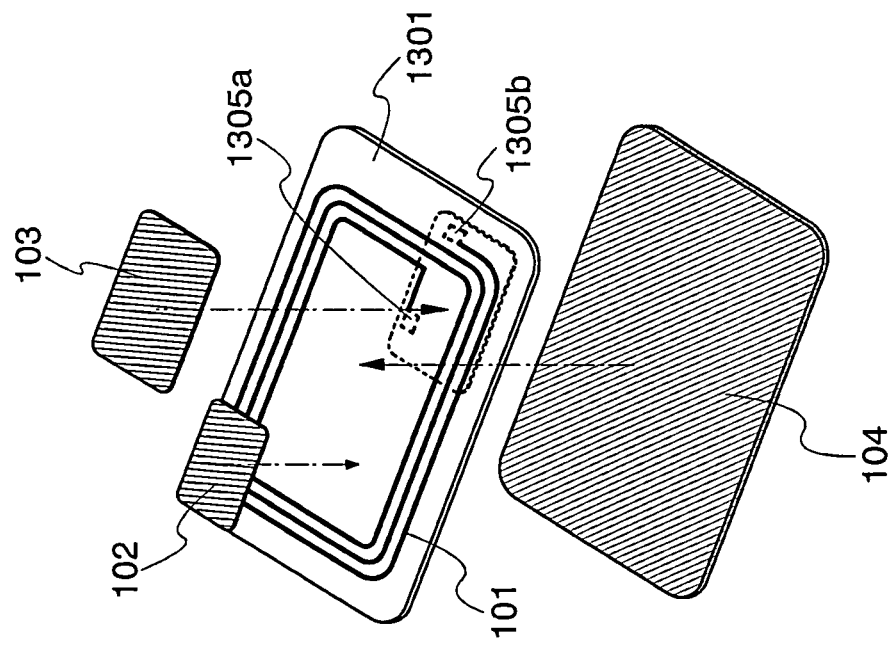
FIGS. 13A and 13B are views each showing a structure of a semiconductor device in Embodiment Mode 1.
Figure 13B:
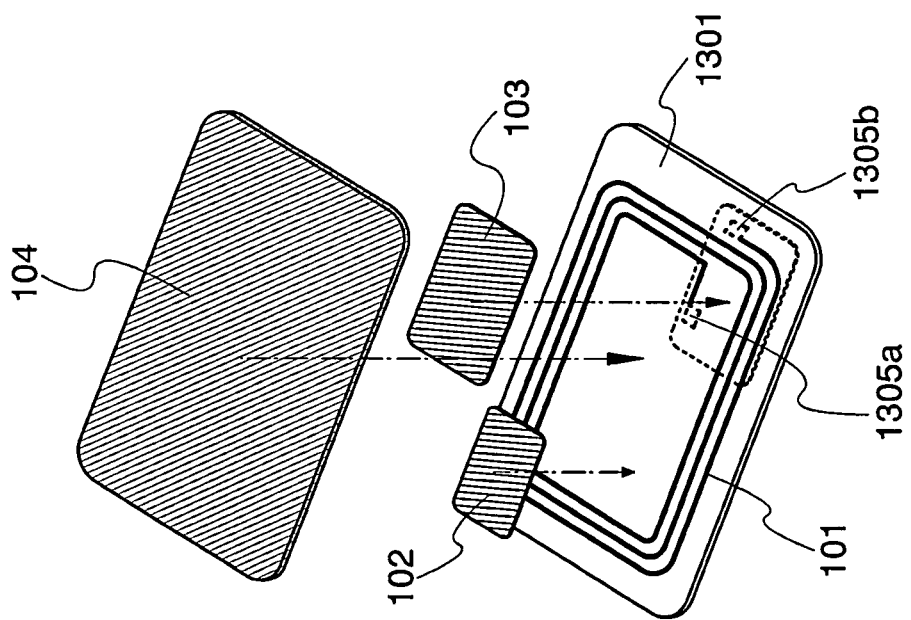

In addition, as shown in FIG. 13A, the power generation element 102 and the signal processing circuit 103 may be attached to a surface of a substrate 1301, on which the antenna circuit 101 is formed, and the battery 104 may also be attached thereto. Further, as shown in FIG. 13B, the power generation element 102 and the signal processing circuit 103 may be attached to the surface of the substrate 1301, on which the antenna circuit 101 is formed, and the battery 104 may be attached to an opposite surface. In FIGS. 13A and 13B, each of a connection terminal 1305a and a connection terminal 1305b of the antenna circuit 101 is connected to the signal processing circuit 103.

Note that although the battery 104 is shown to express its position in the RFID, it is not limited thereto depending on a kind of the battery. For example, a lithium ion secondary battery, which is thinned to be approximately 10 to 100 μm, can be formed simultaneously with the signal processing circuit 103. Alternatively, a thin film capacitor may be formed simultaneously with the signal processing circuit 103 to be used as the battery 104. A semiconductor device including the RFID which is small and thin is preferable since it has a flexibility and can be used for various purposes.

As described above, a semiconductor device including the RFID of the invention includes a battery. Therefore, power shortage in accordance with deterioration of the battery over time, which occurs in a conventional active type RFID, can be prevented. Further, in a semiconductor device of the invention, electric power can be supplied to the battery from the power generation element; therefore, the semiconductor device can be used continuously without a check of remaining capacity of the battery and a change of the battery. In addition, since electric power for driving the RFID is constantly held in the battery, electric power sufficient to drive the RFID can be obtained and a communication range with the reader/writer can be increased.

In addition, since the power generation element included in the semiconductor device of the invention is small and lightweight, other functions such as a sensor are easily integrated. Therefore, a high-performance and high-functional semiconductor device can be obtained.

Note that the power generation element to be used may be selected as appropriate in accordance with a purpose and use of the semiconductor device. Further, the semiconductor device of the invention may include two or more power generation elements, and kinds of the power generation elements may be different.

This embodiment mode can be implemented in combination with description of other embodiment modes in this specification.

[Embodiment Mode 2]

In this embodiment mode, in the semiconductor device including the RFID shown in Embodiment Mode 1, a structure where a booster antenna circuit (hereinafter referred to as a booster antenna) is included is described with reference to drawings. Note that the same portions as Embodiment Mode 1 are denoted by the same reference numerals and description of such portions is omitted.

Note that a booster antenna described in this embodiment mode is a larger antenna (hereinafter referred to as a booster antenna) than an antenna (hereinafter referred to as a chip antenna or an antenna circuit) which receives a signal from a reader/writer included in the semiconductor device and outputs the signal to a signal processing circuit of the RFID. The booster antenna is an antenna which can efficiently transmit a signal oscillated by a reader/writer or a battery charger to an objective RFID by being resonated in a frequency band in which the booster antenna is used, and being a magnetic-field coupled with a chip antenna. Since the booster antenna is coupled to the coil antenna through a magnetic field, it is not required to be directly connected to the chip antenna and the signal processing circuit, which is preferable.

Figure 14:
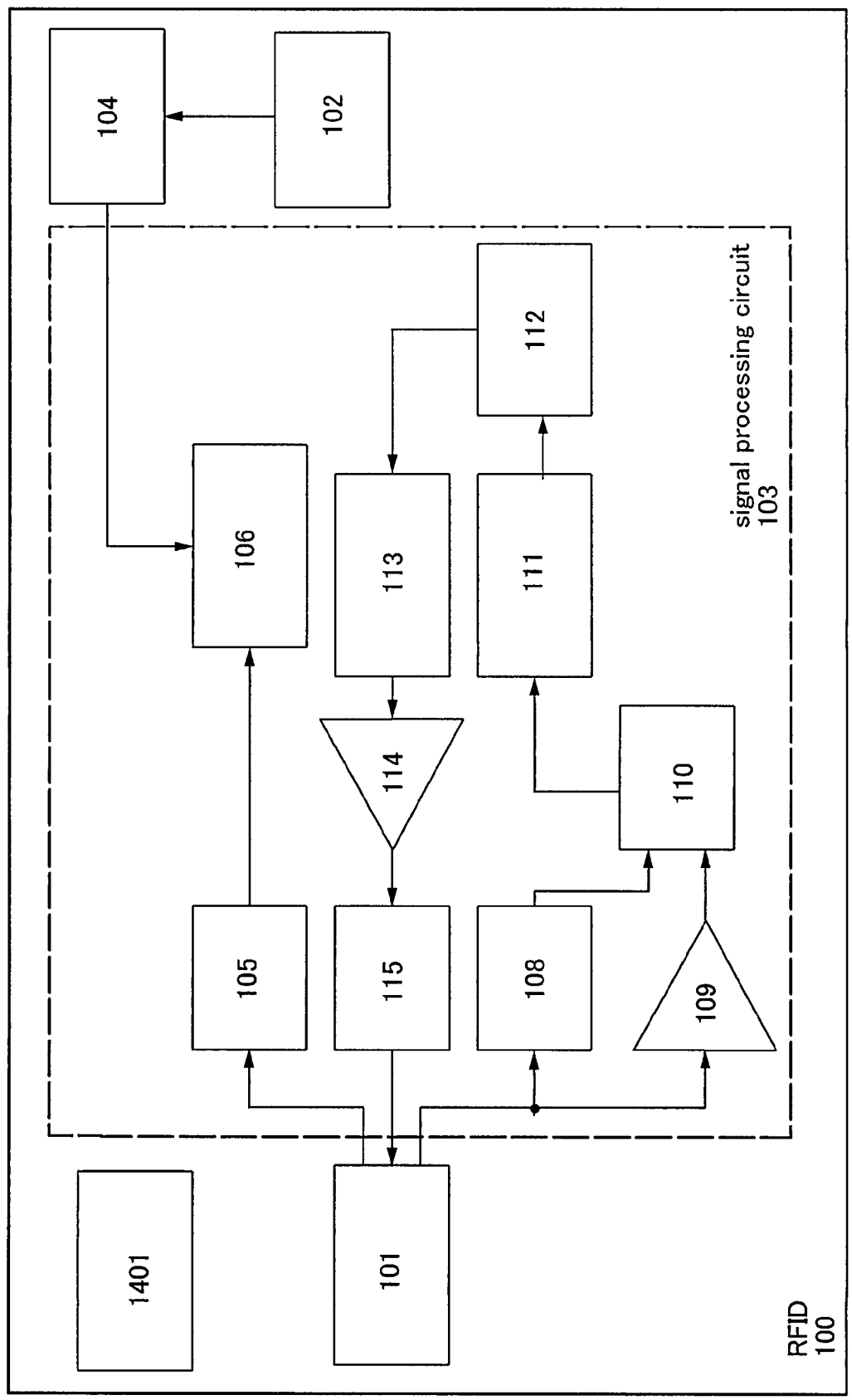
FIG. 14 is a diagram showing a structure of a semiconductor device in Embodiment Mode 2.
Figure 15:
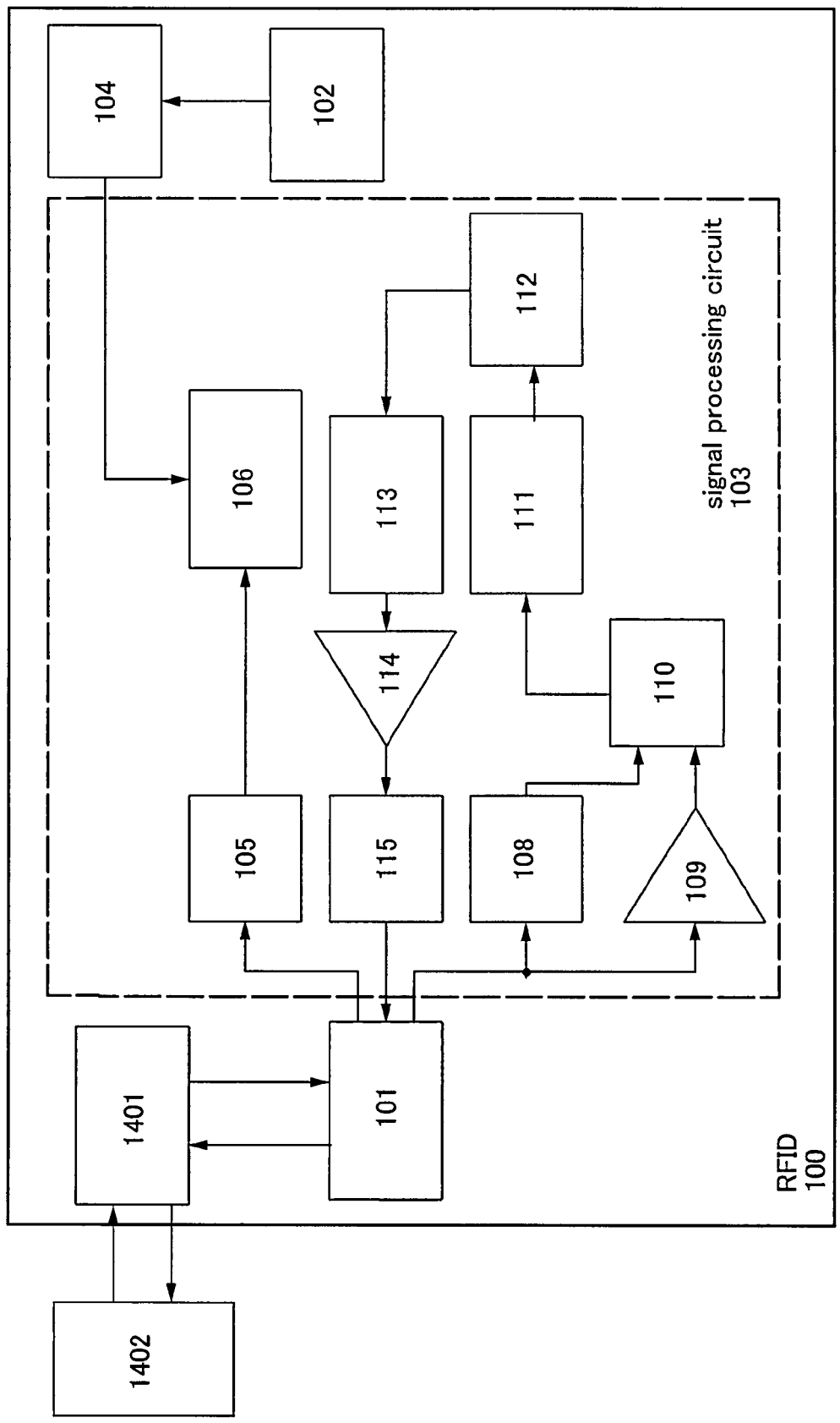
FIG. 15 is a diagram showing a structure of a semiconductor device in Embodiment Mode 2.

A semiconductor device used for the RFID in this embodiment mode is described using block diagrams of FIGS. 14 and 15.

The RFID 100 in FIG. 14 includes the antenna circuit 101, the power generation element 102, a booster antenna 1401, the signal processing circuit 103, and the battery 104. The signal processing circuit 103 includes the rectifier circuit 105, the power supply circuit 106, the demodulation circuit 108, the amplifier 109, the logic circuit 110, the memory control circuit 111, the memory circuit 112, the logic circuit 113, the amplifier 114, and the modulation circuit 115.

FIG. 15 shows the block diagram in which the booster antenna 1401 transmits and receives a signal to and from a reader/writer 1402 by being magnetic-field coupled with the antenna circuit 101. In FIG. 15, the booster antenna 1401 receives a signal from the reader/writer 1402, and a signal, which is received from the antenna circuit 101 by being magnetic-field coupled with the antenna circuit because of electromagnetic induction, is input to the power supply circuit 106 through the rectifier circuit 105 and to the demodulation circuit 108 and the amplifier 109. Note that electric power obtained by the power generation element 102 is also supplied to the power supply circuit 106. According to the structure of FIG. 15, a communication range for transmission and reception of a signal between the reader/writer 1402 and the RFID 100 can be increased as compared with a case where the structure described in Embodiment Mode 1 is used, so that it is preferable since communication of data can be performed more reliably.

Note that shapes of antennas in the antenna circuit 101 and the booster antenna are not particularly limited. For example, an antenna having the shape of FIG. 11, which is shown in Embodiment Mode 1, can be adopted. Note that for the booster antenna, an antenna larger than the antenna circuit, which is magnetic-field coupled, is preferably adopted from a perspective of functions.

Note that the reader/writer 1402 in FIG. 15 is similar to that shown in Embodiment Mode 1 and may have the structure of FIG. 5.

The power generation element 102 in FIGS. 14 and 15 may be similar to those in Embodiment Mode 1. When an electromotive force obtained by the power generation element is an alternating-current voltage, obtained electric power is charged in the battery 104 through the rectifier circuit.

In FIGS. 14 and 15, the antenna circuit 101 and the signal processing circuit 103 may be formed over the same substrate, or the antenna circuit 101 may be provided as an external antenna.

In this embodiment mode, the signal received from the antenna circuit 101 and the booster antenna 1401 is preferably communicated by an electromagnetic induction method. Therefore, the RFID 100 in FIGS. 14 and 15 preferably includes the coiled antenna circuit 101 and the coiled booster antenna 1401. For example, FIGS. 16A and 16B show a positional relationship of the antenna circuit and the booster antenna, and shapes of antennas in a semiconductor device including an RFID having the structure of FIG. 14. FIGS. 16A and 16B show a structure where the coiled antenna circuit 101 and the booster antenna 1401 are provided on one surface of a substrate 1600.

As shown in FIG. 16A, the RFID includes a chip 1601, the power generation element 102, the booster antenna 1401, and the battery 104 over the substrate 1600. Note that as shown in FIG. 16B, the chip 1601 includes the signal processing circuit 103 and a chip antenna 1610. Each of a connection terminal 1605a and a connection terminal 1605b of the chip antenna 1610 is connected to the signal processing circuit 103.

Shapes of the booster antenna 1401 and the chip antenna 1610 are not limited to those shown in the drawings, and various modes can be employed as long as transmission and reception frequencies are synchronized. It is preferable that a shape of the booster antenna 1401 be a loop antenna and a shape of the chip antenna 1610 be a micro-loop antenna. Note that the arrangement and the structure of the RFID are not limited thereto, and can also be selected as appropriate with respect to an area ratio of the chip 1601, the power generation element 102, the booster antenna 1401, and the battery 104. In FIG. 16A, although the chip 1601, the power generation element 102, the booster antenna 1401, and the battery 104 are formed over the substrate 1600, the booster antenna 1401 may be provided on a rear face of the substrate 1600, for example.

A semiconductor device including the RFID of the invention includes a battery. Therefore, power shortage in accordance with deterioration of the battery over time, which occurs in a conventional active type RFID, can be prevented. Further, in a semiconductor device of the invention, electric power can be supplied to the battery from the power generation element; therefore, the semiconductor device can be used continuously without a check of remaining capacity of the battery and a change of the battery. In addition, since electric power for driving the RFID is constantly held in the battery, electric power sufficient to drive the RFID can be obtained and a communication range with the reader/writer can be increased. In addition, since the power generation element included in the semiconductor device of the invention is small and lightweight, other functions such as a sensor are easily integrated. Therefore, a high-performance and high-functional semiconductor device can be obtained.

Further, in the structure of this embodiment mode, a booster antenna is included in addition to components of the structure of Embodiment Mode 1. Therefore, there is an advantage in that transmission and reception of data between the reader/writer and the RFID can be performed more reliably.

Note that this embodiment mode can be implemented in combination with description of other embodiment modes in this specification.

[Embodiment Mode 3]

In this embodiment mode, an example of a manufacturing method of the semiconductor device shown in the aforementioned embodiment modes is described with reference to drawings. In this embodiment mode, a case where the thermoelectric element shown in FIG. 7B is used as a power generation element is described by using a cross sectional view along a line A-B of the thermoelectric element in FIG. 7B.

First, as shown in FIG. 17A, a peeling layer 1903 is formed on one surface of a substrate 1901 with an insulating film 1902 interposed therebetween, and sequentially, an insulating film 1904 functioning as a base film and a semiconductor film 1905 (for example, a film containing amorphous silicon) are stacked thereover. Note that the insulating film 1902, the peeling layer 1903, the insulating film 1904, and the semiconductor film 1905 can be continuously formed.

The substrate 1901 is selected from a glass substrate, a quartz substrate, a metal substrate (for example, a ceramic substrate and a stainless steel substrate), and a semiconductor substrate such as a Si substrate. Alternatively, as a plastic substrate, a substrate formed by using polyethylene terephthalate (PET), polyethylene naphthalate (PEN), polyether sulfone (PES), acrylic, or the like can be used. Note that in this step, the peeling layer 1903 is formed over an entire surface of the substrate 1901 with the insulating film 1902 interposed therebetween; however, the peeling layer may be selectively formed by a photolithography method after the provision of the peeling layer over the entire surface of the substrate 1901 if required.

The insulating films 1902 and 1904 are formed using an insulating material such as silicon oxide, silicon nitride, silicon oxynitride (SiOxNy) (x>y>0), or silicon nitride oxide (SiNxOy) (x>y>0), by a CVD method, a sputtering method, or the like. For example, when each of the insulating film 1902 and the insulating film 1904 has a two-layer structure, it is preferable that a silicon nitride oxide film be formed as a first insulating film and a silicon oxynitride film be formed as a second insulating film. Alternatively, a silicon nitride film may be formed as the first insulating film and a silicon oxide film may be formed as the second insulating film. The insulating film 1902 functions as a blocking layer which prevents an impurity element from being mixed into the peeling layer 1903 or an element formed thereover from the substrate 1901. The insulating film 1904 functions as a blocking layer which prevents an impurity element from being mixed into the element formed thereover from the substrate 1901 and the peeling layer 1903. In this manner, the insulating film 1902 and the insulating film 1904 functioning as the blocking layers are formed, thereby the element formed thereover can be prevented from being adversely affected by alkali metal such as Na and alkali earth metal from the substrate 1901; and an impurity element included in the peeling layer 1903. Note that when quartz is used for the substrate 1901, the insulating films 1902 and 1904 may be omitted.

As the peeling layer 1903, a metal film, a stacked-layer structure of a metal film and a metal oxide film, or the like can be used. The peeling layer 1903 is formed to have a single-layer structure or a stacked-layer structure, and is formed using a film which is formed of an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), and iridium (Ir), or an alloy material or a compound material containing such an element as a main component. These materials can be formed by using a sputtering method, various CVD methods such as a plasma CVD method, or the like. As the stacked-layer structure of a metal film and a metal oxide film, after the aforementioned metal film is formed, plasma treatment in an oxygen atmosphere or an $N_2O$ atmosphere, or heat treatment in an oxygen atmosphere or an $N_2O$ atmosphere is performed so that an oxide or an oxynitride of the metal film can be formed on a surface of the metal film. For example, when a tungsten film is formed as the metal film by a sputtering method, a CVD method, or the like, plasma treatment is performed on the tungsten film so that a metal oxide film of tungsten oxide can be formed on a surface of the tungsten film. In this case, an oxide of tungsten is expressed by $WO_x$, and x is 2 to 3. There are cases of x=2 ($WO_2$), x=2.5 ($W_2O_5$), x=2.75 ($W_4O_{11}$), x=3 ($WO_3$), and the like. When an oxide of tungsten is formed, the value of x described above is not particularly limited, and the oxide to be formed may be determined based on an etching rate or the like. Alternatively, for example, after a metal film (such as tungsten) is formed, an insulating film of silicon oxide ($SiO_2$) or the like may be formed over the metal film by a sputtering method, and a metal oxide may be formed over the metal film (for example, tungsten oxide may be formed over tungsten). In addition, as plasma treatment, the aforementioned high-density plasma treatment may be performed, for example. Further, instead of the metal oxide film, a metal nitride or a metal oxynitride may also be used. In this case, plasma treatment or heat treatment may be performed on the metal film in a nitrogen atmosphere or an atmosphere of nitrogen and oxygen.

The semiconductor film 1905 is formed to have a thickness of 25 to 200 nm (preferably, 30 to 150 nm) by a sputtering method, an LPCVD method, a plasma CVD method, or the like.

Next, the semiconductor film 1905 is crystallized by being irradiated with laser light. The semiconductor film 1905 may be crystallized by a method which combines a laser irradiation method and a thermal crystallization method using an RTA or an annealing furnace or a thermal crystallization method using a metal element for promoting crystallization, or the like. After that, as shown in FIG. 17B, the obtained crystalline semiconductor film is etched into a desired shape; therefore, crystalline semiconductor films 1905a to 1905e are formed, and a gate insulating film is formed so as to cover at least the crystalline semiconductor films 1905a to 1905c. Note that here, a gate insulating film 1906 is formed so as to cover the crystalline semiconductor films 1905a to 1905e.

Note that the gate insulating film 1906 is formed using an insulating material such as silicon oxide, silicon nitride, silicon oxynitride (SiOxNy) (x>y>0), or silicon nitride oxide (SiNxOy) (x>y>0), by a CVD method, a sputtering method, or the like. For example, when the gate insulating film 1902 has a two-layer structure, it is preferable that a silicon oxynitride film be formed as a first insulating film and a silicon nitride oxide film be formed as a second insulating film. Alternatively, a silicon oxide film may be formed as the first insulating film and a silicon nitride film may be formed as the second insulating film.

An example of a manufacturing step of the crystalline semiconductor films 1905a to 1905e is briefly described below. First, an amorphous semiconductor film having a thickness of 50 to 60 nm is formed by a plasma CVD method. Next, a solution containing nickel, which is a metal element for promoting crystallization, is retained on the amorphous semiconductor film, and dehydrogenation treatment (at 500° C., for one hour) and thermal crystallization treatment (at 550° C., for four hours) are performed on the amorphous semiconductor film so that a crystalline semiconductor film is formed. After that, the crystalline semiconductor film is irradiated with laser light, and the crystalline semiconductor films 1905a to 1905e are formed by using a photolithography method. Note that the amorphous semiconductor film may be crystallized only by laser light irradiation, without the thermal crystallization which uses the metal element for promoting crystallization.

Note that as a laser oscillator for crystallization, a continuous wave laser beam (a CW laser beam) or a pulsed wave laser beam (a pulsed laser beam) can be used. As a laser beam which can be used here, a laser beam emitted from one or more of the following can be used: a gas laser such as an Ar laser, a Kr laser or an excimer laser; a laser of which medium is single crystalline YAQYVO$_4$, forsterite ($Mg_2SiO_4$), YAlO$_3$, or GdVO$_4$, or polycrystalline (ceramic) YAG, $Y_2O_3$, YVO$_4$, YAlO$_3$, or GdVO$_4$, added with one or more of Nd, Yb, Cr, Ti, Ho, Er, Tm, and Ta as a dopant; a glass laser; a ruby laser; an alexandrite laser; a Ti:sapphire laser; a copper vapor laser; or a gold vapor laser. Crystals with a large grain size can be obtained by irradiation with fundamental waves of such laser beams or second to fourth harmonics of the fundamental waves. For example, the second harmonic (532 nm) or the third harmonic (355 nm) of an Nd:YVO$_4$ laser (fundamental wave of 1064 nm) can be used. In this case, a power density of approximately 0.01 to 100 MW/cm$^2$ (preferably, 0.1 to 10 MW/cm$^2$) is required. Irradiation is conducted with a scanning rate of approximately 10 to 2000 cm/sec. Note that a laser using, as a medium, single crystalline YAG, $YVO_4$, forsterite ($Mg_2SiO_4$), $YAlO_3$, or $GdVO_4$ or polycrystalline (ceramic) YAG, $Y_2O_3$, $YVO_4$, $YAlO_3$, or $GdVO_4$ added with one or more of Nd, Yb, Cr, Ti, Ho, Er, Tm, and Ta as a dopant; an Ar ion laser; or a Ti:sapphire laser can be continuously oscillated. Furthermore, pulse oscillation thereof can be performed at a repetition rate of 10 MHz or more by performing Q-switch operation, mode locking, or the like. When a laser beam is oscillated at a repetition rate of 10 MHz or more, a semiconductor film is irradiated with a next pulse while the semiconductor film is melted by the laser beam and solidified. Accordingly, unlike in a case of using a pulsed laser with a low repetition rate, a solid-liquid interface can be continuously moved in the semiconductor film; therefore, crystal grains which continuously grow in a scanning direction can be obtained.

Further, the aforementioned high-density plasma treatment is performed on the crystalline semiconductor films 1905*a* to 1905*e* to oxidize or nitride surfaces thereof, so that the gate insulating film 1906 may be formed. For example, plasma treatment which introduces a mixed gas of an inert gas such as He, Ar, Kr, or Xe; and oxygen, nitrogen oxide ($NO_2$), ammonia, nitrogen, hydrogen, or the like is employed. When excitation of the plasma in this case is performed by introduction of a microwave, high-density plasma can be generated at a low electron temperature. By an oxygen radical (there is a case where an OH radical is included) or a nitrogen radical (there is a case where an NH radical is included) generated by the high-density plasma, the surface of the semiconductor film can be oxidized or nitrided.

By treatment using such high-density plasma, an insulating film having a thickness of 1 to 20 nm, typically 5 to 10 nm, is formed over the semiconductor film. Since the reaction of this case is a solid-phase reaction, interface state density between the insulating film and the semiconductor film can be extremely low. Since such high-density plasma treatment oxidizes (or nitrides) a semiconductor film (of crystalline silicon or polycrystalline silicon) directly, variation of a thickness of the insulating film to be formed can be extremely small, ideally. In addition, oxidation is not strengthened even in a crystal grain boundary of crystalline silicon, which makes a very preferable condition. That is, by a solid-phase oxidation of the surface of the semiconductor film by the high-density plasma treatment shown here, the insulating film with good uniformity and low interface state density can be formed without causing oxidation reaction abnormally in a crystal grain boundary.

As the gate insulating film 1906, only an insulating film formed by the high-density plasma treatment may be used; or an insulating film of silicon oxide, silicon oxynitride, silicon nitride, or the like may be formed thereover by a CVD method utilizing plasma or thermal reaction, so as to make stacked layers. In any case, a transistor which includes an insulating film formed by high-density plasma in a part of the gate insulating film or in the whole gate insulating film, can reduce variation of characteristics.

Further, the semiconductor films 1905*a* to 1905*e* obtained by irradiating a semiconductor film with a continuous wave laser beam or a laser beam oscillated at a repetition rate of 10 MHz or more and scanning the semiconductor film in one direction for crystallization, have a characteristic that the crystal grows in the scanning direction of the beam. When a transistor is provided so that the scanning direction is aligned with the channel length direction (a direction in which carriers flow when a channel forming region is formed) and the aforementioned gate insulating layer is used, a thin film transistor (TFT) with less characteristic variation and high electron field-effect mobility can be obtained.

Next, a first conductive film and a second conductive film are stacked over the gate insulating film 1906. Here, the first conductive film is formed to have a thickness of 20 to 100 nm by a CVD method, a sputtering method, or the like; and the second conductive film is formed to have a thickness of 100 to 400 nm. Each of the first conductive film and the second conductive film is formed using an element selected from tantalum (Ta), tungsten (W), titanium (Ti), molybdenum (Mo), aluminum (Al), copper (Cu), chromium (Cr), niobium (Nb) and the like, or an alloy material or a compound material containing the above-described element as its main component. Alternatively, they may be formed using a semiconductor material typified by polycrystalline silicon doped with an impurity element such as phosphorus. As an example of a combination of the first conductive film and the second conductive film, a tantalum nitride film and a tungsten film, a tungsten nitride film and a tungsten film, a molybdenum nitride film and a molybdenum film, and the like can be given. Since tungsten and tantalum nitride have high heat resistance, heat treatment for thermal activation can be performed after the first conductive film and the second conductive film are formed. In addition, in a case of a three-layer structure instead of a two-layer structure, a stacked-layer structure of a molybdenum film, an aluminum film, and a molybdenum film may be preferably adopted.

Next, a resist mask is formed by a photolithography method, and etching treatment for forming a gate electrode and a gate line is performed, so that a gate electrode 1907 is formed above the semiconductor films 1905*a* to 1905*c*. Here, an example in which a stack-layer structure of a first conductive film 1907*a* and a second conductive film 1907*b* is provided as the gate electrode 1907 is shown.

Next, as shown in FIG. 17C, with use of the gate electrode 1907 as a mask, an impurity element imparting n-type conductivity is added to the semiconductor films 1905*a* to 1905*e* at a low concentration by an ion doping method or an ion implantation method, and subsequently, a resist mask is selectively formed by a photolithography method and an impurity element imparting p-type conductivity is added at a high concentration. As an n-type impurity element, phosphorus (P), arsenic (As), or the like can be used. As a p-type impurity element, boron (B), aluminum (Al), gallium (Ga), or the like can be used. Here, phosphorus (P) is used for the impurity element imparting n-type conductivity, and is selectively introduced into the semiconductor films 1905*a* to 1905*e* at a concentration of $1\times10^{15}$ to $1\times10^{19}/cm^3$, so that an n-type impurity region 1908 is formed. Further, boron (B) is used for the impurity element imparting p-type conductivity, and is selectively introduced into the semiconductor films 1905*c* and 1905*e* at a concentration of $1\times10^{19}$ to $1\times10^{20}/cm^3$, so that a p-type impurity region 1909 is formed.

Then, an insulating film is formed so as to cover the gate insulating film 1906 and the gate electrode 1907. The insulating film is formed to have a single-layer structure or a stacked-layer structure, and is formed using a film including an inorganic material of silicon, oxide of silicon, or nitride of silicon, or a film including an organic material such as an organic resin by a plasma CVD method, a sputtering method, or the like. Next, the insulating film is selectively etched by anisotropic etching mainly in a perpendicular direction, so that an insulating film 1910 (also referred to as a side wall) which is in contact with a side face of the gate electrode 1907 is formed. The insulating film 1910 is used as a mask for doping when an LDD (Lightly Doped Drain) region is formed.

Next, with use of the resist mask formed by a photolithography method, the gate electrode 1907 and the insulating film 1910 as masks, an impurity element imparting n-type conductivity is added to the semiconductor films 1905a, 1905b, and 1905d at a high concentration, so that n-type impurity regions 1911 are formed. Here, phosphorus (P) is used for the impurity element imparting n-type conductivity, and is selectively introduced into the semiconductor films 1905a, 1905b, and 1905d at a concentration of $1\times10^{19}$ to $1\times10^{20}/cm^3$, so that the n-type impurity regions 1911 with high concentration are formed.

According to the above-described steps, as shown in FIG. 17D, n-channel thin film transistors 1900a and 1900b and a p-channel thin film transistor 1900c are formed. Note that in the n-type impurity regions 1911 and the p-type impurity region 1909, the n-type impurity region 1911 and the p-type impurity region 1909 used for a thermoelectric element 1900d are referred to as an n-type semiconductor layer 1911d and a p-type semiconductor layer 1909d, respectively.

Note that in the n-channel thin film transistor 1900a, a channel forming region is formed in a region of the semiconductor film 1905a, which overlaps with the gate electrode 1907; the impurity region 1911 forming a source region or a drain region is formed in a region which does not overlap with the gate electrode 1907 and the insulating film 1910; and a low concentration impurity region (LDD region) is formed in a region which overlaps with the insulating film 1910 and is between the channel forming region and the impurity region 1911. Similarly, in the n-channel thin film transistor 1900b, a channel forming region, a low concentration impurity region, and the impurity region 1911 are formed.

In addition, in the p-channel thin film transistor 1900c, a channel forming region is formed in a region of the semiconductor film 1905c, which overlaps with the gate electrode 1907; and the impurity region 1909 forming a source region or a drain region is formed in a region which does not overlap with the gate electrode 1907. Note that although the p-channel thin film transistor 1900c is not provided with an LDD region here, the p-channel thin film transistor may be provided with an LDD region or the n-channel thin film transistor may have a structure where an LDD region is not provided.

Figure 18A:
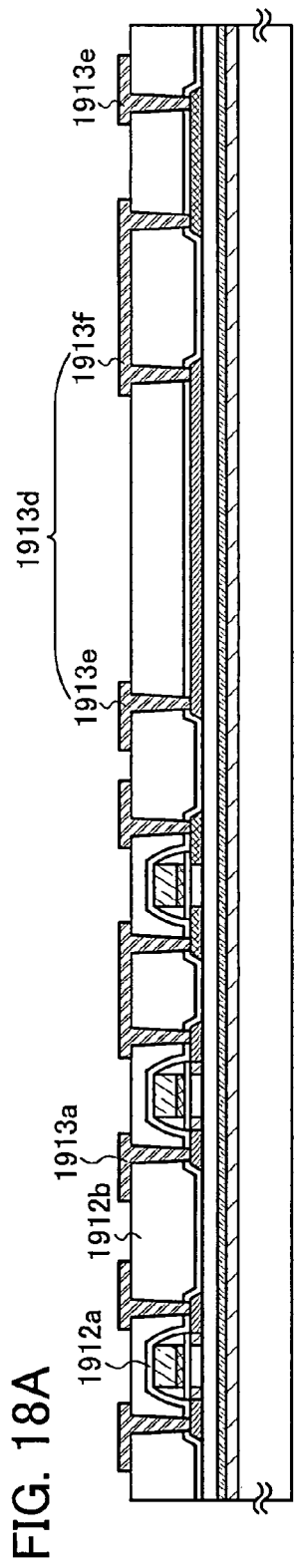
FIGS. 18A to 18C are views showing a structure of a semiconductor device in Embodiment Mode 3.

Next, as shown in FIG. 18A, an insulating film with a single-layer structure or a stacked-layer structure is formed so as to cover the semiconductor films 1905a to 1905e, the gate electrode 1907, and the like. Then, a conductive film 1913a which is electrically connected to the impurity regions forming a source region or a drain region of the thin film transistors 1900a to 1900c, and a conductive film 1913d which is electrically connected to the p-type semiconductor layer 1909d and the n-type semiconductor layer 1911d are formed over the insulating film in the same step. The insulating film is formed to have a single-layer structure or a stacked-layer structure, and is formed using an inorganic material such as oxide of silicon or nitride of silicon; an organic material such as polyimide, polyamide, benzocyclobutene, acrylic, or epoxy; a siloxane material; or the like, by a CVD method, a sputtering method, an SOG method, a droplet discharge method, a screen printing method, or the like. Here, the insulating film has a two-layer structure, and a silicon nitride oxide film is formed as a first insulating film 1912a and a silicon oxynitride film is formed as a second insulating film 1912b. The conductive film 1913a forms a source electrode or a drain electrode of the semiconductor films 1905a to 1905c. In the conductive film 1913d, a first electrode of the thermoelectric element is referred to as a conductive film 1913e and a second electrode thereof is referred to as a conductive film 1913f.

Note that before the insulating films 1912a and 1912b are formed or after one or more thin films of the insulating films 1912a and 1912b are formed, heat treatment for recovering the crystallinity of the semiconductor film, for activating the impurity element added to the semiconductor film, or for hydrogenating the semiconductor film is preferably performed. For the heat treatment, thermal annealing, a laser annealing method, an RTA method, or the like is preferably applied.

The conductive film 1913a and the conductive film 1913d are formed to have a single-layer structure or a stacked-layer structure, and are formed using an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing the above-described element as its main component, by a CVD method, a sputtering method, or the like. An alloy material containing aluminum as its main component corresponds to a material which contains aluminum as its main component and also contains nickel; or an alloy material which contains aluminum as its main component and also contains nickel and one or both of carbon and silicon, for example. The conductive film 1913a and the conductive film 1913d preferably employs a stacked-layer structure of a barrier film, an aluminum-silicon (Al—Si) film, and a barrier film; or a stacked-layer structure of a barrier film, an aluminum-silicon (Al—Si) film, a titanium nitride (TiN) film, and a barrier film, for example. Note that a barrier film corresponds to a thin film formed using titanium, nitride of titanium, molybdenum, or nitride of molybdenum. Since aluminum and aluminum silicon have low resistance and are inexpensive, they are optimal materials for forming the conductive film 1913a and the conductive film 1913d. In addition, generation of a hillock of aluminum or aluminum silicon can be prevented when upper and lower barrier layers are formed. Further, when the barrier film is formed using titanium which is a highly-reducible element, even if a thin natural oxide film is formed over the crystalline semiconductor film, the natural oxide film is reduced so that preferable contact with the crystalline semiconductor film can be obtained.

Figure 18B:
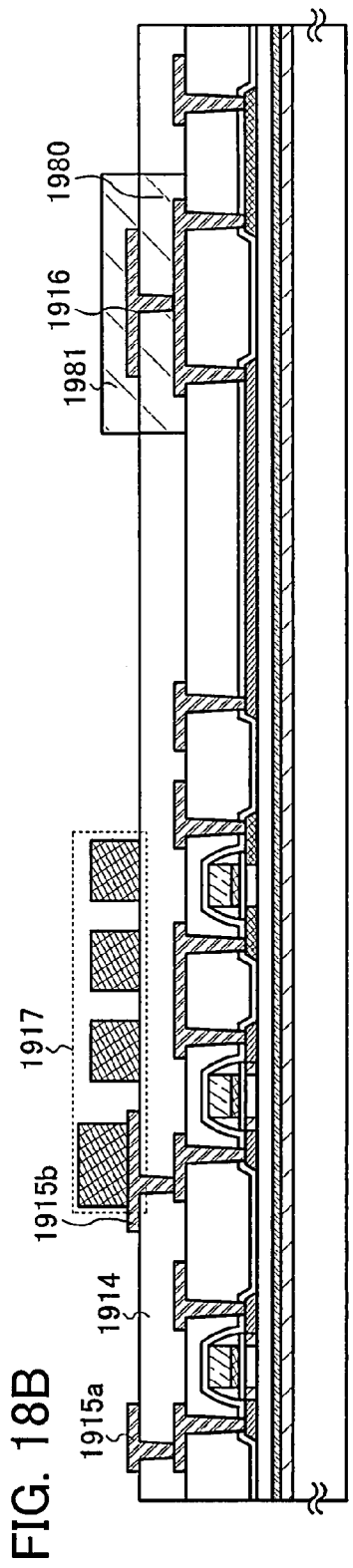

Next, as shown in FIG. 18B, an insulating film 1914 is formed so as to cover the conductive films 1913a and 1913d, and an opening is formed in a region which covers the conductive film 1913f; and contact holes for forming conductive films 1915a and 1915b each of which is electrically connected to the conductive film 1913a already connected to the semiconductor films 1905a and 1905b are formed. In the opening, that is, a groove, a sacrificial layer 1980 is formed, and subsequently, a contact hole reaching the conductive film 1913f is formed. Then, a conductive film 1916 which is electrically connected to the conductive films 1915a and 1915b and the conductive film 1913f is formed. Note that the conductive films 1915a and 1915b and the conductive film 1916 may be formed using the same material at the same time. These conductive films can be formed using any of the aforementioned materials of the conductive films 1913. Note that the sacrificial layer 1980 and a sacrificial layer 1981 to be formed later may be stacked in consideration of alignment margin.

Note that the insulating film 1914 can have a single-layer structure or a stacked-layer structure using an insulating film containing oxygen or nitrogen, such as silicon oxide (SiOx), silicon nitride (SiNx), silicon oxynitride (SiOxNy) (x>y), or silicon nitride oxide (SiNxOy) (x>y); a film containing carbon such as DLC (Diamond Like Carbon); an organic material such as epoxy, polyimide, polyamide, polyvinyl phenol, benzocyclobutene, or acrylic; or a siloxane material such as a siloxane resin, by a CVD method, a sputtering method, or the like. Note that a siloxane material corresponds to a material having Si—O—Si bonds. Siloxane has a skeleton formed of a bond of silicon (Si) and oxygen (O). As a substituent, an organic group (for example, an alkyl group or an aryl group) containing at least hydrogen is used. Alternatively, a fluoro group may be used. Further alternatively, an organic group containing at least hydrogen and a fluoro group may be used as a substituent.

Next, a conductive film 1917 functioning as an antenna, which is electrically connected to the conductive film 1915b, is formed.

The conductive film 1917 is formed using a conductive material by a CVD method, a sputtering method, a printing method such as screen printing or gravure printing, a droplet discharge method, a dispenser method, a plating method, or the like. The conductive material is formed to have a single-layer structure or a stacked-layer structure using an element selected from aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material containing the above-described element as its main component.

For example, when the conductive film 1917 functioning as the antenna is formed by a screen printing method, the conductive film can be formed by selectively printing a conductive paste in which conductive particles each having a grain size of several nm to several tens of μm are dissolved or dispersed in an organic resin. As the conductive particle, a fine particle or a dispersive nanoparticle of one or more metals of silver (Ag), gold (Au), copper (Cu), nickel (Ni), platinum (Pt), palladium (Pd), tantalum (Ta), molybdenum (Mo), and titanium (Ti), or silver halide can be used. Further, as the organic resin contained in the conductive paste, one or a plurality of organic resins each functioning as a binder, a solvent, a dispersant, or a coating of the metal particle can be used. Typically, an organic resin such as an epoxy resin or a silicon resin can be used. When the conductive film is formed, baking is preferably performed after the conductive paste is applied. For example, when fine particles (of which grain size is 1 to 100 nm) containing silver as its main component is used as a material of the conductive paste, the conductive film can be obtained by hardening the conductive paste by baking at a temperature of 150 to 300° C. Alternatively, fine particles containing solder or lead-free solder as its main component may be used; in this case, it is preferable to use a fine particle having a grain size of 20 μm or less. Solder and lead-free solder have an advantage such as low cost.

The conductive film 1915a can function as a wiring in a later step, which is electrically connected to a battery included in the semiconductor device of this embodiment mode. When the conductive film 1917 functioning as the antenna is formed, another conductive film is formed to be electrically connected to the conductive films 1915a and 1915b, so as to be used as a wiring connected to the battery. Note that the conductive film 1917 in FIG. 18B corresponds to the antenna circuit shown in Embodiment Mode 1.

Figure 18C:
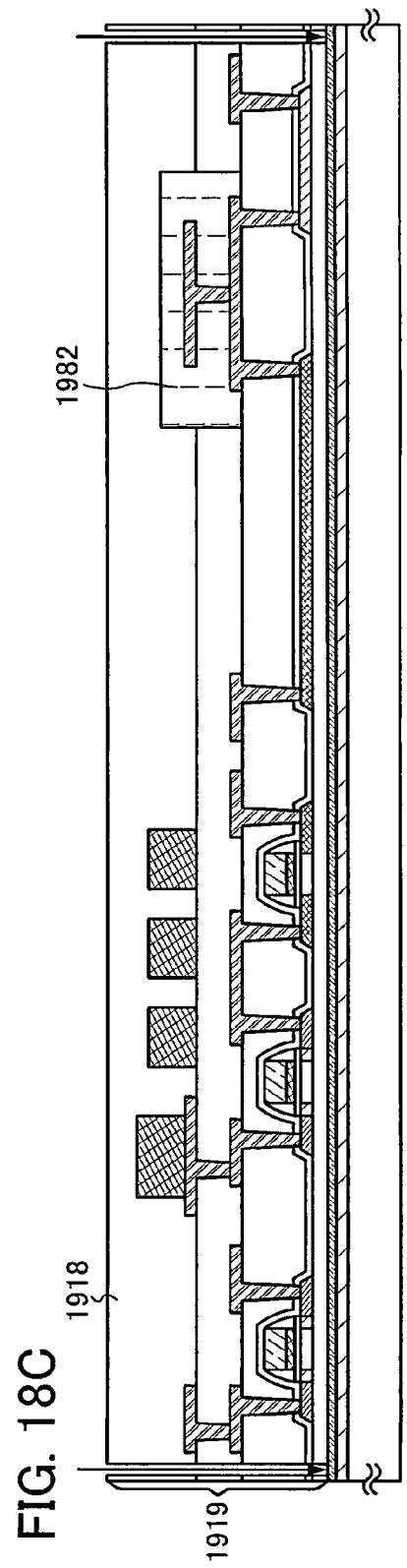

Next, the sacrificial layer 1981 formed using the same material as the sacrificial layer 1980 is formed so as to cover the conductive film 1916. Further, as shown in FIG. 18C, an insulating film 1918 is formed so as to cover the sacrificial layer 1981 and the conductive film 1917, and a contact hole reaching the sacrificial layer 1981 is formed. An etchant is introduced into the contact hole, thereby the sacrificial layer is removed and a space 1982 is formed. Note that as shown in Embodiment Mode 1, the etchant and the sacrificial layer are not particularly limited as long as their materials have sufficient selectivity between the sacrificial layer and the structure. That is, a material having sufficient selectivity between the sacrificial layer and the conductive film 1913f, the insulating film 1914 and the insulating film 1918 may be selected as appropriate.

As a second electrode of the thermoelectric element, the conductive film 1913f and the conductive film 1916 connected thereto are used here. With such a structure, a contact area of air or the like filling the space and the second electrode can be increased, so that a heat dissipation effect can be improved. Further, the second electrode is made larger, so that a temperature change of the electrode can be suppressed. Therefore, the thermoelectric element in which a temperature difference between the electrodes can be easily generated, that is, the thermoelectric element in which electric power can be more easily obtained, can be obtained. Note that as the second electrode of the thermoelectric element, only the conductive film 1913f may be used.

Note that the insulating film 1918 can have a single-layer structure or a stacked-layer structure by using an insulating film containing oxygen or nitrogen, such as silicon oxide, (SiOx), silicon nitride (SiNx), silicon oxynitride (SiOxNy) (x>y), or silicon nitride oxide (SiNxOy) (x>y); a film containing carbon such as DLC (Diamond Like Carbon); an organic material such as epoxy, polyimide, polyamide, polyvinyl phenol, benzocyclobutene, or acrylic; or a siloxane material such as siloxane resin, by a CVD method, a sputtering method, or the like. A material similar to that of the insulating film 1914 can be used, and preferably, a film with high planarity is used.

Next, a layer (hereinafter referred to as an element formation layer 1919) including the thin film transistor 1900a to 1900c, the thermoelectric element 1900d, the conductive film 1917, and the like is peeled from the substrate 1901. Here, after an opening is formed in a region except for a portion where the thin film transistor 1900a to 1900c and the thermoelectric element 1900d are formed by laser light (for example, UV light) irradiation, the element formation layer 1919 can be peeled from the substrate 1901 by using physical force. Alternatively, before the element formation layer 1919 is peeled from the substrate 1901, an etchant may be introduced into the opening so that the peeling layer 1903 is selectively peeled off. As the etchant, gas or liquid containing halogen fluoride or an interhalogen compound is used; for example, chlorine trifluoride (ClF$_3$) is used as a gas containing halogen fluoride. Accordingly, the element formation layer 1919 is peeled from the substrate 1901. Note that the peeling layer 1903 may be partially left instead of being removed entirely; therefore, consumption of the etchant can be reduced and processing time to remove the peeling layer can be shortened. In addition, the element formation layer 1919 can be retained over the substrate 1901 even after the peeling layer 1903 is removed. In addition, the substrate 1901 from which the element formation layer 1919 has been peeled off may be reused, so that the cost can be reduced.

In this embodiment mode, as shown in FIG. 19A, after the opening is formed in the element formation layer 1919 by laser light irradiation, a first sheet material 1920 is attached to one surface of the element formation layer 1919 (a surface of the insulating film 1918 which is exposed), and subsequently, the element formation layer 1919 is peeled from the substrate 1901.

Next, as shown in FIG. 19B, a second sheet material 1921 is attached to the other surface (a surface exposed by peeling) of the element formation layer 1919 by one or both of heat treatment and pressure treatment. A hot melt film or the like can be used for the first sheet material 1920 and the second sheet material 1921.

Further, for the first sheet material 1920 and the second sheet material 1921, a film on which antistatic treatment for preventing static electricity or the like is performed (hereinafter referred to as an antistatic film) can be used. As the antistatic film, a film with an antistatic material dispersed in a resin, a film with an antistatic material attached thereon, and the like can be taken as an example. The film provided with an antistatic material may be a film provided with an antistatic material over one of its surfaces, or a film provided with an antistatic material over both of its surfaces. As for the film provided with an antistatic material over one of its surfaces, the film may be attached to a layer so that the antistatic material is placed on the inner side of the film or the outer side of the film. The antistatic material may be provided over the entire or a part of the surface of the film. As the antistatic material here, a metal, indium tin oxide (ITO), a surfactant such as an amphoteric surfactant, a cationic surfactant, or a nonionic surfactant can be used. Alternatively, as the antistatic material, a resin material containing crosslinkable copolymer having a carboxyl group and a quaternary ammonium base on its side chain, or the like can be used. By attaching, mixing, or applying such a material to a film, an antistatic film can be formed. Sealing is performed by the antistatic film, so that adverse effects on a semiconductor element due to static electricity or the like from the outside can be suppressed when the semiconductor device is treated as a commercial product.

Note that a battery (not shown) is formed to be electrically connected to the conductive film 1915a and the conductive film 1913f. Connection to the battery may be established before the element formation layer 1919 is peeled from the substrate 1901 (at a stage of FIG. 18B or 18C); after the element formation layer 1919 is peeled from the substrate 1901 (at a stage of FIG. 19A); or after the element formation layer 1919 is sealed by the first sheet material and the second sheet material (at a stage of FIG. 19B). Hereinafter, an example in which the element formation layer 1919 and the battery are formed to be connected is described with reference to FIGS. 20A to 21B. Note that connection to the power generation element is omitted here, and connection to the thin film transistor is described as an example.

In FIG. 18B, a conductive film 1931a electrically connected to the conductive film 1915a is formed at the same time as the conductive film 1917 functioning as the antenna. Further, when a contact hole which reaches the sacrificial layers 1980 and 1981 is formed so that the sacrificial layers 1980 and 1981 are removed, an opening 1932a is formed so as to expose a surface of the conductive film 1931a. As shown in FIG. 20A, after the opening is formed in the element formation layer 1919 by laser light irradiation, the first sheet material 1920 is attached to one surface of the element formation layer 1919 (the surface of the insulating film 1918 which is exposed), and subsequently, the element formation layer 1919 is peeled from the substrate 1901.

Next, as shown in FIG. 20B, after the second sheet material 1921 is attached to the other surface (the surface exposed by peeling) of the element formation layer 1919, the element formation layer 1919 is peeled from the first sheet material 1920. Accordingly, a material having low adhesion is used for the first sheet material 1920 here. Next, a conductive film 1934a which is electrically connected to the conductive film 1931a through the opening 1932a is selectively formed.

The conductive film 1934a is formed of a conductive material by a CVD method, a sputtering method, a printing method such as screen printing or gravure printing, a droplet discharge method, a dispenser method, a plating method, or the like. The conductive material is formed to have a single-layer structure or a stacked-layer structure using an element selected from aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material containing the above-described element as its main component.

Note that although an example where the conductive film 1934a is formed after the element formation layer 1919 is peeled from the substrate 1901 is shown here, the element formation layer 1919 may be peeled from the substrate 1901 after the conductive film 1934a is formed.

Next, as shown in FIG. 21A, when a plurality of elements is formed over the substrate, the element formation layer 1919 is cut into each element by a laser irradiation apparatus, a dicing machine, a scribing machine, or the like. Here, each of a plurality of elements formed over the substrate is cut by laser light irradiation.

Next, as shown in FIG. 21B, the cut element is electrically connected to a connection terminal of the battery. Here, the conductive film 1934a provided for the element formation layer 1919 and the conductive film 1936a to be the connection terminal of the battery, which is provided over a substrate 1935, are connected to each other. The conductive film 1934a and the conductive film 1936a are attached by pressure with an adhesive material such as an ACF (Anisotropic Conductive Film) or ACP (Anisotropic Conductive Paste) so as to be electrically connected. An example where a conductive particle 1938 included in an adhesive resin 1937 is used for connection is shown here. In addition, conductive adhesive such as silver paste, copper paste, or carbon paste, a solder joint, or the like can be used for connection.

In a case where the battery is larger than the element, a plurality of elements is formed over one substrate and the element is connected to the battery after being cut as shown in FIGS. 20A to 21B, so that the number of elements formed over one substrate can be increased. Therefore, a semiconductor device can be manufactured at lower cost.

Thereafter, as shown in the aforementioned embodiment mode, the semiconductor device may be connected to the booster antenna.

In this embodiment, although a thermoelectric element which is a power generation element and a thin film transistor are formed over the same substrate; however, the power generation element can be separately formed and attached to an element formation layer including the thin film transistor.

Note that this embodiment mode can be freely implemented in combination with other embodiment modes.

[Embodiment Mode 4]

In this embodiment mode, an example of a semiconductor device different from that in the aforementioned embodiment modes and a manufacturing method thereof is described with reference to drawings. In this embodiment mode, a thermoelectric element of which first electrode and second electrode are provided above and below two kinds of semiconductors is used as the power generation element.

First, as shown in FIG. 22A, a peeling layer 2403 is formed over one surface of a substrate 2401 with an insulating film 2402 interposed therebetween, and sequentially, an insulating film 2404 functioning as a base film and a conductive film 2405 are stacked. Note that the insulating film 2402, the peeling layer 2403, the insulating film 2404, and the conductive film 2405 can be continuously formed.

The conductive film 2405 is formed to have a single-layer structure or a stacked-layer structure using an element selected from tungsten (W), molybdenum (Mo), titanium (Ti), niobium (Nb), nickel (Ni), cobalt (Co), zirconium (Zr), zinc (Zn), ruthenium (Ru), rhodium (Rh), palladium (Pd), osmium (Os), and iridium (Ir), or an alloy material or a compound material containing the above-described element as its main component. The conductive film can be formed by a sputtering method, a CVD method such as a plasma CVD method, or the like.

The substrate 2401, the insulating film 2402, the peeling layer 2403, and the insulating film 2404 can be formed using materials of the substrate 1901, the insulating film 1902, the peeling layer 1903, and the insulating film 1904 shown in the aforementioned embodiment mode, respectively.

Next, as shown in FIG. 22B, the conductive film 2405 is selectively etched so as to form conductive films 2405*a* to 2405*e*, and insulating films 2406 and 2407 are stacked so as to cover the conductive films 2405*a* to 2405*e*.

The insulating films 2406 and 2407 are formed using an insulating material such as silicon oxide, silicon nitride, silicon oxynitride (SiOxNy) (x>y>0), or silicon nitride oxide (SiNxOy) (x>y>0) by a CVD method, a sputtering method, or the like. For example, silicon nitride oxide can be used for the insulating film 2406 and silicon oxynitride can be used for the insulating film 2407. Although an example where two layers of insulating films are provided is shown here, only one of the insulating film 2406 and the insulating film 2407 may be provided or a stacked-layer structure of three or more insulating films may be employed. Note that in a region where the thermoelectric element is formed later, the insulating films 2406 and 2407 are removed by etching or the like.

Next, as shown in FIG. 22C, semiconductor films 2408*a*, 2408*b*, and 2408*d* are formed above the conductive films 2405*a*, 2405*b*, and 2405*d*; and semiconductor films 2408*e* and 2408*f* are formed above the conductive film 2405*c*. Here, an amorphous semiconductor film (for example, an amorphous silicon film) is formed over the insulating film 2407 to have a thickness of 25 to 200 nm (preferably 30 to 150 nm) by a sputtering method, an LPCVD method, a plasma CVD method, or the like. The amorphous semiconductor film is crystallized, and subsequently selectively etched, so that the semiconductor film is formed. A material of the semiconductor film, a crystallization method, and the like shown in the aforementioned embodiment modes can be used.

Note that when a surface of the insulating film 2407 is uneven due to the conductive films 2405*a* and 2405*b*, planarization treatment is preferably performed on the insulating film 2407 to make the surface of the insulating film 2407 flat before the amorphous semiconductor film is formed over the insulating film 2407. As planarization treatment, polishing treatment such as a CMP method can be used. As shown in FIG. 22B, the semiconductor film can be formed over the insulating film 2407 of which surface is planarized by polishing treatment such as a CMP method. Therefore, when an element is formed using the semiconductor films 2408*a* and 2408*b*, characteristics of the element can be less affected by unevenness of the surface of the insulating film 2407.

Next, as shown in FIG. 22D, an insulating film 2409 is formed so as to cover the semiconductor films 2408*a*, 2408*b*, and 2408*d* to 2408*f*, and a gate electrode 2410 is selectively formed above the semiconductor films 2408*a* and 2408*b*, and after that, an impurity element is added to the semiconductor films 2408*a*, 2408*b*, and 2408*d* to 2408*f* so that impurity regions 2411*a* and 2411*b* are formed. An impurity element imparting n-type conductivity or p-type conductivity is added. Note that impurity elements added to the semiconductor films 2408*d* and 2408*f* are required to have different conductivities from each other. As an n-type impurity element, phosphorus (P), arsenic (As), or the like can be used. As a p-type impurity element, boron (B), aluminum (Al), gallium (Ga), or the like can be used. Here, phosphorus (P), which is the impurity element imparting n-type conductivity, is introduced into the semiconductor films 2408*a*, 2408*b*, 2408*d*, and 2408*f* to form the impurity region 2411*a*. Further, boron (B), which is the impurity element imparting p-type conductivity, is introduced into the semiconductor film 2408*e* to form the impurity region 2411*b*. Note that the gate electrode 2410 can be formed using the gate electrode 1907 shown in the aforementioned embodiment mode. Here, an example in which a stack-layer structure of a first conductive film 2410*a* and second conductive film 2410*b* is provided as the gate electrode 2410 is shown.

According to the steps described above, n-channel thin film transistors 2400*a* and 2400*b*, a part of a thermoelectric element 2400*c*, and an element 2400*d* functioning as a capacitor are formed as shown in FIG. 22D.

In the n-channel thin film transistor 2400*a*, a channel forming region is formed in a region of the semiconductor film 2408*a*, which overlaps with the gate electrode 2410; and the impurity region 2411*a* forming a source region or a drain region is formed in a region which does not overlap with the gate electrode 2410 to be adjacent to the channel forming region. Similarly, in the n-channel thin film transistor 2400*b*, a channel forming region and the impurity region 2411*a* forming the source region or the drain region are formed.

The element 2400*d* forms a capacity in accordance with a stacked-layer structure of the conductive film 2405*d*, the insulating films 2406 and 2407, and the impurity region 2411*a* into which the impurity element is introduced.

The conductive film 2405 functions as a first electrode of the thermoelectric element 2400*c*. Although a second electrode thereof is not shown, the conductive film 1913*f*, or the conductive film 1913*f* and the conductive film 1916 connected thereto shown in Embodiment Mode 3 can be used for the second electrode. For example, in this embodiment mode, a space is provided over the conductive film 1913*f* and the conductive film 1916 is formed in the space as shown in Embodiment Mode 3. Since the thermoelectric element of which first electrode and second electrode are provided above and below two kinds of semiconductors is used as the power generation element, temperature difference between the electrodes can be easily generated. Therefore, an electromotive force can be more easily obtained.

Note that although an example where the n-channel thin film transistors 2400*a* and 2400*b* are provided is shown here, a p-channel thin film transistor may be provided, or as shown in the aforementioned embodiment mode, an insulating film may be provided in contact with a side face of the gate electrode 2410 and the semiconductor films of the n-channel thin film transistors 2400*a* and 2400*b* may be provided with a lightly doped drain region (LDD region).

Although an example where the conductive films 2405*a* and 2405*b* are formed to be larger than the semiconductor films 2408*a* and 2408*b*, it is not limited thereto. For example, as shown in FIG. 25, the conductive films 2405*a* and 2405*b* may be provided so as to overlap with a part of the impurity region 2411*a* and an entire surface of the channel forming region of the thin film transistors 2400*a* and 2400*b*. Alternatively, the conductive films 2405*a* and 2405*b* may be provided so as to overlap with a part of the impurity region 2411*a* and a part of the channel forming region, or may be provided so as to overlap with only a part of the channel forming region. In these cases, the insulating film 2407 is preferably planarized by polishing treatment such as CMP.

In this embodiment mode, as shown in FIGS. 22A to 22D, a structure where the conductive films 2405a and 2405b are provided opposite to the gate electrode with the semiconductor film interposed therebetween is shown. This structure is preferable since dielectric breakdown (ESD) of the semiconductor film due to concentration of static electricity in the semiconductor film can be suppressed by a leak through the conductive films 2405a and 2405b.

A constant potential is applied to the conductive films 2405a and 2405b in this embodiment mode, so that a short channel effect in accordance with downsizing of the transistor can be supressed. Therefore, a more nearly constant current value can be easily obtained in operation of the transistor in a saturation region regardless of a drain-source voltage Vds. Further, a constant potential is applied to the conductive films 2405a and 2405b in this embodiment mode, so that a threshold value can be controlled, which is preferable. At this time, a potential applied to the conductive films 2405a and 2405b is preferably a potential except a GND potential (0 V), and the potential applied thereto may be set as appropriate in accordance with a shift of the threshold value of the transistor.

Especially in this embodiment mode, in addition to the aforementioned effects, a structure where the conductive films 2405a and 2405b which are provided opposite to the gate electrode with the semiconductor film interposed therebetween are larger than the semiconductor film can be employed, so that physical strength of the semiconductor film in the transistor is increased. Therefore, breakage of the transistor because of physical force applied to the transistor can be prevented.

Further, a structure where the gate electrode 2410 and the conductive films 2405a and 2405b provided opposite to the gate electrode with the semiconductor film interposed therebetween are reversed, or a structure which has the same function may be employed so that each function can be complemented with each other. For example, on/off of the transistor may be controlled by the potential applied to the conductive films 2405a and 2405b, and suppression of the short channel effect and control of the threshold value of the transistor may be performed by applying a constant potential to the gate electrode 2410. Further, both of the gate electrode 2410 and the conductive films 2405a and 2405b may control on/off of the transistor in order to surely turn on and off the transistor.

Note that an antenna circuit formed later may be formed at the same time as the conductive films 2405a to 2405e in this embodiment mode. It is preferable to form the conductive films and the antenna circuit at the same time since the number of steps and the number of masks can be reduced, and the conductive films 2405a and 2405b can also function as wirings between the semiconductor films.

Figure 23A:
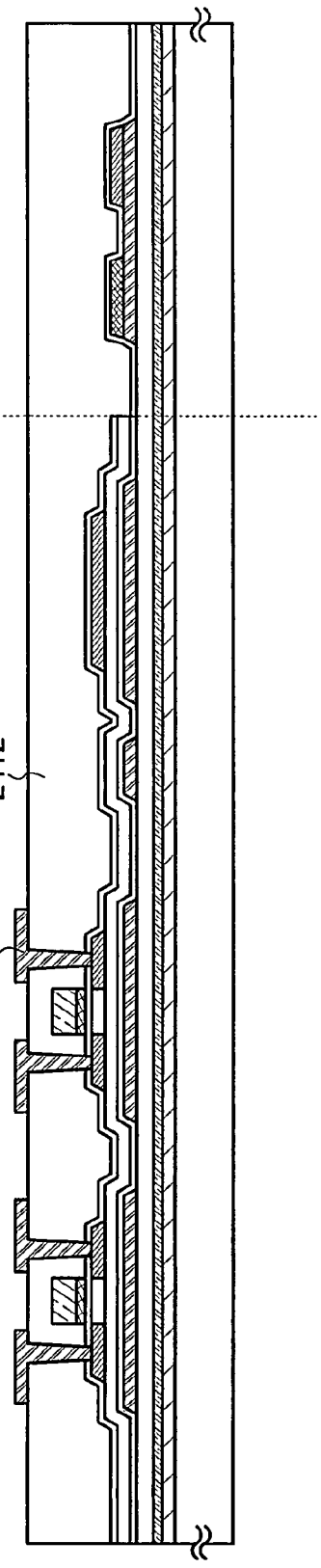
FIGS. 23A and 23B are views showing a structure of a semiconductor device in Embodiment Mode 4.

Next, as shown in FIG. 23A, an insulating film 2412 is formed so as to cover the thin film transistors 2400a and 2400b, the thermoelectric element 2400c, and the element 2400d. Then, a conductive film 2413, which is electrically connected to the impurity region 2411a forming a source region or a drain region of the thin film transistors 2400a and 2400b, is formed over the insulating film 2412.

The insulating film 2412 is formed to have a single-layer structure or a stacked-layer structure, and is formed using an inorganic material such as oxide of silicon or nitride of silicon; an organic material such as polyimide, polyamide, benzocyclobutene, acrylic, or epoxy; a siloxane material; or the like, by a CVD method, a sputtering method, an SOG method, a droplet discharge method, a screen printing method, or the like.

The conductive film 2413 can be formed using any material of the conductive films 1913 shown in the aforementioned embodiment mode.

Figure 23B:
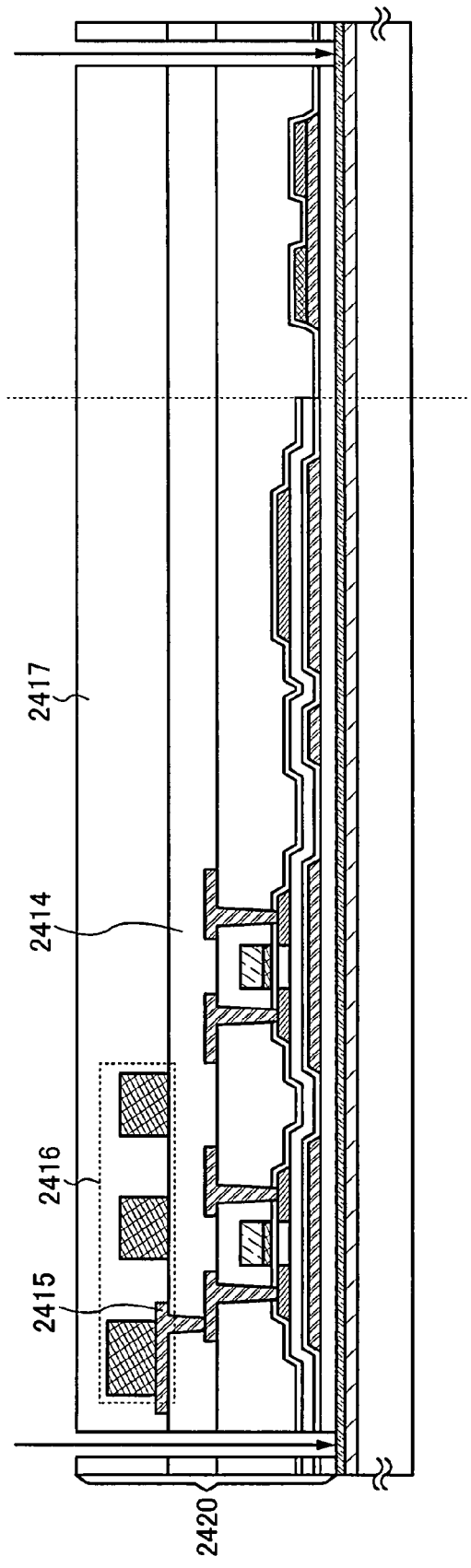

Next, as shown in FIG. 23B, an insulating film 2414 is formed so as to cover the conductive film 2413. Then, a conductive film 2415 which is electrically connected to the conductive film 2413 forming a source electrode or a drain electrode of the thin film transistor 2400a, is formed over the insulating film 2414, and subsequently, a conductive film 2416 functioning as an antenna is formed to be electrically connected to the conductive film 2415. Note that the conductive film 2416 in FIG. 23B corresponds to the antenna circuit shown in Embodiment Mode 1.

Next, after an insulating film 2417 is formed so as to cover the conductive film 2416, a layer (hereinafter referred to as an element formation layer 2420) including the thin film transistors 2400a and 2400b, the thermoelectric element 2400c, the element 2400d, the conductive film 2416, and the like is peeled from the substrate 2401. As a peeling method, any method shown in the aforementioned embodiment modes can be used.

Here, as shown in FIG. 24A, after an opening is formed in the element formation layer 2420 by laser light irradiation, a first sheet material 2418 is attached to one surface of the element formation layer 2420 (a surface of the insulating film 2417 which is exposed), and subsequently, the element formation layer 2420 is peeled from the substrate 2401.

Next, as shown in FIG. 24B, a second sheet material 2419 is attached to the other surface (a surface exposed by peeling) of the element formation layer 2420 by one or both of heat treatment and pressure treatment. A hot melt film or the like can be used for the first sheet material 2418 and the second sheet material 2419.

According to the steps described above, a semiconductor device can be manufactured. Note that in this embodiment mode, the element 2400d forming the capacity can be used as a battery. Alternatively, a battery may be provided independently of the element 2400d. In this case, a battery can be provided by a method shown in the aforementioned embodiment modes.

Note that a semiconductor device shown in this embodiment mode is not limited thereto. For example, a battery or a conductive film functioning as an antenna may be provided below the element formation layer 2420.

FIGS. 26A and 26B show an example where a battery is provided below the thin film transistors 2400a and 2400b. Here, an example is shown where a conductive film 2431a is provided so as to be electrically connected to the conductive film 2413 functioning as a source electrode or a drain electrode of the thin film transistor 2400b, and the conductive film 2431a and a conductive film 2433 forming a connection wiring of the battery are connected below the element formation layer 2420 (at a surface exposed by peeling of the element formation layer 2420 from the substrate 2401). Note that although a connection wiring of the battery and an electrode at an end portion of the thermoelectric element is not shown, connection can be performed in a manner similar to the aforementioned manner.

In a case where a battery is provided in this manner, in FIG. 23A, a first opening is formed in the gate insulating film 2409 and the insulating film 2412 in order to expose the impurity region 2411a of the thin film transistors 2400a and 2400b; and at the same time, as shown in FIG. 26A, a second opening is formed in the insulating films 2404, 2406, and 2407, the gate insulating film 2409, and the insulating film 2412; the conductive film 2413 is provided so as to fill the first opening; and the conductive film 2431a is formed so as to fill the second opening. The first opening and the second opening can be simultaneously formed. When the first opening is formed, the semiconductor films 2408a and 2408b function as stoppers; and when the second opening is formed, the peeling layer 2403 functions as a stopper. Thereafter, as described to explain FIGS. 23B and 24A, after the conductive film 2416 functioning as the antenna and the insulating film 2417 are sequentially formed, the element formation layer 2420 is peeled from the substrate 2401.

Thereafter, as shown in FIG. 26B, the conductive film 2431a formed on a surface which exposes the element formation layer 2420 peeled from the substrate 2401; and the conductive film 2433 to be the connection wiring of the battery provided over a substrate 2432 are connected to each other. Here, a case is shown where the conductive film 2431a and the conductive film 2433 are attached by pressure with an adhesive material such as an ACF (Anisotropic Conductive Film) or ACP (Anisotropic Conductive Paste) so as to be electrically connected. An example where a conductive particle 2435 included in an adhesive resin 2434 is used for connection is shown here. Alternatively, conductive adhesive such as silver paste, copper paste, or carbon paste, a solder joint, or the like can be used for connection.

Figure 27:
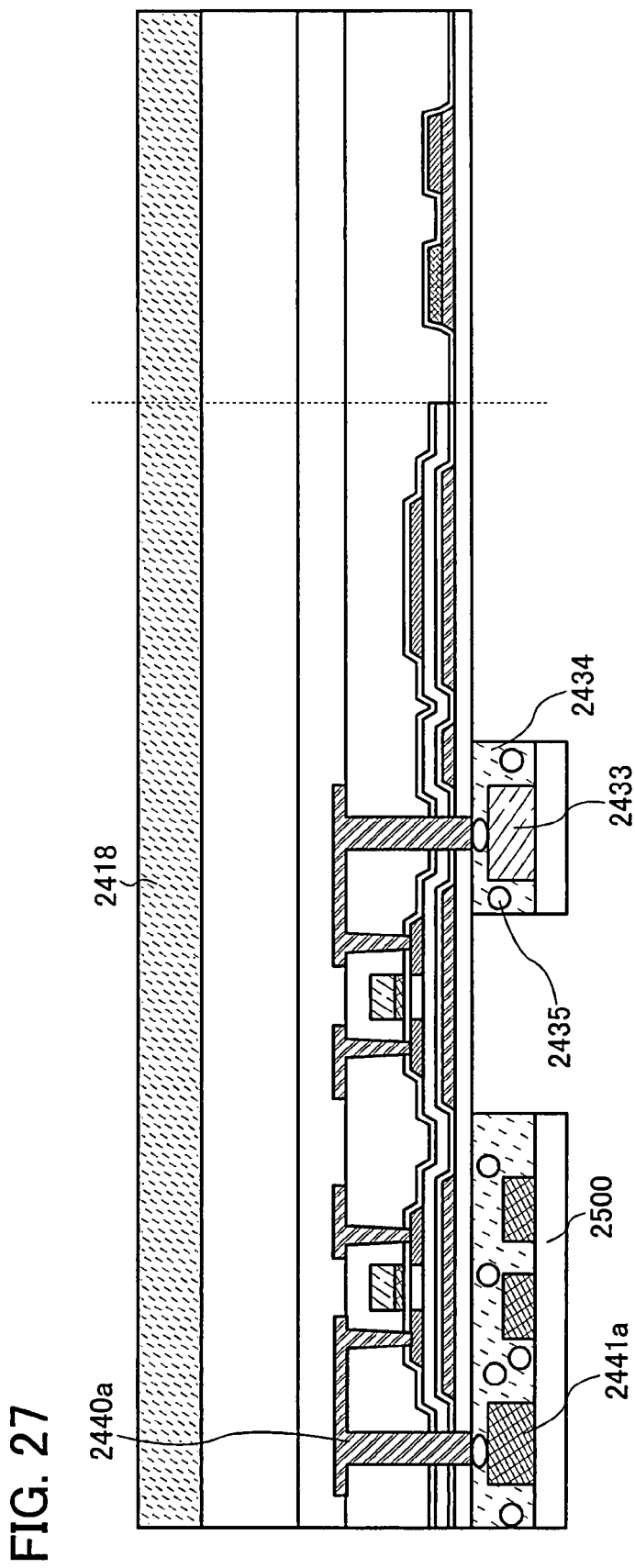
FIG. 27 is a view showing a structure of a semiconductor device in Embodiment Mode 4.

Note that in this embodiment mode, a conductive film functioning as an antenna as well as a battery may be provided below the element formation layer 2420. FIG. 27 shows an example where a battery and the conductive film 2416 functioning as an antenna are provided below the thin film transistors 2400a and 2400b.

Here, an example is shown where a conductive film 2440a is provided so as to be electrically connected to the conductive film 2413 functioning as the source electrode or the drain electrode of the thin film transistor 2400a, and the conductive film 2440a and a conductive film 2441a functioning as an antenna are connected below the element formation layer 2420 (at the surface exposed by peeling of the element formation layer 2420 from the substrate 2401). Note that a battery may be provided as shown in FIGS. 26A and 26B; therefore, description thereof is omitted.

In a case where an antenna is provided in this manner, in FIG. 23A, the first opening is formed in the gate insulating film 2409 and the insulating film 2412 in order to expose the impurity region 2411a of the thin film transistors 2400a and 2400b; and at the same time, as shown in FIG. 27, the second opening is formed in the insulating films 2404, 2406, and 2407, the gate insulating film 2409, and the insulating film 2412; the conductive film 2413 is provided so as to fill the first opening; and the conductive film 2440a is formed so as to fill the second opening. The first opening and the second opening can be simultaneously formed. When the first opening is formed, the semiconductor films 2408a and 2408b function as stoppers; and when the second opening is formed, the peeling layer 2403 functions as a stopper. Thereafter, the insulating films 2413 and 2417 are formed, and the element formation layer 2420 is peeled from the substrate 2401.

Thereafter, the conductive film 2440a formed on the surface which exposes the element formation layer 2420 peeled from the substrate 2401; and a conductive film 2441a functioning as the antenna provided over a substrate 2500 are connected using the conductive particle 2435 included in the adhesive resin 2434. Note that as described above, a connection method is not limited thereto.

Thus described, when the battery or the antenna is larger than an element provided with the thin film transistors 2400a and 2400b, and the like, the element formation layer and the battery or the antenna are preferably attached to be provided as shown in FIGS. 26A, 26B, and 27. When the battery or the antenna larger than the element is used, a plurality of elements is formed over one substrate and the battery or the antenna is attached to the element after the elements are cut, so that a semiconductor device can be manufactured at lower cost. Further, in this embodiment mode, the power generation element which is the thermoelectric element and the thin film transistor are formed over the same substrate; however, it may be attached to the element similarly to the battery and the antenna.

Note that this embodiment mode can be freely implemented in combination with other embodiment modes.

[Embodiment 1]

In this embodiment, use of a semiconductor device which communicates data by wireless communication (hereinafter referred to as an RFID) of the invention is described. A semiconductor device of the invention can be used as a so-called ID label, ID tag, and ID card provided in, for example, bills, coins, securities, bearer bonds, documents (such as driver's licenses or resident's cards), packaging containers (such as wrapping paper or bottles), storage media (such as DVD software or video tapes), vehicles (such as bicycles), personal belongings (such as bags or glasses), foods, plants, animals, human bodies, clothing, everyday articles, tags on goods such as an electronic appliance or on packs. An electronic appliance includes a liquid crystal display device, an EL display device, a television set (also simply called as a TV set, a TV receiver, or a television receiver), a mobile phone, and the like.

In this embodiment, an application of the invention and an example of a commercial product to which the invention is applied are described with reference to FIGS. 28A to 28E.

Figure 28A:
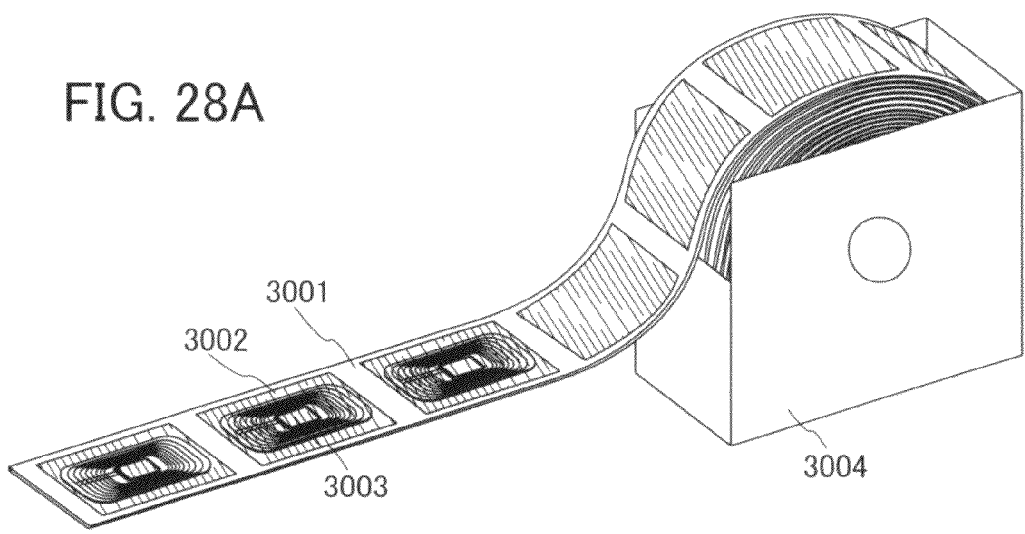
FIGS. 28A to 28E are views showing Embodiment 1.

FIG. 28A shows an example of a state of completed products of a semiconductor device including the RFID according to the invention. A plurality of ID labels 3003 each incorporating an RFID 3002 is formed on a label board 3001 (separate paper). The ID labels 3003 are put in a box 3004. On the ID label 3003, information on a commercial product or service (for example, a name of the product, a brand, a trademark, a trademark owner, a seller, a manufacturer, and the like) is written. In addition, an ID number which is specific to the commercial product (or the kind of the commercial product) is assigned to the incorporated RFID, so that forgery, infringement of intellectual property rights such as a patent and a trademark, and illegality such as unfair competition can be figured out. Further, a lot of information which is too much to write clearly on a container or a label of the commercial product, for example, production area, selling area, quality, raw material, efficacy, use, quantity, shape, price, production method, directions for use, production time, time of the use, expiration date, instructions of the commercial product, information on the intellectual property of the commercial product, and the like can be input in the RFID; therefore, a trader and a consumer can access the information by using a simple reader. The producer can also easily rewrite or delete the information, while the trader and the consumer are not allowed to rewrite or delete the information.

Figure 28B:
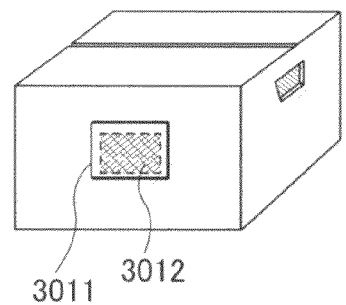

FIG. 28B shows an ID tag 3011 with a label shape, in which an RFID 3012 is incorporated. Management of a commercial product becomes easier by mounting the ID tag 3011 on the commercial product. For example, when the commercial product is stolen, the thief can be figured out quickly by tracing the pathway of the commercial product. In this way, commercial products which are superior in so-called traceability can be distributed by being provided with the ID tag.

Figure 28C:
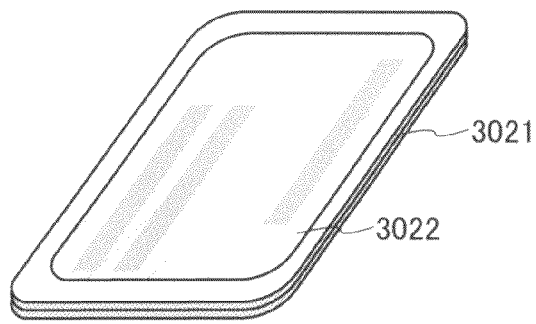

FIG. 28C shows an example of a state of a completed product of an ID card 3021 including an RFID 3022 according to the invention. The ID card 3021 includes all kinds of cards such as a cash card, a credit card, a prepaid card, an electronic ticket, electronic money, a telephone card, and a membership card.

Figure 28D:

FIG. 28D shows an example of a state of a completed product of a bearer bond 3031. An RFID 3032 is embedded in the bearer bond 3031 and is protected by a resin formed in the periphery thereof. Here, the resin includes fillers. The bearer bond 3031 can be formed by a way same as an ID label, an ID tag, and an ID card according to the invention. Note that the aforementioned bearer bond includes stamps, tickets, admission tickets, merchandise coupons, book coupons, stationery coupons, beer coupons, rice coupons, various gift coupons, various service coupons, and the like. Needless to say, it is not limited thereto. In addition, when the RFID 3032 of the invention is provided in bills, coins, securities, bearer bonds, documents, or the like, an authentication function can be provided; therefore, forgery can be prevented by use of the authentication function.

Figure 28E:
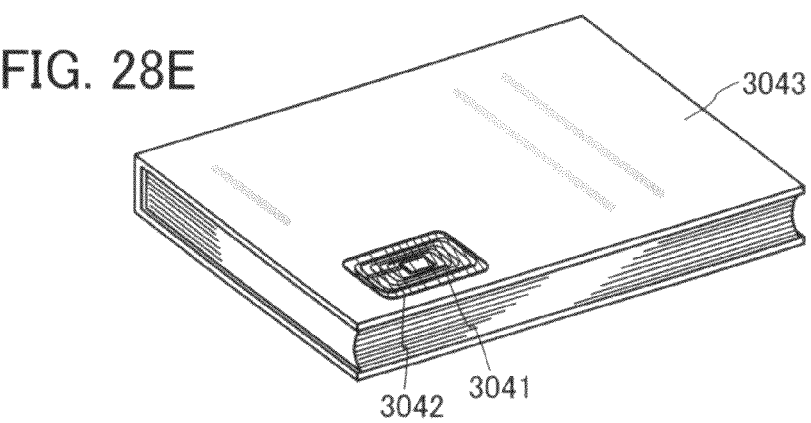
Figure 29:
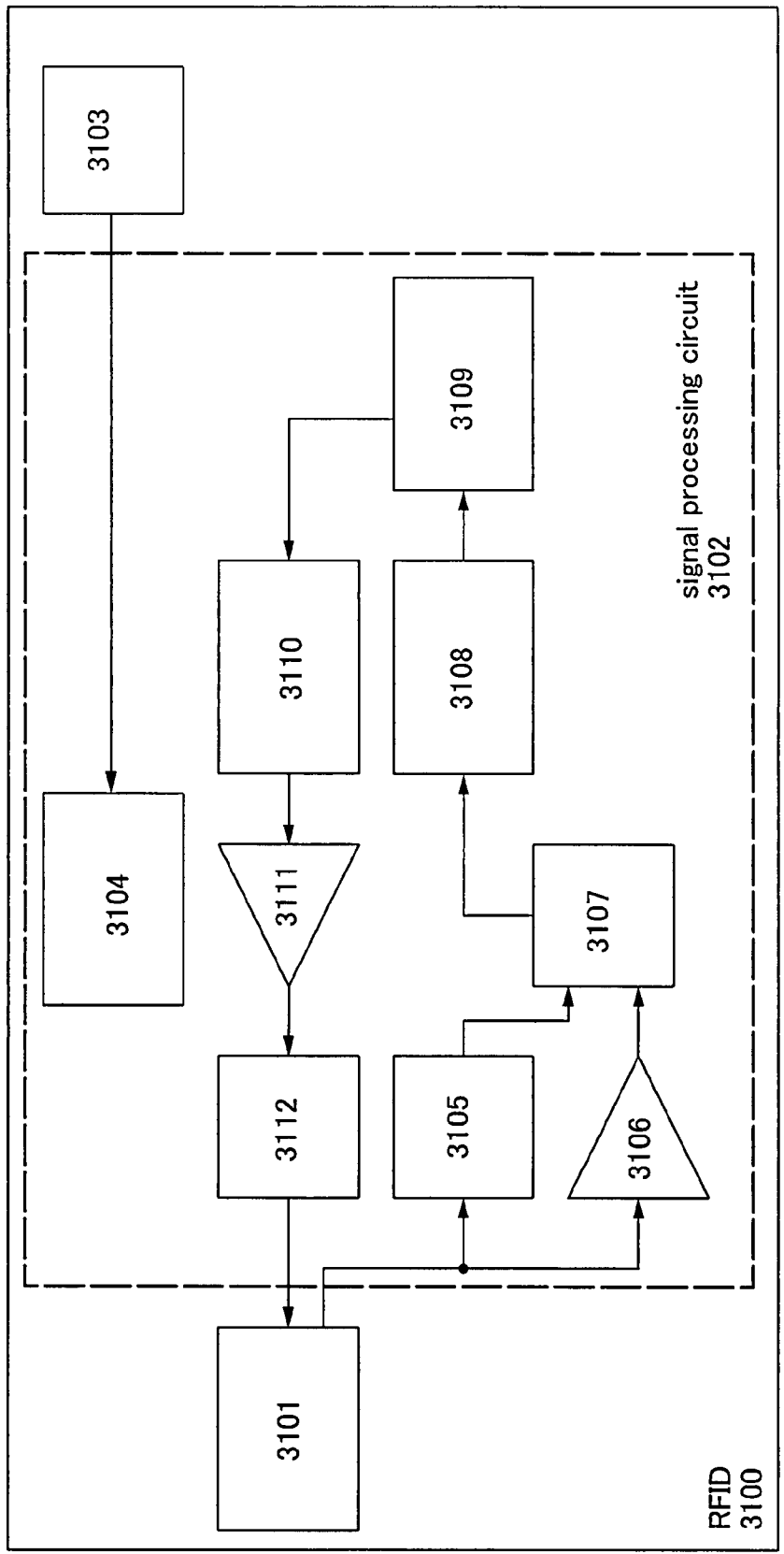
FIG. 29 is a diagram showing a conventional structure.
Figure 30:
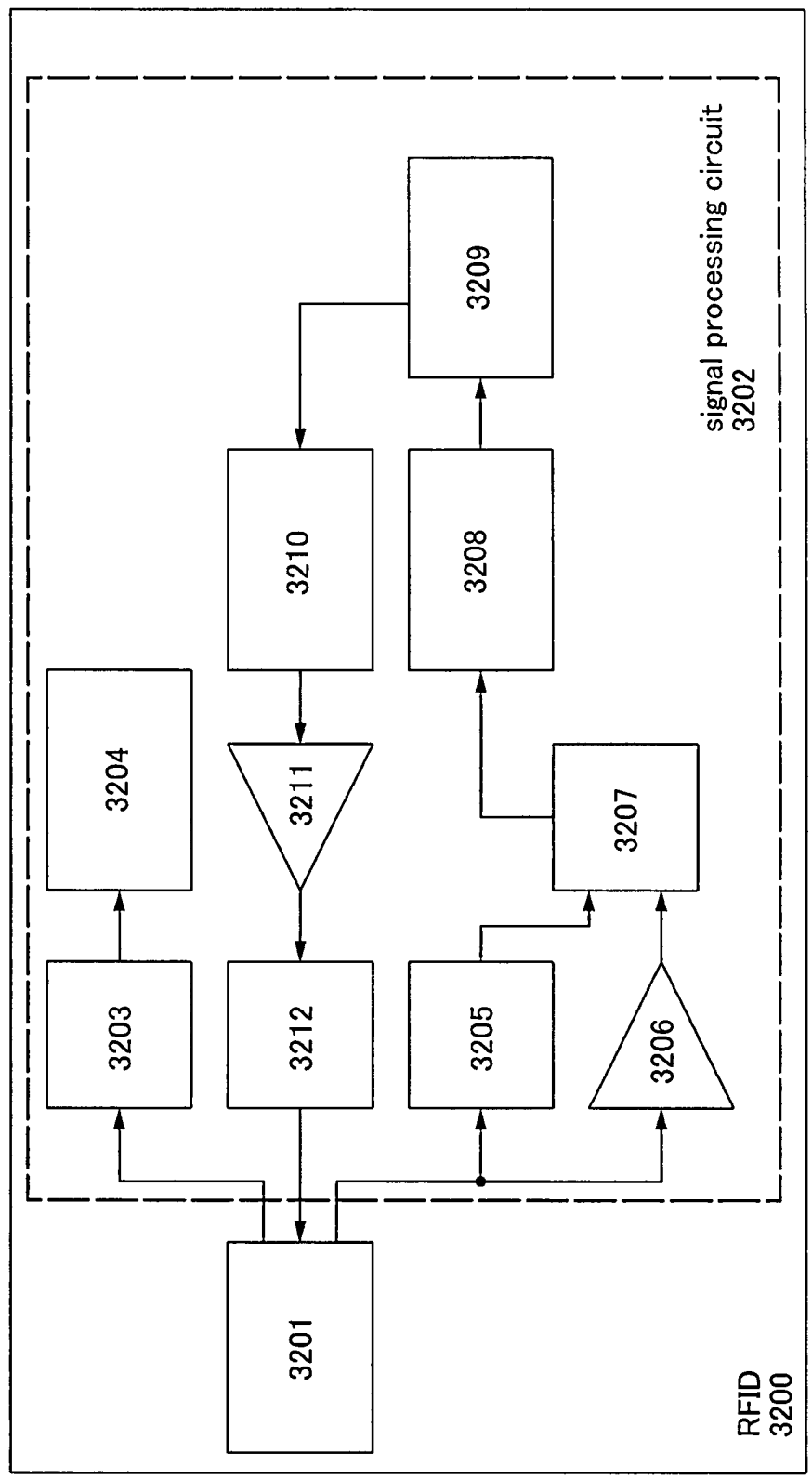
FIG. 30 is a diagram showing a conventional structure.

FIG. 28E shows a book 3043 to which an ID label 3041 including an RFID 3042 according to the invention is attached. The RFID 3042 of the invention is fixed on goods by, for example, being attached to a surface or embedded therein. As shown in FIG. 28E, the RFID 3042 can be embedded in paper of a book, or embedded in an organic resin of a package. Since the RFID 3042 of the invention can realize a small size, a thin shape, and light weight, it can be fixed on goods without spoiling the design thereof.

In addition, although not shown here, the efficiency of a system such as an inspection system can be improved by provision of the RFID of the invention for, for example, packaging containers, storage media, personal belongings, foods, clothing, everyday articles, electronic appliances, or the like. Further, counterfeits and theft can be prevented by provision of the RFID on vehicles. Individual creatures such as animals can be easily identified by being implanted with the RFID. For example, year of birth, sex, breed, and the like can be easily identified by implantation of the RFID in creatures such as domestic animals.

As described above, the RFID of the invention can be provided for any goods (including creatures). Note that a power generation element included in the semiconductor device of the invention may be selected as appropriate in accordance with use of the semiconductor device and handling of the goods. For example, when the goods operates actively or passively, a power generation element such as a piezoelectric element utilizing vibrational energy or an element utilizing electromagnetic induction may be used.

This embodiment can be freely implemented in combination with other embodiment modes. This application is based on Japanese Patent Application serial No. 2006-070388 filed in Japan Patent Office on May 15, 2006, the entire contents of which are hereby incorporated by reference.

The invention claimed is:

1. A semiconductor device comprising:
a power generation element;
a battery;
a booster circuit configured to boost an electrical voltage provided by the power generation element to charge the battery with the electrical voltage, the booster circuit including a diode and a variable capacitor having two fixed electrodes and one moveable electrode, the diode being connected in parallel to the variable capacitor;
an antenna circuit;
a signal processing circuit; and
a booster antenna configured to be coupled to the antenna circuit by a magnetic field,
wherein the antenna circuit is configured to receive through the booster antenna a first signal and to transmit through the booster antenna a second signal for transmitting data stored in the signal processing circuit; and
wherein the battery is configured to supply electric power to the signal processing circuit.

2. The semiconductor device according to claim 1, wherein the power generation element is a thermoelectric element.

3. The semiconductor device according to claim 1, wherein the power generation element is a piezoelectric element.

4. The semiconductor device according to claim 1, wherein the power generation element is an element utilizing electromagnetic induction.

5. The semiconductor device according to claim 1, wherein the power generation element includes a coil and a magnetic material which moves in the coil.

6. The semiconductor device according to claim 1, wherein the battery is selected from the group consisting of a lithium ion battery, a nickel-hydrogen battery and a nickel-cadmium battery.

7. The semiconductor device according to claim 1, wherein the battery is a capacitor.

8. The semiconductor device according to claim 1, wherein the battery is an electric double layer capacitor.

9. The semiconductor device according to claim 1, wherein said semiconductor device is selected from the group consisting of an ID label, an ID tag and an ID card.

10. A semiconductor device comprising:
a power generation element;
a battery;
a booster circuit configured to boost an electrical voltage provided by the power generation element to charge the battery with the electrical voltage, the booster circuit including a diode and a variable capacitor having two fixed electrodes and one moveable electrode, the diode being connected in parallel to the variable capacitor;
an antenna circuit;
a signal processing circuit; and
a booster antenna configured to be coupled to the antenna circuit by a magnetic field,
wherein the power generation element includes a microstructure having a three-dimensional structure;
wherein the antenna circuit is configured to receive through the booster antenna a first signal and to transmit through the booster antenna a second signal for transmitting data stored in the signal processing circuit; and
wherein the battery is configured to supply electric power to the signal processing circuit.

11. The semiconductor device according to claim 10, wherein the power generation element is a thermoelectric element.

12. The semiconductor device according to claim 10, wherein the power generation element is a piezoelectric element.

13. The semiconductor device according to claim 10, wherein the power generation element is an element utilizing electromagnetic induction.

14. The semiconductor device according to claim 10, wherein the power generation element includes a coil and a magnetic material which moves in the coil.

15. The semiconductor device according to claim 10, wherein the battery is selected from the group consisting of a lithium ion battery, a nickel-hydrogen battery and a nickel-cadmium battery.

16. The semiconductor device according to claim 10, wherein the battery is a capacitor.

17. The semiconductor device according to claim 10, wherein the battery is an electric double layer capacitor.

18. The semiconductor device according to claim 10, wherein said semiconductor device is selected from the group consisting of an ID label, an ID tag and an ID card.

19. A semiconductor device comprising:
a power generation element;
a battery;
a booster circuit configured to boost an electrical voltage provided by the power generation element to charge the battery with the electrical voltage, the booster circuit including a diode and a variable capacitor having two fixed electrodes and one moveable electrode, the diode being connected in parallel to the variable capacitor;
an antenna circuit;
a signal processing circuit; and
a booster antenna configured to be coupled to the antenna circuit by a magnetic field,
wherein the antenna circuit is configured to receive through the booster antenna a first signal and to transmit through the booster antenna a second signal for transmitting data stored in the signal processing circuit;
wherein the battery is configured to supply electric power to the signal processing circuit, and
wherein the antenna circuit, the signal processing circuit, and the booster antenna are formed over one substrate.

20. The semiconductor device according to claim 19, wherein the power generation element, the antenna circuit, the signal processing circuit, the battery and the booster antenna are formed over the one substrate.

21. The semiconductor device according to claim 19, wherein the antenna circuit receives from and transmits to a reader/writer the first signal and the second signal.

22. The semiconductor device according to claim 19, wherein the power generation element is a thermoelectric element.

23. The semiconductor device according to claim 19, wherein the power generation element is a piezoelectric element.

24. The semiconductor device according to claim 19, wherein the power generation element is an element utilizing electromagnetic induction.

25. The semiconductor device according to claim 19, wherein the power generation element includes a coil and a magnetic material which moves in the coil.

26. The semiconductor device according to claim 19, wherein the battery is selected from the group consisting of a lithium ion battery, a nickel-hydrogen battery and a nickel-cadmium battery.

27. The semiconductor device according to claim 19, wherein the battery is a capacitor.

28. The semiconductor device according to claim 19, wherein the battery is an electric double layer capacitor.

29. The semiconductor device according to claim 19, wherein said semiconductor device is selected from the group consisting of an ID label, an ID tag and an ID card.

30. A semiconductor device comprising:
a power generation element;
a battery;
a booster circuit configured to boost an electrical voltage provided by the power generation element to charge the battery with the electrical voltage, the booster circuit including a diode and a variable capacitor having two fixed electrodes and one moveable electrode, the diode being connected in parallel to the variable capacitor;
an antenna circuit;
a signal processing circuit; and
a booster antenna configured to be coupled to the antenna circuit by a magnetic field,
wherein the power generation element includes a microstructure having a three-dimensional structure;
wherein the antenna circuit is configured to receive through the booster antenna a first signal and to transmit through the booster antenna a second signal for transmitting data stored in the signal processing circuit;
wherein the battery is configured to supply electric power to the signal processing circuit, and
wherein the antenna circuit, the signal processing circuit, and the booster antenna are formed over one substrate.

31. The semiconductor device according to claim 30, wherein the power generation element, the antenna circuit, the signal processing circuit, the battery and the booster antenna are formed over the one substrate.

32. The semiconductor device according to claim 30, wherein the antenna circuit receives from and transmits to a reader/writer the first signal and the second signal.

33. The semiconductor device according to claim 30, wherein the power generation element is a thermoelectric element.

34. The semiconductor device according to claim 30, wherein the power generation element is a piezoelectric element.

35. The semiconductor device according to claim 30, wherein the power generation element is an element utilizing electromagnetic induction.

36. The semiconductor device according to claim 30, wherein the power generation element includes a coil and a magnetic material which moves in the coil.

37. The semiconductor device according to claim 30, wherein the battery is selected from the group consisting of a lithium ion battery, a nickel-hydrogen battery and a nickel-cadmium battery.

38. The semiconductor device according to claim 30, wherein the battery is a capacitor.

39. The semiconductor device according to claim 30, wherein the battery is an electric double layer capacitor.

40. The semiconductor device according to claim 30, wherein said semiconductor device is selected from the group consisting of an ID label, an ID tag and an ID card.

41. The semiconductor device according to claim 1, wherein the power generation element includes a first semiconductor film and the signal processing circuit includes a transistor comprising a second semiconductor film, and the first semiconductor film and the second semiconductor film are provided on a same insulating surface and include a same material.

42. The semiconductor device according to claim 10, wherein the power generation element includes a first semiconductor film and the signal processing circuit includes a transistor comprising a second semiconductor film, and the first semiconductor film and the second semiconductor film are provided on a same insulating surface and include a same material.

43. The semiconductor device according to claim 19, wherein the power generation element includes a first semiconductor film and the signal processing circuit includes a transistor comprising a second semiconductor film, and the first semiconductor film and the second semiconductor film are provided on a same insulating surface and include a same material.

44. The semiconductor device according to claim 30, wherein the power generation element includes a first semiconductor film and the signal processing circuit includes a transistor comprising a second semiconductor film, and the first semiconductor film and the second semiconductor film are provided on a same insulating surface and include a same material.

45. A semiconductor device comprising:
   a power generation element;
   a battery configured to be charged by the power generation element;
   an antenna circuit;
   a signal processing circuit; and
   a booster antenna configured to be coupled to the antenna circuit by a magnetic field,
   wherein the antenna circuit is configured to receive through the booster antenna a first signal and to transmit through the booster antenna a second signal for transmitting data stored in the signal processing circuit; and
   wherein the battery is configured to supply electric power to the signal processing circuit.

46. The semiconductor device according to claim 45, wherein the power generation element is a thermoelectric element.

47. The semiconductor device according to claim 45, wherein the power generation element is a piezoelectric element.

48. The semiconductor device according to claim 45, wherein the power generation element is an element utilizing electromagnetic induction.

49. The semiconductor device according to claim 45, wherein the power generation element includes a coil and a magnetic material which moves in the coil.

50. The semiconductor device according to claim 45, wherein the battery is selected from the group consisting of a lithium ion battery, a nickel-hydrogen battery and a nickel-cadmium battery.

51. The semiconductor device according to claim 45, wherein the battery is a capacitor.

52. The semiconductor device according to claim 45, wherein the battery is an electric double layer capacitor.

53. The semiconductor device according to claim 45, wherein said semiconductor device is selected from the group consisting of an ID label, an ID tag and an ID card.

54. The semiconductor device according to claim 45, wherein the power generation element includes a first semiconductor film and the signal processing circuit includes a transistor comprising a second semiconductor film, and the first semiconductor film and the second semiconductor film are provided on a same insulating surface and include a same material.

* * * * *